(12) United States Patent
Fukuyama et al.

(10) Patent No.: US 7,628,726 B2
(45) Date of Patent: Dec. 8, 2009

(54) AUTOMATIC TRANSMISSION FOR VEHICLE

(75) Inventors: Satoshi Fukuyama, Anjo (JP);
Toshihiko Aoki, Anjo (JP); Minoru Todo, Takahara (JP); Kazuhisa Ozaki, Kota (JP); Takuya Fujimine, Hamamatsu (JP); Takuya Ishii, Anjo (JP); Tomochika Inagaki, Edogawa (JP); Yousuke Andou, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 271 days.

(21) Appl. No.: 10/590,957

(22) PCT Filed: Sep. 10, 2004

(86) PCT No.: PCT/JP2004/013251

§ 371 (c)(1),
(2), (4) Date: Oct. 16, 2006

(87) PCT Pub. No.: WO2005/100819

PCT Pub. Date: Oct. 27, 2005

(65) Prior Publication Data

US 2007/0105685 A1    May 10, 2007

(30) Foreign Application Priority Data

Apr. 16, 2004    (JP)    ............... 2004-122271

(51) Int. Cl.
*F16H 3/44* (2006.01)
(52) U.S. Cl. ...................................... 475/285
(58) Field of Classification Search .......... 475/275–292
See application file for complete search history.

(56) References Cited

U.S. PATENT DOCUMENTS

| 5,106,352 | A | 4/1992 | Lepelletier |
| 6,110,069 | A | 8/2000 | Taniguchi et al. |
| 6,120,410 | A | 9/2000 | Taniguchi et al. |
| 6,135,912 | A | 10/2000 | Tsukamoto et al. |
| 6,139,463 | A * | 10/2000 | Kasuya et al. ............... 475/275 |
| 6,176,802 | B1 | 1/2001 | Kasuya et al. |
| 6,634,980 | B1 | 10/2003 | Ziemer |
| 6,723,018 | B2 * | 4/2004 | Hayabuchi et al. .......... 475/276 |
| 7,276,011 | B2 * | 10/2007 | Tabata et al. ................. 475/276 |

FOREIGN PATENT DOCUMENTS

| EP | 1 013 968 A2 | 6/2000 |
| EP | 1 375 962 A2 | 1/2004 |
| JP | A 04-219553 | 8/1992 |
| JP | A 2000-199548 | 7/2000 |
| JP | A 2000-199549 | 7/2000 |

(Continued)

*Primary Examiner*—David D Le
*Assistant Examiner*—Justin Holmes
(74) *Attorney, Agent, or Firm*—Oliff & Berridge, PLC

(57) ABSTRACT

A vehicle automatic transmission includes a planetary gear that reduces a speed of an input rotation of an input shaft and outputs a reduced speed rotation; at least two clutches that are capable of transmitting the reduced speed rotation that passes through the planetary gear; a planetary gear set having at least two rotation elements, wherein each rotation element can transmit the reduced speed rotation transmitted by the clutches; and an input transmitting clutch that is capable of transmitting the input rotation into one of the at least two rotation elements.

43 Claims, 29 Drawing Sheets

FOREIGN PATENT DOCUMENTS

| | | |
|---|---|---|
| JP | A 2000-220704 | 8/2000 |
| JP | A 2000-220705 | 8/2000 |
| JP | A 2000-240740 | 9/2000 |
| JP | A 2001-182785 | 7/2001 |
| JP | A 2002-323098 | 11/2002 |
| JP | A 2003-514195 | 4/2003 |

* cited by examiner

FIG. 3

|      | C-1 | C-2 | C-3 | C-4 | B-1 | B-2 | F-1 |
|------|-----|-----|-----|-----|-----|-----|-----|
| 1st  | ●   |     |     |     |     | (●) | ●   |
| 2nd  | ●   |     |     |     | ●   |     |     |
| 3rd  | ●   |     | ●   |     |     |     |     |
| 4th  | ●   |     |     | ●   |     |     |     |
| 5th  | ●   | ●   |     |     |     |     |     |
| 6th  |     | ●   |     | ●   |     |     |     |
| 7th  |     | ●   | ●   |     |     |     |     |
| 8th  |     | ●   |     |     | ●   |     |     |
| Rev1 |     |     | ●   |     |     | ●   |     |
| Rev2 |     |     |     | ●   |     | ●   |     |

(●) INDICATES WHEN ENGINE BRAKING

AUTOMATIC TRANSMISSION FOR VEHICLE

This application is the U.S. National Stage of PCT/JP2004/13251, filed Sep. 10, 2004, which claims priority from JP2004-122271, filed Apr. 16, 2004, the disclosures of which are incorporated herein in their entireties by reference thereto.

BACKGROUND

The present invention relates to an automatic transmission

In recent years, automatic transmissions with multiple speed shifts have been demanded in order to improve fuel consumption, for example. Such an automatic transmission has been proposed that comprises (1) a speed reduction planetary gear that can output reduced speed rotation, wherein input rotation that is input to an input shaft has a reduced speed, and (2) a planetary gear unit that has multiple rotation elements. The planetary gear unit is constructed so as to be capable of inputting the reduced speed rotation from the speed reduction planetary gear to the rotation element of the planetary gear unit via a clutch and so forth, and is therefore capable of multiple speed shifting (for example, see Japanese Unexamined Patent Application Publication No. 2001-182785).

In order to construct an automatic transmission that is capable of the above-described multiple speed shifting, providing multiple clutches is necessary in order to change the transmission path that inputs the rotation into the various rotation elements of the planetary gear unit. However, depending on the placement location of these clutches, the various linking members that link these clutches and the various rotation elements of the planetary gear unit, the linking member which requires a large torque may rotate at a high rotation due to the speed shifting (greatly accelerated rotation as to the input rotation). In this instance, the linking member, through which a large torque may be transmitted and also the rotation thereof is a high rotation, requires a high level of rigidity. However, because the linking member is placed on the outer circumferential side, the linking member must be made larger so as to secure the strength of such a linking member. Therefore, not only does this become a hindrance to making the linking member lightweight, but the inertia force according to the increased diameter and increased weight also increases. This prevents improvements to weight saving and controllability in the automatic transmission.

Further, the hydraulic servos of these multiple clutches require an oil line to be provided between the members that rotate relatively, so as to be supplied with hydraulic oil, and sealing rings that seal between these members that rotate relatively need to be provided. However, when a large number of sealing rings are provided, sliding resistance is generated between these members that rotate relatively. There is thus the disadvantage of poorer efficiency of the automatic transmission and reduced controllability thereof.

SUMMARY

Accordingly, the present invention thus provides an automobile automatic transmission that is capable of multiple speed shifting, while being made lightweight and improving the controllability.

Further, the present invention provides an automobile automatic transmission that is capable of multiple speed shifting, while being capable of having a reduced number of sealing rings.

The present invention thus provides a vehicle automatic transmission with a planetary gear that reduces a speed of an input rotation of an input shaft and outputs a reduced speed rotation; at least two clutches that are capable of transmitting the reduced speed rotation that passes through the planetary gear; a planetary gear set having at least two rotation elements, wherein each rotation element can transmit the reduced speed rotation transmitted by the clutches; and an input transmitting clutch that is capable of transmitting the input rotation into one of the at least two rotation elements, wherein a hydraulic servo of the input transmitting clutch is disposed between the planetary gear set and the planetary gear in an axial direction; at least one hydraulic servo of the clutches is disposed on a side opposite, in the axial direction, from the planetary gear set as to the hydraulic servo of the input transmitting clutch; the input shaft and at least one of the rotation elements are linked via the input transmitting clutch, and an outer circumferential side linking path that passes through an outer circumferential side of at least one of the clutches; and at least one of the clutches and at least one of the two rotation elements of the planetary gear set are linked via an inner circumferential side linking path that passes through an inner circumferential side of the input transmitting clutch.

BRIEF DESCRIPTION OF THE DRAWINGS

Various embodiments of the invention will be described with reference to the drawings, wherein:

FIG. 3 is an operating chart of the automatic transmission;

DETAILED DESCRIPTION OF EMBODIMENTS

First Embodiment

Figure 1:
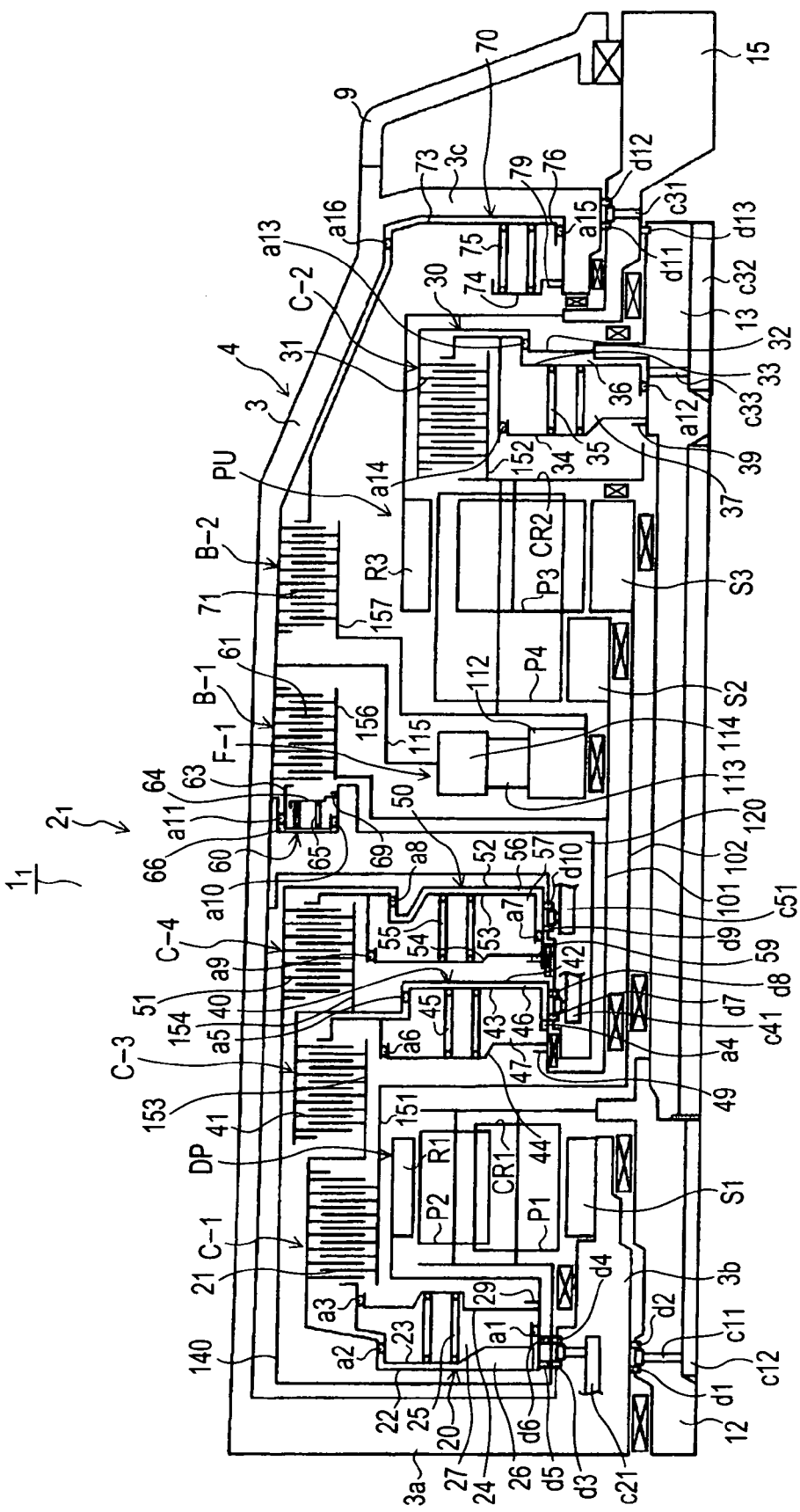
FIG. 1 is a cross-sectional diagram illustrating an automatic transmission relating to a first embodiment.
Figure 4:
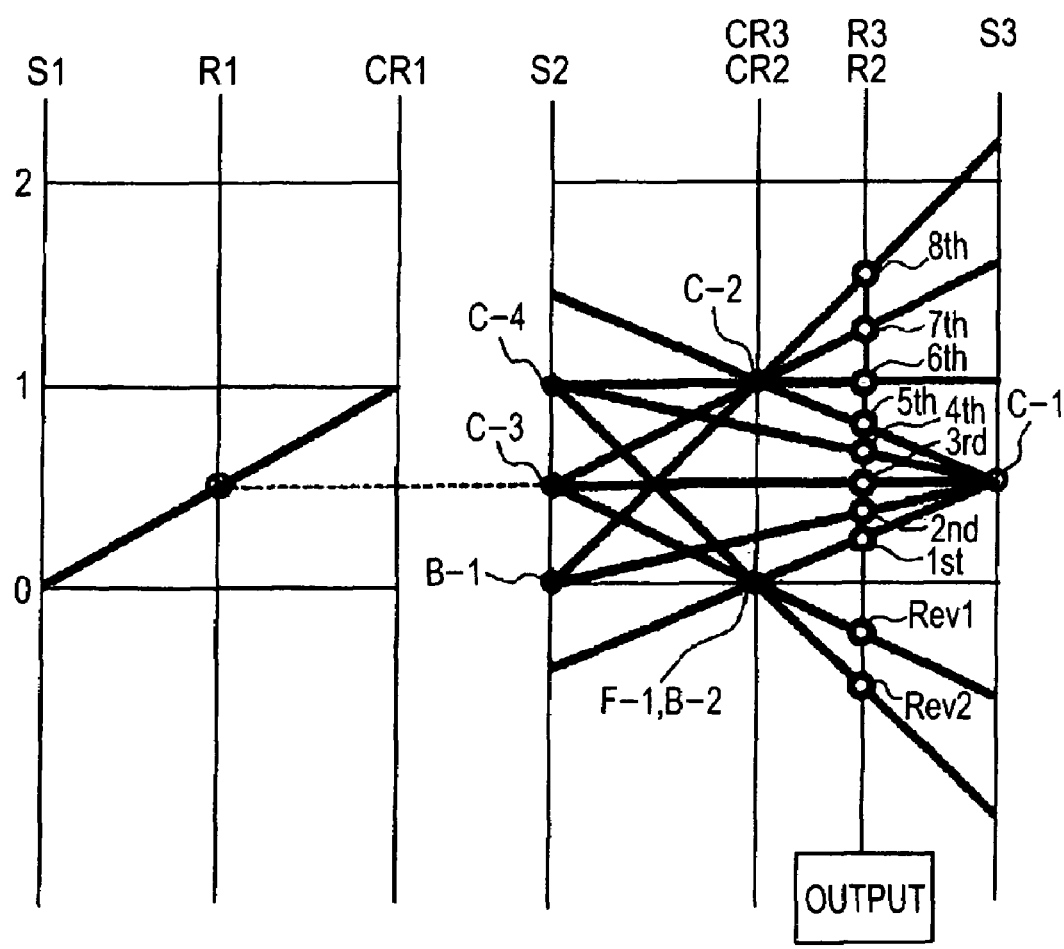
FIG. 4 is a speed line diagram of the automatic transmission.

The first embodiment relating to the present invention will be described below with reference to FIGS. 1 through 4. FIG. 1 is a cross-sectional diagram illustrating an automatic transmission $1_1$ relating to a first embodiment, FIG. 2 is a skeleton diagram illustrating the automatic transmission $1_1$, FIG. 3 is an operating chart of the automatic transmission $1_1$, and FIG. 4 is a speed line diagram of the automatic transmission $1_1$.

In the following descriptions, the top, bottom, left, and right in FIG. 1 will be described corresponding to the "top", "bottom", "front", and "back", in this order, in the actual automobile automatic transmission $1_1$ (hereafter may be simply called "automatic transmission"). Accordingly, for example, at the lower side in the vertical direction within FIG. 1, the input shaft 12, the intermediate shaft 13, and the output shaft 15 of the speed shifting mechanism $2_1$ of the automatic transmission $1_1$ are illustrated from left to right on the same straight line, but are actually lined up in this order from the front to the back on approximately the center axis of the speed shifting mechanism $2_1$. Here, the above-described input shaft 12 and intermediate shaft 13 are structured such that the back portion of the input shaft 12 and the front portion of the intermediate shaft 13 are splined, and in a broader sense are integrally fixed such that one input shaft is formed. Further, the direction following the lengthwise direction of the input shaft 12 is the "axial direction", the direction that is orthogonal to the axial direction is the "radial direction", and further regarding the location of the radial direction, the side close to the shaft 12 is the "inner diameter side (inner circumferential side)", and the side far from the shaft 12 is the "outer diameter side (outer circumferential side)". Further, the "retaining means" refers to retaining means including a multiple disk brake, a handbrake, or a one-way clutch. Further, "opening" refers to facing the portion not forming the hydraulic servo unit of the clutch drum towards the direction in which the piston moves at the time of engaging the clutch. In other words "opening" refers to the open portion of the clutch drum that is in a U-shape when viewed cross-sectionally.

Figure 2:
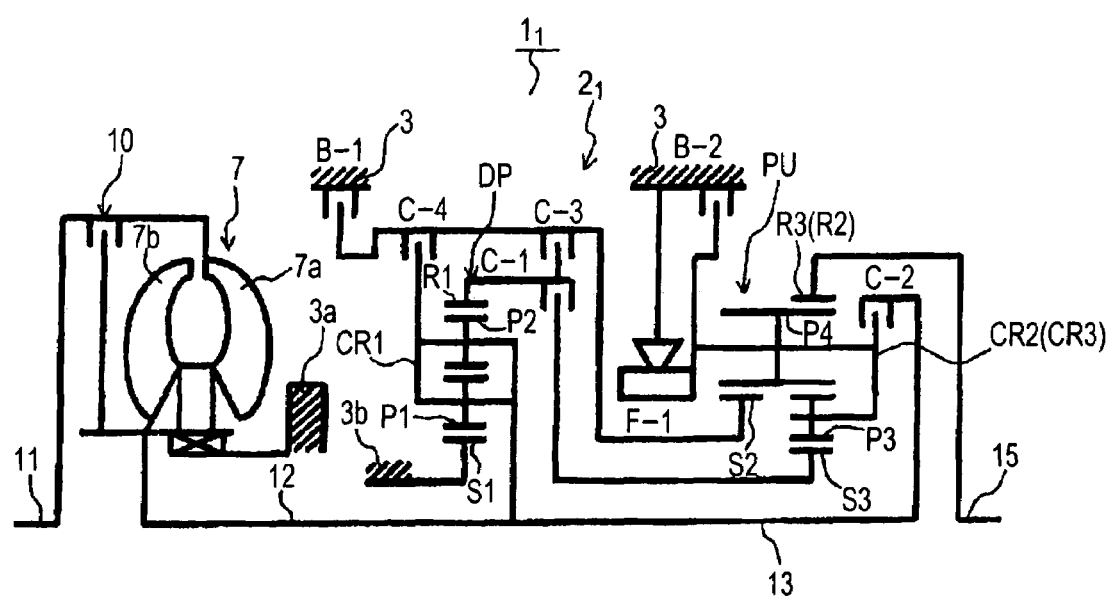
FIG. 2 is a skeleton diagram illustrating the automatic transmission.

First, an approximate configuration of the automatic transmission $1_1$ wherein the present invention can be applied is described following FIG. 2. As illustrated in FIG. 2, an automatic transmission $1_1$ suitable for use in an FR type (front engine, rear drive) automobile, for example, has an input shaft 11 that can connect to an engine (not illustrated), a torque converter 7 and a speed shifting mechanism $2_1$.

The above-mentioned torque converter 7 has a pump impeller 7a that is connected to the input shaft 11 of the automatic transmission $1_1$ and a turbine runner 7b to which the rotation of this pump impeller 7a is transmitted via the operating fluid, and this turbine runner 7b is connected to the input shaft 12 of the above-mentioned speed shifting mechanism $2_1$ that is configured coaxially with the above-mentioned input shaft 11. Further, the torque converter 7 comprises a lockup clutch 10. When the lockup clutch 10 is engaged by the oil pressure control of the unshown oil pressure control device, the rotation of the input shaft 11 of the above-mentioned automatic transmission $1_1$ is directly transmitted to the input shaft 12 of the speed shifting mechanism $2_1$.

The above-mentioned speed shifting mechanism $2_1$ comprises a planetary gear (speed reduction planetary gear) DP on an input shaft 12 (and an intermediate shaft 13 to be described in detail below) and a planetary gear unit (planetary gear set) PU. The above-mentioned planetary gear DP comprises a sun gear S1, a carrier CR1, and a ring gear R1, and is a so-called double pinion planetary gear wherein the pinion P2 that meshes with the ring gear R1 and the pinion P1 that meshes with the sun gear S1 are configured so as to mesh with one another.

Further, the planetary gear unit PU has as the four rotation elements: a sun gear S2 (the first rotation element as one of the two rotation elements), a sun gear S3 (the second rotation element as one of the two rotation elements), a carrier CR2 (CR3) (the third rotation element), and a ring gear R3 (R2) (the fourth rotation element), and is a so-called Ravigneaux-type planetary gear wherein this carrier CR2 has a long pinion P4 that meshes with the sun gear S2 and the ring gear R3, and a short pinion P3 that meshes with the sun gear S3, that are configured so as to mesh with each other.

The sun gear S1 of the above-mentioned planetary gear DP is connected to the boss unit 3b that is fixed to the transmission case 3 to be described in detail below. Further, the above-mentioned carrier CR1 is connected to the above-mentioned input shaft 12, and has the same rotation as the rotation of the input shaft 12 (hereafter referred to as "input rotation") while also being connected to the fourth clutch C-4 (input transmitting clutch). Further, the ring gear R1 has a reduced speed rotation because the carrier CR1 is directly connected to the input shaft 12, and the sun gear S1 is fixed, and the ring gear R1 is capable of being connected to the first clutch C-1 (reduced speed transmitting clutch) and the third clutch C-3 (reduced speed transmitting clutch).

The sun gear S2 of the above-mentioned planetary gear unit PU is connected to the first brake B-1 and is capable of being fixed to the transmission case 3, while also being connected to the above-mentioned fourth clutch C-4 and the above-mentioned third clutch C3. The input rotation of the above-mentioned carrier CR1 is capable of being input via the fourth clutch C-4 and the reduced speed rotation of the above-mentioned ring gear R1 is capable of being input via the third clutch C-3. Further, the above-mentioned sun gear S3 is connected to the first clutch C-1, and the reduced speed rotation of the above-mentioned ring gear R1 is capable of being input.

Further, the above-mentioned carrier CR2 is connected to the second clutch C-2 wherein the rotation of the input shaft 12 is input via the intermediate shaft 13, and the input rotation is capable of being input via the second clutch C-2, and is further connected to the one-way clutch F-1 and the second brake B-2, and the rotation in one direction is controlled as to the transmission case 3 via this one-way clutch F-1, while also the rotation is capable of being fixed via the second brake B-2. Also, the above-mentioned ring gear R3 is connected to the output shaft 15 that outputs the rotation to a drive wheel not shown.

Continuing, based on the above-mentioned configuration, the operation of the speed shifting mechanism $2_1$ will be described following FIG. 2, FIG. 3, and FIG. 4. Now, in the speed line diagram illustrated in FIG. 4, the vertical axis illustrates the rotation count of each of the rotation elements (each gear), and the horizontal axis illustrates the gear ratio of these rotation elements. Further, with the planetary gear DP portion of the speed line diagram, the vertical axis from left to right corresponds to the sun gear S1, the ring gear R1 and the carrier CR1, respectively. Further, with the planetary gear unit PU portion of the speed line diagram, the vertical axis from right to left corresponds to the sun gear S3, the ring gear R3 (R2), the carrier CR2 (CR3), and the sun gear S2.

For example, in a D (drive) range with a forward first speed (1st), the first clutch C-1 and the one-way clutch F-1 are engaged, as illustrated in FIG. 3. Then as illustrated in FIGS. 2 and 4, the rotation of the ring gear R1 with a reduced speed rotation from the carrier CR1 that is the input rotation and the fixed sun gear S1 is input to the sun gear S3 via the first clutch C-1. Further, the rotation of the carrier CR2 is limited to one direction (correct rotation direction). In other words, the reverse rotation of the carrier CR2 is prevented and is in a fixed state. Then, the reduced speed rotation that has been input to the sun gear S3 is output to the ring gear R3 via the fixed carrier CR2, and the correct rotation as the forward first speed is output from the output shaft 15.

During engine braking (during coasting), the second brake B-2 is retained and the carrier CR2 is fixed, and the above-mentioned forward first speed state is maintained while preventing the correct rotation of this carrier CR2. Further, during this forward first speed, the reverse rotation of the carrier CR2 is prevented by the one-way clutch F-1, and also the correct rotation is enabled. Thus, for example, when the forward first speed is achieved by switching from a non-driving range to a driving range, the automatic engaging of the one-way clutch F-1 can be smoothly performed.

With the forward second speed (2nd), the first clutch C-1 is engaged and the first brake B-1 is retained, as illustrated in FIG. 3. Then as illustrated in FIG. 2 and FIG. 4, the rotation of the ring gear R1 with a reduced speed rotation from the carrier CR1 that is the input rotation and the fixed sun gear S1 is input to the sun gear S3 via the first clutch C-1. Further, the rotation of the sun gear S2 is fixed by the retaining of the first brake B-1. Then the carrier CR2 has a reduced speed rotation that is a lower rotation than that of the sun gear S3, and the reduced speed rotation input to this sun gear S3 is output to the ring gear R3 via this carrier CR2, and the correct rotation as the forward second speed is output from the output shaft 15.

With the forward third speed (3rd), the first clutch C-1 and the third clutch C-3 are engaged, as illustrated in FIG. 3. Then as illustrated in FIG. 2 and FIG. 4, the rotation of the ring gear R1 with a reduced speed rotation from the carrier CR1 that is the input rotation and the fixed sun gear S1 is input to the sun gear S3 via the first clutch C-1. Further, the reduced speed rotation of the ring gear R1 is input to the sun gear S2 by the engaging of the third clutch C-3. In other words, the reduced speed rotation of the ring gear R1 is input to the sun gear S2 and the sun gear S3, and therefore the planetary gear unit PU becomes directly coupled at the reduced speed rotation, and the reduced speed rotation is output without change to the ring gear R3, and the correct rotation as the forward third speed is output from the output shaft 15.

With the forward fourth speed (4th), the first clutch C-1 and the fourth clutch C-4 are engaged, as illustrated in FIG. 3. Then as illustrated in FIG. 2 and FIG. 4, the rotation of the ring gear R1 with a reduced speed rotation from the carrier CR1 that is the input rotation and the fixed sun gear S1 is input to the sun gear S3 via the first clutch C-1. Further, the input rotation of the carrier CR1 is input to the sun gear S2 by the engaging of the fourth clutch C-4. Then the carrier CR2 has a reduced speed rotation that is a higher rotation than that of the sun gear S3, and the reduced speed rotation input to this sun gear S3 is output to the ring gear R3 via this carrier CR2, and the correct rotation as the forward fourth speed is output from the output shaft 15.

With the forward fifth speed (5th), the first clutch C-1 and the second clutch C-2 are engaged, as illustrated in FIG. 3. Then as illustrated in FIG. 2 and FIG. 4, the rotation of the ring gear R1 with a reduced speed rotation from the carrier CR1 that is the input rotation and the fixed sun gear S1 is input to the sun gear S3 via the first clutch C-1. Further, the input rotation is input to the carrier CR2 by the engaging of the second clutch C-2. Then from the reduced speed rotation that has been input to this sun gear S3 and the input rotation that has been input to the carrier CR2, a higher reduced speed rotation than that of the above-mentioned forward fourth speed is output from the ring gear R3, and the correct rotation as the forward fifth speed is output from the output shaft 15.

With the forward sixth speed (6th), the second clutch C-2 and the fourth clutch C-4 are engaged, as illustrated in FIG. 3. Then as illustrated in FIG. 2 and FIG. 4, the input rotation of the carrier CR1 is input to the sun gear S2 by the engaging of the fourth clutch C-4. Further, the input rotation is input to the carriers CR2 by the engaging of the second clutch C-2. In other words, the input rotation is input to the sun gear S2 and the carrier CR2, and therefore the planetary gear unit PU becomes directly coupled at the input rotation, and the input rotation is output without change to the ring gear R3, and the correct rotation as the forward sixth speed is output from the output shaft 15.

With the forward seventh speed (7th), the second clutch C-2 and the third clutch C-3 are engaged, as illustrated in FIG. 3. Then as illustrated in FIG. 2 and FIG. 4, the rotation of the ring gear R1 with a reduced speed rotation from the carrier CR1 that is the input rotation and the fixed sun gear S1 is input to the sun gear S2 via the third clutch C-3. Further, the input rotation is input to the carrier CR2 by the engaging of the second clutch C-2. Then from the reduced speed rotation that has been input to this sun gear S2 and the input rotation that has been input to the carrier CR2, a slightly higher accelerated speed rotation than that of the input rotation is output from the ring gear R3, and the correct rotation as the forward seventh speed is output from the output shaft 15.

With the forward eighth speed (8th), the second clutch C-2 is engaged and the first brake B-1 is retained, as illustrated in FIG. 3. Then as illustrated in FIG. 2 and FIG. 4, the input rotation of the carrier CR2 is input by the engaging of the second clutch C-2. Further, the rotation of the sun gear S2 is fixed by the retaining of the first brake B-1. Then from the fixed sun gear S2, the input rotation of the carrier CR2 as a higher accelerated speed rotation than that of the above-mentioned forward seventh speed is output from the ring gear R3, and the correct rotation as the forward eighth speed is output from the output shaft 15.

With the first reverse speed (Rev1), the third clutch C-3 is engaged and the second brake B-2 is retained, as illustrated in FIG. 3. Then as illustrated in FIG. 2 and FIG. 4, the rotation of the ring gear R1 with a reduced speed rotation from the carrier CR1 that is the input rotation and the fixed sun gear S1 is input to the sun gear S2 via the third clutch C-3. Further, the rotation of the carrier CR2 is fixed by the retaining of the second brake B-2. Then the reduced speed rotation that has been input to the sun gear S2 is output to the ring gear R3 via the fixed carrier CR2, and the reverse rotation as the first reverse speed is output from the output shaft 15.

With the second reverse speed (Rev2), the fourth clutch C-4 is engaged and the second brake B-2 is retained, as illustrated in FIG. 3. Then as illustrated in FIG. 2 and FIG. 4, the input rotation of the carrier CR1 is input to the sun gear S2 by the engaging of the fourth clutch C-4. Further, the rotation of the carrier CR2 is fixed by the retaining of the second brake B-2. Then the input rotation that has been input to the sun gear S2 is output from the ring gear R3 via the fixed carrier CR2, and the reverse rotation as the second reverse speed is output from the output shaft 15.

Now, for example in a P (parking) range or an N (neutral) range, the first clutch C-1, the second clutch C-2, the third clutch C-3, and the fourth clutch C-4 are disengaged. Then, the carrier CR1 and the sun gear S2, the ring gear R1 and the sun gear S2 and the sun gear S3, and the planetary gear DP and the planetary gear unit PU, are in a state of separation. Further, the input shaft 12 (the intermediate shaft 13) and the carrier CR2 are in a state of separation. Thus, the motive power transmitting between the input shaft 12 and the planetary gear unit PU is in a state of separation, and the motive power transmitted between the input shaft 12 and the output shaft 15 is in a state of separation.

With the above-described construction for the purpose of achieving multiple speed shifting, in the case that the second clutch C-2 and the third clutch C-3 are engaged and the forward seventh speed (7th) is achieved, and the second clutch C-2 is engaged and the first brake B-1 is retained and the forward eighth speed (8th) is achieved, since the first clutch is released, the sun gear S3 is in a free state. A rotation of an extremely high rotation results as illustrated in the speed line diagram of FIG. 4.

Further, in the case that the first clutch C-1 and the second clutch C-2 are engaged and the forward fifth speed (5th) is achieved, since the third clutch C-3 and the fourth clutch C-4 and the first brake B-1 are released, the sun gear S2 is in a free state. A rotation of an extremely high rotation results as illustrated in the speed line diagram of FIG. 4.

Further, during high speed driving, that is to say when C-2 is engaged at a high speed (5th through 8th), with an engaging element (in other words, C-1 at 5th, C-4 at 6th, C-3 at 7th, and B-1 at 8th) which is engaged other than the clutch C-2, in the case that the oil supply to the hydraulic servo of these engaging elements for some reason has been discontinued, the output member is rotated by a drive wheel during driving and does not change the rotations. However, due to the release of the friction engaging element to be engaged, the burden decreases and the engine rotation count increases, which can disadvantageously result in the input shaft rotation count increasing. In other words, the high speed rotation of the input shaft is input to the planetary gear unit PU by the engaging of the clutch C-2, while rotation count of the output member is in the state of fixed rotation count corresponding to the vehicle speed at that point in time, and the rotation of the element of the planetary gear unit PU can disadvantageously become extremely high. To specifically describe one example, (1) during driving at speed seven which is achieved by engaging the clutch C-2 and the clutch C-3, the oil pressure supply to the hydraulic servo of the clutch C-3 is discontinued for some reason when the vehicle speed is low, and (2) further, when the engine burden is accelerated by the driver pressing down on the accelerator, the engine is an unloaded state which cannot achieve a speed change and thus races to a high rotation, and (3) combined with the output member being in a low rotation, the predetermined rotation element of the planetary gear unit PU which transmits movement by the clutch C-3 can disadvantageously achieve a high speed. If we consider that the rotation of the rotation element of one portion of the planetary gear unit PU becomes extremely high, the member which transmits movement to the rotation element of one portion of the above-described planetary gear unit PU needs to have the strength thereof ensured so as to withstand the increase in inertia force due to the high speed rotation. Therefore when placed on the outer circumferential side, a problem occurs wherein the automatic transmission becomes heavy. Thus, the configuration relating to the present invention which has been made to solve these problems will be described in detail below.

Here first, the approximate configuration of the automatic transmission $1_1$ overall, and in particular the relative position relationships between the various configuration elements will be described simply while referencing FIG. 1.

In the descriptions hereafter, the words clutch (the first through fourth clutches C-1 through C-4) and brake (the first brake B-1 and the second brake B-2) are used with the meaning that includes both friction plates (outer friction plate and inner friction plate) and the hydraulic servos that disengage these.

As illustrated in FIG. 1, the case 4 of the automatic transmission $1_1$, as a whole, is in a cylindrical form wherein the front side (the left side in FIG. 1) has a large diameter, and a smaller diameter as you go further back. The case 4 overall is comprised of three separate cases, that is to say the housing case (not shown) that envelops the torque converter 7 on the front side and the transmission case 3 in the middle and the extension case 9 on the back side are linked together. On the front edge of the transmission case 3, in other words on the side of the housing case, a bulkhead member 3a is affixed in a flange shape. A boss unit 3b is extended toward the back inner diameter side of this bulkhead member 3a. On the other hand, on the back edge of the transmission case 3, in other words on the side of the extension case 9, a bulkhead member 3c in a flange shape is provided integrally with the transmission case 3.

In the center of the above-described case 4, in order from front to back, an input shaft 12, an intermediate shaft 13, and an output shaft 15 of the speed shifting mechanism $2_1$ are configured coaxially. Regarding the position of the axial direction, the input shaft 11 of the automatic transmission $1_1$ is positioned on the front portion of the housing case, and the input shaft 12 of the speed shifting mechanism $2_1$ passes through the center of the bulkhead member 3a from the immediate back of the input shaft 11 and extends to a position that is slightly to the back of the reduced speed planetary gear DP. The intermediate shaft 13 is splined at the front portion thereof to the back portion inner circumferential side of the input shaft 12, and also the back edge is extended to the bulkhead member 3c that is approximately to the back side thereof. Then the front portion of the output shaft 15 is fit onto to the outer face of the intermediate shaft 13, and the back portion protrudes to the back of the extension case 9. As described above, the input shaft 12 and the intermediate shaft 13 are configured integrally, and comprise the input shaft in a broader sense. Further, an oil pump (not shown) that is linked to the input shaft 11 is configured on the inner diameter side of the bulkhead member 3a that separates the inner circumferential side of the housing case and the inner circumferential side of the transmission case 3.

A planetary gear DP and a planetary gear unit PU are placed on the inner circumferential side of the transmission case 3 coaxially, and the hydraulic servo 50 of the fourth clutch C-4 wherein the friction plate 51 is placed on the outer circumferential side is placed between the axial direction of the planetary gear DP and the planetary gear unit PU. Further, a ring-shaped support wall (center support) 120 is placed between the axial direction of the hydraulic servo 50 of this fourth clutch C-4 and this planetary gear unit PU, so as to be adjoined to the hydraulic servo 50 of this fourth clutch C-4. The inner circumferential side of this support wall 120 is extended between the inner portions of the hydraulic servo 50 of this fourth clutch C-4 and the hydraulic servo 40 of the later-described third clutch C-3, that is to say, these hydraulic servos 40 and 50 are placed on the support wall 120.

Further, the hydraulic servo 20 of the first clutch C-1, wherein the friction plate 21 is placed on the outer circumferential side of the planetary gear DP and the hydraulic servo 40 of the third clutch, wherein the friction plate 41 is placed on the back side of this friction plate 21, are placed on the front side that is the side opposite from the planetary gear set PU in the axial direction as to the hydraulic servo 50 of the aforementioned fourth clutch C-4. Specifically, the hydraulic servo 40 of the third clutch C-3 is placed between the axial direction of the planetary gear DP and the hydraulic servo 50 of the fourth clutch C-4, and further, the hydraulic servo 20 of the first clutch C-1 is placed on the above-mentioned boss unit 3b on the front side that is the side opposite from the hydraulic servo 40 of the third clutch C-3 in the axial direction as to the planetary gear DP.

Further, the hydraulic servo 30 of the second clutch C2, wherein the friction plate 31 is placed on the outer circumferential side, is placed on the intermediate shaft 13 (in a broader sense on the input shaft 12) on the back side that is the side opposite from the planetary gear DP in the axial direction as to the planetary gear set PU. Further, the hydraulic servo 60 of the first brake B-1 wherein the friction plate 61 is placed adjoining is placed on the back face of the support wall 120 at the back side in the axial direction thereof, and the hydraulic servo 70 of the second brake B-2, wherein the friction plate 71 is placed on the outer circumferential side of the planetary gear unit PU, is placed on the bulkhead member 3c on the back side of the hydraulic servo 30 of the second clutch C-2. Also, the one-way clutch F-1 is placed between the axial direction of this planetary gear unit PU and the support wall 120.

Continuing, the speed shifting mechanism 2₁ will be described in detail. The planetary gear DP that is placed on the inner circumferential side of the transmission case 3 comprises a sun gear S1, a carrier CR1 and a ring gear R1 as described above. On the front side of this planetary gear DP, the above-described boss unit 3b covers the outer face of the input shaft 12 and is fixed so that the above-mentioned sun gear S1 is incapable of rotating. Further, the carrier CR1 supports the pinions P1 and P2 so as to be capable of rotating, and these pinions P1 and P2 mesh together, while also the former pinion P1 meshes with the sun gear S1 and the latter pinion P2 meshes with the ring gear R1. The carrier plate on the back side of this carrier CR1 is linked to the input shaft 12, while also the former carrier plate is linked to the drum-shaped (first) linking member 140. Also, the ring gear R1 is linked to the above-mentioned clutch drum 22 of the aforementioned first clutch C-1.

This first clutch C-1 comprises a friction plate 21 and a hydraulic servo 20 that disengages this friction plate 21. This hydraulic servo 20 has a clutch drum 22 that is open towards the back, a piston member 23, a cancel plate 24, and a return spring 25. The piston member 23 is placed on the back portion of the clutch drum 22 so as to be capable of moving forward or backwards, and from two sealing rings a1 and a2, an oil-tight hydraulic oil chamber 26 is configured between the clutch drum 22. Further, the cancel plate 24 is prevented from moving towards the back by the snap ring 29 fit to the clutch drum 22. The cancel plate 24 has a return spring 25 placed compressed between the piston member 23 placed on the front of the cancel plate 24, and also comprises an oil tight canceling oil chamber 27 by two sealing rings a1 and a3.

Further, an outer friction plate of the friction plate 21 is splined to the inner circumferential side of the front edge portion of the clutch drum 22, and also the inner friction plate thereof is splined to the hub member 151. In other words, when this first clutch C-1 engages, the reduced speed rotation of the ring gear R1 of the above-mentioned planetary gear DP is output to the hub member 151. This hub member 151 is linked to the (third) linking member 102 supported so as to be capable of rotating on the outer circumferential side of the intermediate shaft 13, and this linking member 102 is linked to the sun gear S3 of the above-mentioned planetary gear unit PU. Further, the hub member 153 of the third clutch C-3 to be described in detail below is linked to the clutch drum 22 of the above-mentioned clutch C-1.

On the other hand, the linking member 140 that is linked to the above-mentioned carrier CR1 is linked to the clutch drum 52 of the fourth clutch C-4. This fourth clutch C-4 comprises a friction plate 51 and a hydraulic servo 50 that disconnects this friction plate 51. This hydraulic servo 50 has a clutch drum 52 that is open towards the front (planetary gear DP side), a piston member 53, a cancel plate 54, and a return spring 55. Further, the piston member 53 is placed on the front of the clutch drum 52 so as to be capable of moving forward or backwards, and from two sealing rings a7 and a8, an oil-tight hydraulic oil chamber 56 is configured between the clutch drum 52. Further, the cancel plate 54 is prevented from moving towards the front by the snap ring 59 fit to the clutch drum 52. The cancel plate 54 has a return spring 55 placed compressed between the piston member 53 placed on the back of the cancel plate 54, and also comprises an oil tight canceling oil chamber 57 by two sealing rings a7 and a9.

Further, an outer friction plate of the friction plate 51 is splined to the inner circumferential side of the front edge portion of the clutch drum 52, and also the inner friction plate thereof is splined to the hub member 154. In other words, when this fourth clutch C-4 engages, the input rotation of the carrier CR1 of the above-mentioned planetary gear DP is output to the hub member 154. This hub member 154 is linked to the clutch drum 42 of the third clutch C-3, and also this clutch drum 42 is linked to the (second) linking member 101 that is supported so as to be capable of rotating on the further outer circumferential side of the aforementioned linking member 102, and this linking member 101 is linked to the sun gear S2 of the above-mentioned planetary gear unit PU.

This third clutch C-3 comprises a friction plate 41 and a hydraulic servo 40 that disengages this friction plate 41. This hydraulic servo 40 has a clutch drum 42 that is open towards the front, a piston member 43, a cancel plate 44, and a return spring 45. Further, the piston member 43 is placed on the front of the clutch drum 42 so as to be capable of moving forward or backwards, and from two sealing rings a4 and a5, an oil-tight hydraulic oil chamber 46 is configured between the clutch drum 42. Further, the cancel plate 44 is prevented from moving towards the front by the snap ring 49 fit to the clutch drum 42. The cancel plate 44 has a return spring 45 placed compressed between the piston member 43 placed on the back of the cancel plate 44, and also comprises an oil tight canceling oil chamber 47 by two sealing rings a4 and a6.

Also, an outer friction plate of the friction plate 41 is splined to the inner circumferential side of the front edge portion of the clutch drum 42, and also the inner friction plate thereof is splined to the hub member 153. The reduced speed rotation of the ring gear R1 of the above-mentioned planetary gear DP is input to the hub member 153 via the clutch drum 22 of the first clutch C-1. In other words when this third clutch C-3 engages, the reduced speed rotation thereof is input to the clutch drum 42. This clutch drum 42 is linked to the linking member 101 that is linked to the sun gear S2 of the planetary gear unit PU, as described above.

This linking member 101 is linked to a hub member 156 that passes between the axial direction of the center support wall 120 and the planetary gear unit PU, specifically, between the center support wall 120 and the one-way clutch F-1, and this hub member 156 is splined to the inner friction plate of the friction plate 61 of the first brake B-1. This first brake B-1 has a hydraulic servo 60, wherein the side face of the outer circumferential side of the back of this support wall 120 is a cylinder portion, and this hydraulic servo 60 has a piston member 63, a cancel plate 64, and a return spring 65. The piston member 63 is placed on the back of the cylinder portion of the support wall 120 so as to be capable of moving forward or backwards, and from two sealing rings a10 and a11, an oil-tight hydraulic oil chamber 66 is configured between this cylinder portion. Further, the cancel plate 64 is prevented from moving towards the back by the snap ring 69 fit to the center support wall 120. Also, a return spring 65 is placed compressed between the cancel plate 64 and the piston member 63 placed on the front thereof.

The outer friction plate of the friction plate 61 of this first brake B-1 is splined with the inner face of the transmission case 3, that is to say, when this first brake B-1 is retained, the hub member 156 is fixed to as to be incapable of rotating, and the rotation of the above-described linking member 101 and the sun gear S2 is fixed.

On the other hand, the second clutch C-2 is placed on the back side of the planetary gear unit PU and on the outer circumferential side of the back edge of the intermediate shaft 13. This second clutch C-2 comprises a friction plate 31 and a hydraulic servo 30 that disengages the friction plate 31. This hydraulic servo 30 has a clutch drum 32 that is open towards the front and is linked to the above-mentioned intermediate shaft 13, a piston member 33, a cancel plate 34, and a return spring 35. Further, the piston member 33 is placed on the front of the clutch drum 32 so as to be capable of moving forward or backwards, and from two sealing rings a12 and a13, an oil-tight hydraulic oil chamber 36 is configured between the clutch drum 32. Further, the cancel plate 34 is prevented from moving towards the front by the snap ring 39 fit to the intermediate shaft 13. The cancel plate 34 has a return spring 35 placed compressed between the piston member 33 placed on the back of the return plate 34, and also comprises an oil tight canceling oil chamber 37 by two sealing rings a12 and a14.

Also, an outer friction plate of the friction plate 31 is splined to the inner circumferential side of the front edge portion of the clutch drum 32, and also the inner friction plate thereof is splined to the hub member 152. In other words, when this second clutch C-2 is engaged, the input rotation of the above-mentioned intermediate shaft 13 is output to the hub member 152. This hub member 152 is linked to the carrier plate on the back side of the carrier CR2 of the planetary gear unit PU.

On the other hand, on the carrier plate of the front side of the carrier CR2 of the planetary gear unit PU is linked to the hub member 157 and is also linked to the inner race 112 of the one-way clutch F-1. This one-way clutch F-1 comprises the above-mentioned inner race 112, a sprag mechanism 113, and an outer race 114, and this outer race 114 is linked to the transmission case 3 by the linking member 115, and the rotation thereof is fixed. In the case that the inner race 112 rotates as to the outer race 114, the rotation in only one direction is restricted by the sprag mechanism 113 and is fixed.

The above-mentioned hub member 157 is splined with the inner friction plate of the friction plate 71 of the second brake B-2. This second brake B-2 has a hydraulic servo 70 wherein the side face of the bulkhead member 3c on the back of the transmission case 3 is a cylinder portion, and this hydraulic servo 70 has a piston member 73, a cancel plate 74, and a return spring 75. The piston member 73 is placed on the front of the cylinder portion of the bulkhead member 3c so as to be capable of moving forward or backwards, and from two sealing rings a15 and a16, an oil-tight hydraulic oil chamber 76 is configured between this cylinder portion. Further, the cancel plate 74 is prevented from moving to the front side by the snap ring 79 fit to the transmission case 3. Also, a return spring 75 is placed compressed between the cancel plate 74 and the piston member 73 placed on the front thereof.

The outer friction plate of the friction plate 71 of the second brake B-2 is splined with the inner face of the transmission case 3, that is to say, when this second brake B-2 is retained, the hub member 157 is fixed so as to be incapable of rotating, and the rotation of the carrier CR2 of the above-mentioned planetary gear unit PU is fixed.

This planetary gear unit PU comprises a sun gear S2, a sun gear S3, a carrier CR2, and a ring gear R2 as described above. Of these, the sun gear S3 is supported by the intermediate shaft 13 so as to be capable of rotating, while also being linked to the linking member 102 as described above, and is capable of inputting the reduced speed rotation from the first clutch C-1. Further, the sun gear S2 is supported by the linking member 102 so as to be capable of rotating, and is linked to the linking member 101 as described above, and the reduced speed rotation from the third clutch C-3 or the fourth clutch C-4 or the input rotation is capable of inputting, and is capable of retaining by the first brake B-1. Further, the carrier CR2 is capable of the input rotation from the second clutch C-2 being input, and the rotation in one direction by the one-way clutch F-1 is restricted, and the rotation is capable of fixing the rotation by the second brake B-2.

This carrier CR2 supports the short pinion P3 and the long pinion P4 so as to be capable of rotating, and these pinions P3 and P4 mesh together, and the short pinion P3 meshes with the sun gear S3 and the long pinion P4 meshes with the sun gear S2 and the ring gear R3. Also, this ring gear R3 is linked to the output shaft 15.

Continuing, the oil line configuration of each configuration element will be described.

An oil line that communicates with an oil pump not shown is provided within the boss unit 3b that is extended from the above-mentioned transmission case 3, this oil line is sealed by the sealing rings d1 and d2, and communicates with the oil line c11 that is bored in the radial direction of the input shaft 12. An oil line c12 is bored in the input shaft 12, communicating with the oil line c11 in the radial direction. Further, on the back side of the input shaft 12, multiple oil lines are bored that pass through from the oil line c12 in the radial direction to the outer circumferential side of the input shaft 12, and the supplied oil is sprayed from these multiple oil lines to the outer circumferential side of the input shaft 12 as a lubricating oil. Thus, each of the members within the transmission case 3, that is to say, each gear of the planetary gear DP and the various members of the first clutch C-1 and the like are lubricated. For example, the oil within the cancel oil chamber 27 of the first clutch C-1 is also supplied similarly as is the lubricating oil, and in the case of being discharged, lubricates the various members within the transmission case 3 by merging with other lubricating oil.

Further, an oil line c21 that communicates with an unshown oil pressure control device is bored in the above-mentioned boss unit 3b, and this oil line c21 is sealed between the boss unit 3b and the linking member 140 with the sealing rings d3 and d4, and further is sealed between this linking member 140 and the clutch drum 22 of the first clutch C-1 by the sealing rings d5 and d6, and communicates with the hydraulic oil chamber 26. In other words, when the hydraulic oil pressure of the first clutch C-1 is supplied from the unshown oil pressure control device to the oil line c21, it is supplied to the hydraulic oil chamber 26 of the hydraulic servo 20 of the first clutch C-1.

On the other hand, oil lines c41 and c51 that communicate with the unshown oil pressure control device are bored within the center support wall 120. This oil line c41 is sealed between the center support wall 120 and the clutch drum 42 of the third clutch C-3 with the sealing rings d7 and d8, and communicates with the hydraulic oil chamber 46. Further, this oil line c51 is sealed between the center support wall 120 and the clutch drum 52 of the fourth clutch C-4 with the sealing rings d9 and d10, and communicates with the hydraulic oil chamber 56. In other words, when the hydraulic oil pressure of the third clutch C-3 is supplied from the unshown oil pressure control device to the oil line c41, and the hydraulic oil pressure of the fourth clutch C-4 is supplied to the oil line c51, it is supplied to the hydraulic oil chamber 46 of the hydraulic servo 40 of the third clutch C-3 and the hydraulic oil chamber 56 of the hydraulic servo 50 of the fourth clutch C-4, respectively.

Further, an unshown oil line that communicates with the unshown oil pressure control device is bored in the bulkhead member 3c of the above-mentioned transmission case 3, and this oil line is sealed between the bulkhead member 3c and the output shaft 15 with the sealing rings d11 and d12, and communicates with the oil line c31. Further, this oil line c31 is sealed between the intermediate shaft 13 and the output shaft 15 with the sealing ring d13, and communicates with the oil line c32 that is bored within the intermediate shaft 13 in the axial direction, and further the oil line c32 communicates with the oil line c33 that is bored in the intermediate shaft 13 in the radial direction, and communicates with the hydraulic oil chamber 36. In other words, when the hydraulic oil pressure of the second clutch C-2 is supplied from the unshown oil pressure control device to the oil line c31, it is supplied to the hydraulic oil chamber 36 of the hydraulic servo 30 of the second clutch C-2.

Now, the hydraulic oil pressure is supplied from the oil pressure control device to the hydraulic oil chamber 66 of the hydraulic servo 60 of the first brake B-1 by the unshown oil line via the support wall 120 from the transmission case 3, and further, the hydraulic oil pressure is supplied from the oil pressure control device to the hydraulic oil chamber 76 of the hydraulic servo 70 of the second brake B-2 by the unshown oil line from the transmission case 3.

As in the above, according to the automatic transmission $1_1$ relating to the present invention, the hydraulic servo 50 of the fourth clutch C-4 is placed between the axial direction of the planetary gear unit PU and the planetary gear DP, and the hydraulic servos 20 and 40 of the first and third clutches C-1 and C-3 are placed on the side opposite from the planetary gear unit PU in the axial direction as to the hydraulic servo 50 of the fourth clutch C-4, and the input shaft 12 and the fourth clutch C-4 are linked via the linking member 140 that passes by the outer circumferential side of the first and third clutches C-1 and C-3, and the first and third clutches C-1 and C-3 are each linked to the sun gears S2 and S3 of the planetary gear unit PU via the linking members 101 and 102 that pass through the inner circumferential side of the fourth clutch C-4. The members that link the various clutches and the various rotation elements of the planetary gear PU are thus prevented from clashing, and while the linking member 140 that rotates from the input rotation (in other words, not rotated at an increased speed nor does the transmitting torque increase) can be placed on the outer circumferential side, the linking members 101 and 102 that have the possibility of greatly accelerating rotation can be placed on the inner circumferential side. Thus, the thickness of the various linking members that linked these clutches and the various rotation elements of the planetary gear unit PU can be designed to be made relatively thin and lightweight, and an automatic transmission $1_1$ that is more lightweight with improved controllability can be designed. Further, the linking member 140 that rotates from the input rotation can be placed on the outer circumferential side, and so an input rotation count sensor that detects the number of input rotations can be easily affixed.

Also, the hydraulic oil is supplied from the oil line c51 that is provided on the support wall 120 to the hydraulic servo 50 of the fourth clutch C-4, and so the number of sealing rings can be reduced compared to the case wherein the hydraulic oil is supplied from the input shaft 12 (or the intermediate shaft 13) via the linking member 101 and the linking member 102. Thus, efficiency improvements of the automatic transmission $1_1$ due to the decrease in sliding resistance by the sealing rings, decrease in hydraulic oil leaking from the sealing rings, and preventing decrease of controllability, are enabled.

Further, the clutch drum 52 of the hydraulic servo 50 of the fourth clutch C-4 is open toward the planetary gear DP side, and so the member that outputs the rotation of the fourth clutch C-4 and the linking member 140 can be prevented from clashing.

Also, the input rotation from the fourth clutch C-4 and the reduced speed rotation from the third clutch C-3 can be transmitted to the sun gear S2, both using the linking member 101. Thus, the number of parts can be reduced and the automatic transmission $1_1$ can be designed to be more lightweight and compact.

Further, the first brake B-1 is linked to the linking member 101 via the hub member 156 that passes between the axial direction of the fourth clutch C-4 and the planetary gear unit PU, and so the rotation of the sun gear S2 of the planetary gear unit PU can be fixed, and the linking member 140 and the hub member 156 can be prevented from clashing.

Further, the hydraulic servo 40 of the third clutch C-3 is placed between the axial direction of the planetary gear DP and the hydraulic servo 50 of the fourth clutch C-4, and so the hydraulic servo 40 of the third clutch C-3 and the hydraulic servo 50 of the fourth clutch C-4 can be placed closer together, and the member that transmits a relatively large torque that links the fourth clutch C-4 and the third clutch C-3 (particularly the member for linking from the third clutch C-3 to the linking member 101) can be shortened. Thus an automatic transmission $1_1$ that is more lightweight or has improved controllability can be designed. Further, the hydraulic oil is supplied to the hydraulic servo 40 of the third clutch C-3 via the oil line c41 that is provided on the support wall 120, and so the number of sealing rings can be reduced compared to the case wherein for example, the hydraulic oil is supplied from the oil line provided on the boss unit 3b that extends from the case 3 or the input shaft 12 via the member that relatively rotates such as the linking member 140. Thus, an automatic transmission $1_1$ with improved efficiency and improved controllability can be designed.

Further, the hydraulic servo 20 of the first clutch C-1 is placed on the side opposite from the hydraulic servo 40 of the third clutch C-3 in the axial direction as to the planetary gear DP and on the boss unit 3b that extends from the case 3, and the hydraulic oil is supplied to the hydraulic servo 20 of the first clutch C-1 from the oil line c21 provided within the boss unit 3b, and so the length of the oil line to the hydraulic oil chamber 26 can be shortened compared to the case wherein the hydraulic oil is supplied via the input shaft 12, and the oil pressure control response can be improved. Particularly, the first clutch C-1 is a clutch that is engaged at the time of switching from the neutral range to the driving range, so the response regarding switching to the driving state can be improved. Further, the first clutch C-1 is on the side opposite from the third and fourth clutches C-3 and C-4 in the axial direction as to the planetary gear DP, in other words the clutch placed on the boss unit 3b is only the first clutch C-1. Multiple oil lines being provided concentrated within the boss unit 3b can thus be prevented, and the area of the various oil lines within the boss unit 3b can be sufficiently secured, and so the pipe resistance of the hydraulic oil can be reduced. Thus, the hydraulic oil response that supplies to the first clutch C-1 can be improved.

Further, the hydraulic servo 30 of the second clutch C-2 is placed on the side opposite from the planetary gear DP in the axial direction as to the planetary gear unit PU, and so multiple oil lines being provided concentrated within the boss unit 3b or on the support wall 120 can be prevented.

Also as described above, the forward first speed is achieved by engaging the first clutch C-1 and also retaining the one-way clutch F-1 (or the second brake B-2), the forward second speed achieved by engaging the first clutch C-1 and by also retaining the first brake B-1, the forward third speed achieved by engaging the first clutch C-1 and the third clutch C-3, the forward fourth speed achieved by engaging the first clutch C-1 and the fourth clutch C-4, the forward fifth speed achieved by engaging the first clutch C-1 and the second clutch C-2, the forward sixth speed achieved by engaging the second clutch C-2 and the fourth clutch C-4, the forward seventh speed achieved by engaging the second clutch C-2 and the third clutch C-3, the forward eighth speed achieved by engaging the second clutch C-2 and by also retaining the first brake B-1, and the reverse speed achieved by engaging the third clutch C-3 or the fourth clutch C-4 and by also retaining the second brake B-2.

Second Embodiment

Figure 5:
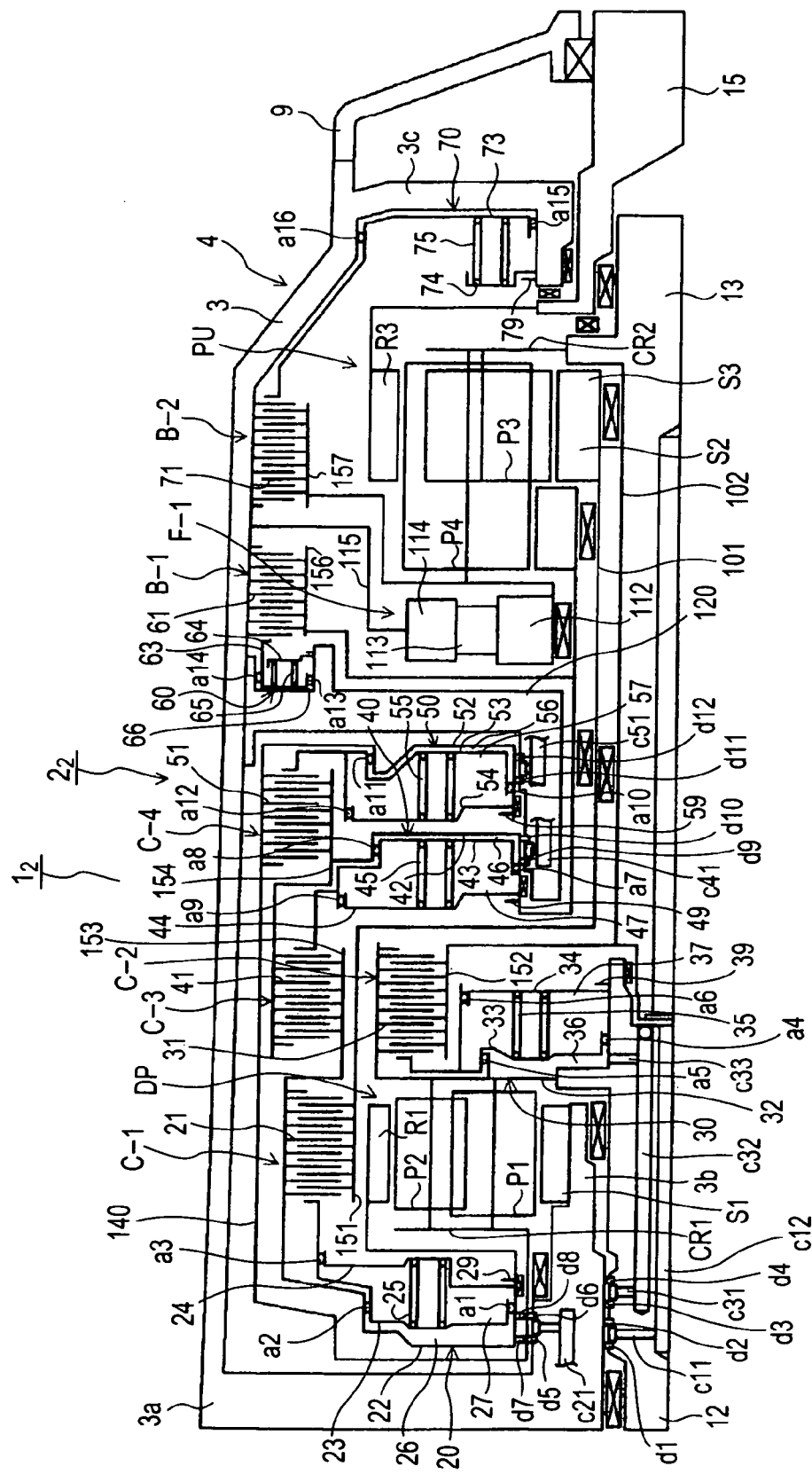
FIG. 5 is a cross-sectional diagram illustrating an automatic transmission relating to a second embodiment.

Next, a second embodiment wherein a portion of the above-mentioned first embodiment has been changed will be described, following FIG. 5. FIG. 5 is a cross-sectional diagram illustrating the automatic transmission $1_2$ relating to the second embodiment. With the second embodiment to be described below, the portions that have a similar configuration as the automatic transmission $1_1$ according to the first embodiment will have the same reference numerals, and the description thereof will be omitted.

The automatic transmission $1_2$ relating to the present second embodiment comprises a speed shifting mechanism $2_2$, and this speed shifting mechanism $2_2$ has a second clutch C-2 and the hydraulic servo 30 thereof that are placed between the axial direction of the planetary gear DP and the planetary gear unit PU as to the speed shifting mechanism $2_1$ of the automatic transmission $1_1$ relating to the first embodiment, and specifically, the hydraulic servo 30 of the second clutch C-2 is placed between the axial direction of planetary gear DP and the hydraulic servo 40 of the third clutch C-3. In other words, the hydraulic servo 30 of this second clutch C-2 is placed on the outer circumferential side of the back edge of the input shaft 12 and is also on the inner circumferential side of the friction plate 41 of the third clutch C-3. Also, the clutch drum 32 thereof is linked to the input shaft 12. Further, the hub member 152 that is splined with the inner friction plate of the friction plate 31 of the second clutch C-2 is linked to the intermediate shaft 13. The intermediate shaft 13 of the present embodiment is provided as to the input shaft 12 so as to be capable of rotating. In other words the intermediate shaft 13 becomes a linking member for the purpose of transmitting the rotation of the hub member 152 to the carrier CR2 of the planetary gear unit PU.

Continuing, the oil line configuration of the various configuration elements in the present embodiments will be described.

An oil line that communicates with an oil pump not shown is provided within the boss unit 3b that extends from the above-mentioned transmission case 3, and this oil line is sealed by the sealing rings d1 and d2, and communicates with the oil line c11 that is bored in the input shaft 12 in the radial direction. The input shaft 12 has an oil line c12 bored in the axial direction, and also communicates with the oil line c11 in the radial direction. Also, on the back side of the input shaft 12, multiple unshown oil lines are bored that pass through from the oil line c12 to the outer circumferential side of the input shaft 12 in the radial direction, and the supplied oil is sprayed from these multiple oil lines to the outer circumferential side of the input shaft 12 as lubricating oil. Thus, the various members within the transmission case 3, in other words the various gear of the planetary gear DP and the various members of the first clutch C-1 and the second clutch C-2, are lubricated. Now, for example, the oil within the cancel oil chamber 27 of the first clutch C-1 and within the cancel oil chamber 37 of the second clutch C-2 is supplied similarly to the lubricating oil, and in the case of being discharged, lubricates the various members within the transmission case 3 by merging with other lubricating oil.

Further, an oil line that communicates with an unshown oil pressure control device is bored in the above-mentioned boss unit 3b, and this oil line is sealed between the boss unit 3b and the input shaft 12 with the sealing rings d3 and d4, and communicates with the oil line c31 bored in the input shaft 12 in the radial direction. This oil line c31 communicates with the oil line c32 that is bored in the input shaft 12 in the axial direction, that is to say bored parallel to the above-mentioned oil line c12, and this oil line c32 communicates with the oil line c33 that is bored at the back edge side of the input shaft 12 in the radial direction. Also, this oil line c33 communicates with the hydraulic oil chamber 36. In other words, when the hydraulic oil pressure of the second clutch C-2 is supplied from the oil pressure control device to the oil line c31, it is supplied to the hydraulic oil chamber 36 of the hydraulic servo 30 of the second clutch C-2.

Further, an oil line c21 that communicates with an unshown oil pressure control device is bored in the above-mentioned boss unit 3b, and this oil line c21 is sealed between the boss unit 3b and the linking member 140 with the sealing rings d5 and d6, and further is sealed between this linking member 140 and the clutch drum 22 of the first clutch C-1 by the sealing rings d7 and d8, and communicates with the hydraulic oil chamber 26. In other words, when the hydraulic oil pressure of the first clutch C-1 is supplied from the unshown oil pressure control device to the oil line c21, it is supplied to the hydraulic oil chamber 26 of the hydraulic servo 20 of the first clutch c21.

On the other hand, oil lines c41 and c51 that communicate with the unshown oil pressure control device are bored within the support wall 120. This oil line c41 is sealed between the support wall 120 and the clutch drum 42 of the third clutch C-3 with the sealing rings d0 and d10, and communicates with the hydraulic oil chamber 46. Further, this oil line c51 is sealed between the support wall 120 and the clutch drum 52 of the fourth clutch C-4 with the sealing rings d11 and d12, and communicates with the hydraulic oil chamber 56. In other words, when the hydraulic oil pressure of the third clutch C-3 is supplied from the unshown oil pressure control device to the oil line c41, and the hydraulic oil pressure of the fourth clutch C-4 is supplied to the oil line c51, it is supplied to the hydraulic oil chamber 46 of the hydraulic servo 40 of the third clutch C-3 and the hydraulic oil chamber 56 of the hydraulic servo 50 of the fourth clutch C-4, respectively.

Now, the hydraulic oil pressure is supplied from the oil pressure control device to the hydraulic oil chamber 66 of the hydraulic servo 60 of the first brake B-1 by the unshown oil line via the support wall 120 from the transmission case 3, and further, the hydraulic oil pressure is supplied from the oil pressure control device to the hydraulic oil chamber 76 of the hydraulic servo 70 of the second brake B-2 by the unshown oil line from the transmission case 3.

As in the above, according to the automatic transmission $1_2$ relating to the present invention, the hydraulic servo 50 of the fourth clutch C-4 is placed between the axial direction of the planetary gear unit PU and the planetary gear DP, and the hydraulic servos 20 and 40 of the first and third clutches C-1 and C-3 are placed on the side opposite from the planetary gear unit PU in the axial direction as to the hydraulic servo 50 of the fourth clutch C-4, and the input shaft 12 and the fourth clutch C-4 are linked via the linking member 140 that passes by the outer circumferential side of the first and third clutches C-1 and C-3, and the first and third clutches C-1 and C-3 are each linked to the sun gears S2 and S3 of the planetary gear unit PU via the linking members 101 and 102 that pass through the inner circumferential side of the fourth clutch C-4. The members that link the various clutches and the various rotation elements of the planetary gear PU are thus prevented from clashing, and while the linking member 140 that rotates from the input rotation (in other words, not rotated at an increased speed nor does the transmitting torque increase) can be placed on the outer circumferential side, the linking members 101 and 102 that have the possibility of greatly accelerating rotation can be placed on the inner circumferential side. Thus, the thickness of the various linking members that linked these clutches and the various rotation elements of the planetary gear unit PU can be designed to be made relatively thin and lightweight, and an automatic transmission $1_2$ that is more lightweight with improved controllability can be designed. Further, the linking member 140 that rotates from the input rotation can be placed on the outer circumferential side, and so an input rotation count sensor that detects the number of input rotations can be easily affixed.

Also, the hydraulic oil is supplied from the oil line c51 that is provided on the support wall 120 to the hydraulic servo 50 of the fourth clutch C-4, and so the number of sealing rings can be reduced compared to the case, wherein the hydraulic oil is supplied from the input shaft 12 (or the intermediate shaft 13) via the linking member 101 and the linking member 102. Thus, efficiency improvements of the automatic transmission 12 due to the decrease in sliding resistance by the sealing rings, decrease in hydraulic oil leaking from the sealing rings, and preventing decrease of controllability, is enabled.

Further, the clutch drum 52 of the hydraulic servo 50 of the fourth clutch C-4 is open toward the planetary gear DP side, and so the member that outputs the rotation of the fourth clutch C-4 and the linking member 140 can be prevented from clashing.

Also, the input rotation from the fourth clutch C-4 and the reduced speed rotation from the third clutch C-3 can be transmitted to the sun gear S2, both using the linking member 101. Thus, the number of parts can be reduced and the automatic transmission 12 can be designed to be more lightweight and compact.

Further, the first brake B-1 is linked to the linking member 101 via the hub member 156 that passes between the axial direction of the fourth clutch C-4 and the planetary gear unit PU, and so the rotation of the sun gear S2 of the planetary gear unit PU can be fixed, and the linking member 140 and the hub member 156 can be prevented from clashing.

Further, the hydraulic servo 40 of the third clutch C-3 is placed between the axial direction of the planetary gear DP and the hydraulic servo 50 of the fourth clutch C-4, and so the hydraulic servo 40 of the third clutch C-3 and the hydraulic servo 50 of the fourth clutch C-4 can be placed closer together, and the member that transmits a relatively large torque that links the fourth clutch C-4 and the third clutch C-3 (particularly the member for linking from the third clutch C-3 to the linking member 101) can be shortened. Thus an automatic transmission $1_1$ that is more lightweight or has improved controllability can be designed. Further, the hydraulic oil is supplied to the hydraulic servo 40 of the third clutch C-3 via the oil line c41 that is provided on the support wall 120, and so the number of sealing rings can be reduced compared to the case, wherein for example, the hydraulic oil is supplied from the oil line provided on the boss unit 3b that extends from the case 3 or the input shaft 12 via the member that relatively rotates, such as the linking member 140. Thus, an automatic transmission $1_2$ with improved efficiency and improved controllability can be designed.

Further, the hydraulic servo 20 of the first clutch C-1 is placed on the side opposite from the hydraulic servo 40 of the third clutch C-3 in the axial direction as to the planetary gear DP and on the boss unit 3b that extends from the case 3, and the hydraulic oil is supplied to the hydraulic servo 20 of the first clutch C-1 from the oil line c21 provided within the boss unit 3b, and so the length of the oil line to the hydraulic oil chamber 26 can be shortened compared to the case wherein the hydraulic oil is supplied via the input shaft, and the oil pressure control response can be improved. Further, the first clutch C-1 is on the side opposite from the third and fourth clutches C-3 and C-4 in the axial direction as to the planetary gear DP, in other words the clutch placed on the boss unit 3b is only the first clutch C-1, and so multiple oil lines being provided concentrated within the boss unit can be prevented, and the area of the various oil lines within the boss unit 3b can be sufficiently secured, and so the pipe resistance of the hydraulic oil can be reduced. Thus, response of the hydraulic oil that is supplied to the first clutch C-1 can be improved.

Further, the hydraulic servo 30 of the second clutch C-2 is placed between the axial direction of the planetary gear unit PU and the planetary gear DP, and so the planetary gear unit PU and the output shaft 15 of the automatic transmission $1_2$ can be closer to one another, and a large torque can be transmitted at a relatively low speed, and the member that links the ring gear R3 that makes a high rotation at a relatively reverse speed and the output shaft can be shortened. Thus, an automatic transmission $1_2$ with reduced weight and improved controllability can be designed. Further, this planetary gear unit PU can be placed closer to the supporting unit (in other words the portion supported by the output shaft 15) of the shaft wherein the planetary gear unit PU is placed (in other words the intermediate shaft 13), and the gear positions can be stabilized.

Further, the hydraulic servo 30 of the second clutch C-2 is placed between the axial direction of the third clutch C-3 and the planetary gear unit PU, and so can be placed between the axial direction of the planetary gear set and the speed reduction planetary gear. Therefore, the second clutch C-2, which has a relatively small volume, can be placed on the inner circumferential side of the friction plate 41 of the third clutch C-3, and so the shaft length of the automatic transmission $1_2$ can be shortened. Further, the member that inputs the input rotation into the planetary gear DP and the clutch drum 32 of the second clutch C-2 can be made to have commonality and so the shaft length of the automobile automatic transmission $1_2$ can be shortened.

Also, the forward first speed is achieved by engaging the first clutch C-1 and also retaining the one-way clutch F-1 (or the second brake B-2), the forward second speed achieved by engaging the first clutch C-1 and by also retaining the first brake B-1, the forward third speed achieved by engaging the first clutch C-1 and the third clutch C-3, the forward fourth speed achieved by engaging the first clutch C-1 and the fourth clutch C-4, the forward fifth speed is achieved engaging the first clutch C-1 and the second clutch C-2, the forward sixth speed achieved by engaging the second clutch C-2 and the fourth clutch C-4, the forward seventh speed achieved by engaging the second clutch C-2 and the third clutch C-3, the forward eighth speed achieved by engaging the second clutch C-2 and by also retaining the first brake B-1, and the reverse speed achieved by engaging the third clutch C-3 or the fourth clutch C-4 and by also retaining the second brake B-2.

Third Embodiment

Figure 6:
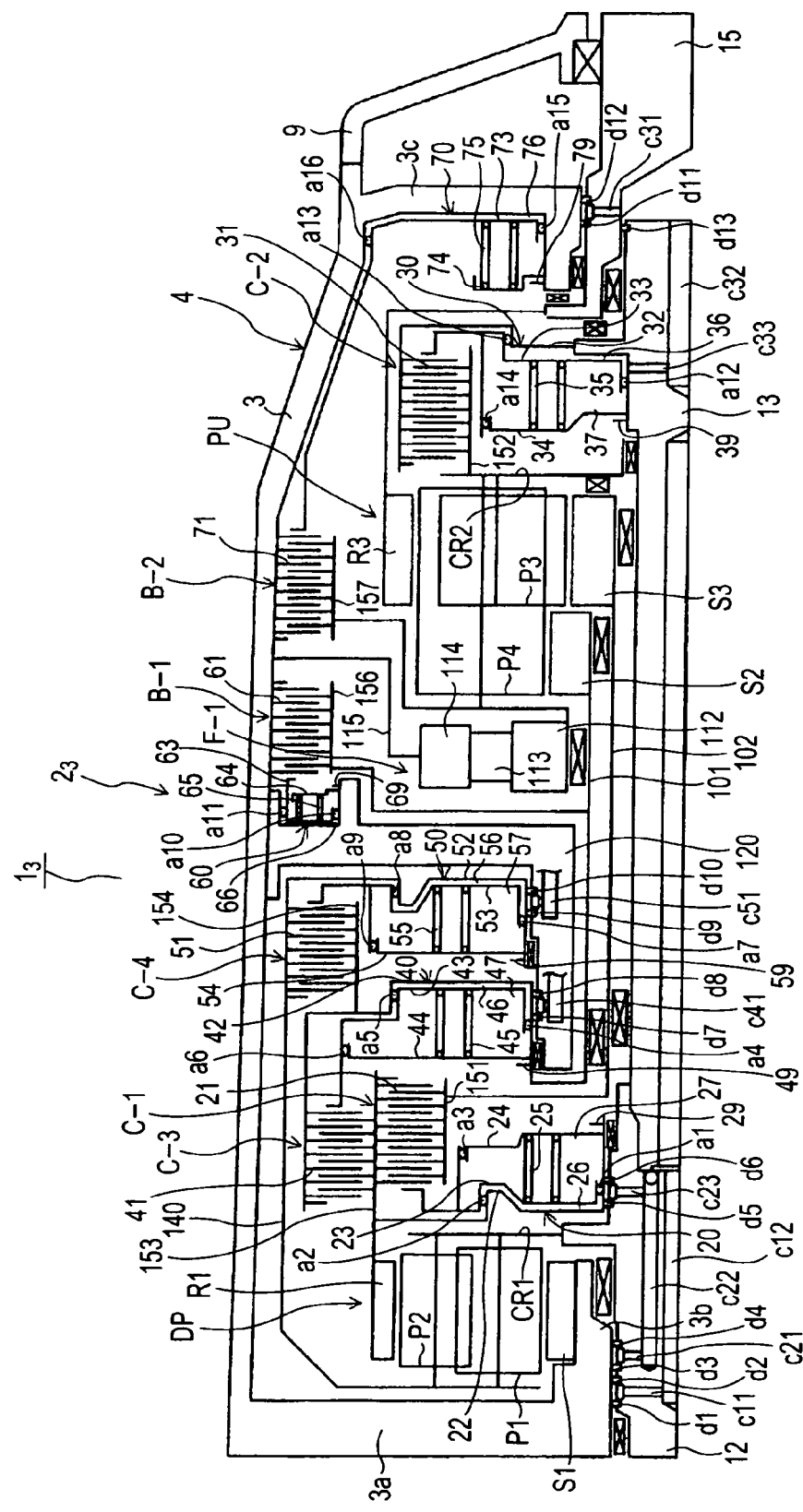
FIG. 6 is a cross-sectional diagram illustrating an automatic transmission relating to a third embodiment.

Next, a third embodiment wherein a portion of the above-mentioned first embodiment has been changed will be described, following FIG. 6. FIG. 6 is a cross-sectional diagram illustrating the automatic transmission 13 relating to the third embodiment. With the third embodiment to be described below, the portions that have a similar configuration as the automatic transmission $1_1$ relating to the first embodiment will have the same reference numerals, and the description thereof will be omitted.

The automatic transmission $1_3$ relating to the present third embodiment comprises a speed shifting mechanism $2_3$, and this speed shifting mechanism $2_3$ has a first clutch C-1 and the hydraulic servo 20 thereof that are placed between the axial direction of the planetary gear DP and the planetary gear unit PU as to the speed shifting mechanism $2_1$ of the automatic transmission $1_1$ relating to the first embodiment, and specifically, the hydraulic servo 20 of the first clutch C-1 is placed between the axial direction of the planetary gear DP and the hydraulic servo 40 of the third clutch C-3. In other words, the hydraulic servo 20 of this first clutch C-1 is placed on the outer circumferential side of the back edge of the input shaft 12, and also the clutch drum 22 thereof is support so as to be capable of rotating on the input shaft 12. Further, the outer circumferential side of the front edge of the clutch drum 22 of the first clutch C-1 is splined with the inner friction plate of the friction plate 41 of the third clutch C-3. In other words, this is in the form wherein the role as the hub member 153 is also fulfilled, and the friction plate 41 of the third clutch C-3 is placed so as to be overlapped on the outer circumferential side of the friction plate 21 of the first clutch C-1.

Continuing, the oil line configuration of the various configuration elements in the present embodiments will be described.

An oil line that communicates with the oil pump not shown is provided within the boss unit 3b that extends from the above-mentioned transmission case 3, and this oil line is sealed by the sealing rings d1 and d2, and communicates with the oil line c11 that is bored in the input shaft 12 in the radial direction. The input shaft 12 has an oil line c12 bored in the axial direction, and also communicates with the oil line c11 in the radial direction. Also, on the back side of the input shaft 12, multiple unshown oil lines are bored that pass through from the oil line c12 to the outer circumferential side of the input shaft 12 in the radial direction, and the supplied oil is sprayed from these multiple oil lines to the outer circumferential side of the input shaft 12 as lubricating oil. Thus, the various members within the transmission case 3, in other words the various gears of the planetary gear DP and the various members and so forth of the first clutch C-1, are lubricated. Now, for example, the oil within the cancel oil chamber 27 of the first clutch C-1 is supplied similarly to the lubricating oil, and in the case of being discharged, lubricates the various members within the transmission case 3 by merging with other lubricating oil.

Further, an unshown oil line that communicates with an unshown oil pressure control device is bored in the above-mentioned boss unit 3b, and this oil line is sealed between the boss unit 3b and the input shaft 12 with the sealing rings d3 and d4, and communicates with the oil line c21 bored in the input shaft 12 in the radial direction. This oil line c21 communicates with the oil line c22 that is bored in the input shaft 12 in the axial direction, that is to say bored parallel to the above-mentioned oil line c12, and this oil line c22 communicates with the oil line c23 that is bored at the back edge side of the input shaft 12 in the radial direction. Also, this oil line c23 is sealed between the input shaft 12 and the clutch drum 22 of the first clutch C-1 by the sealing rings d5 and d6, and communicates with the hydraulic oil chamber 26. In other words, when the hydraulic oil pressure of the first clutch C-1 is supplied from the unshown oil pressure control device to the oil line c21, it is supplied to the hydraulic oil chamber 26 of the hydraulic servo 20 of the first clutch C-1.

On the other hand, oil lines c41 and c51 that communicate with the unshown oil pressure control device are bored within the support wall 120. This oil line c41 is sealed between the support wall 120 and the clutch drum 42 of the third clutch C-3 with the sealing rings d7 and d8, and communicates with the hydraulic oil chamber 46. Further, this oil line c51 is sealed between the support wall 120 and the clutch drum 52 of the fourth clutch C-4 with the sealing rings d9 and d10, and communicates with the hydraulic oil chamber 56. In other words, when the hydraulic oil pressure of the third clutch C-3 is supplied from the unshown oil pressure control device to the oil line c41, and the hydraulic oil pressure of the fourth clutch C-4 is supplied to the oil line c51, it is supplied to the hydraulic oil chamber 46 of the hydraulic servo 40 of the third clutch C-3 and the hydraulic oil chamber 56 of the hydraulic servo 50 of the fourth clutch C-4, respectively.

Also, an unshown oil line that communicates with the unshown oil pressure control device is bored in the bulkhead member 3c of the above-mentioned transmission case 3, and this oil line is sealed between the bulkhead member 3c and the output shaft 15 with the sealing rings d11 and d12, and communicates with the oil line c31. Further, this oil line c31 is sealed between the intermediate shaft 13 and the output shaft 15 with the sealing ring d13, and communicates with the oil line c32 that is bored within the intermediate shaft 13 in the axial direction, and further, the oil line c32 communicates with the oil line c33 that is bored in the intermediate shaft 13 in the radial direction, and communicates with the hydraulic oil chamber 36. In other words, when the hydraulic oil pressure of the second clutch C-2 is supplied from the unshown oil pressure control device to the oil line c31, it is supplied to the hydraulic oil chamber 36 of the hydraulic servo 30 of the second clutch C-2.

Now, the hydraulic oil pressure is supplied from the oil pressure control device to the hydraulic oil chamber 66 of the hydraulic servo 60 of the first brake B-1 by the unshown oil line via the center support wall 120 from the transmission case 3, and further, the hydraulic oil pressure is supplied from the oil pressure control device to the hydraulic oil chamber 76 of the hydraulic servo 70 of the second brake B-2 by the unshown oil line from the transmission case 3.

As in the above, according to the automatic transmission $1_3$ relating to the present invention, the hydraulic servo 50 of the fourth clutch C-4 is placed between the axial direction of the planetary gear unit PU and the planetary gear DP, and the hydraulic servos 20 and 40 of the first and third clutches C-1 and C-3 are placed on the side opposite from the planetary gear unit PU in the axial direction as to the hydraulic servo 50 of the fourth clutch C-4, and the input shaft 12 and the fourth clutch C-4 are linked via the linking member 140 that passes by the outer circumferential side of the first and third clutches C-1 and C-3, and the first and third clutches C-1 and C-3 are each linked to the sun gears S2 and S3 via the linking members 101 and 102 that pass through the inner circumferential side of the fourth clutch C-4, and so the members that link the various clutches and the various rotation elements of the planetary gear PU are prevented from clashing, and while the linking member 140 that rotates from the input rotation (in other words, not rotated at an increased speed nor does the transmitting torque increase) can be placed on the outer circumferential side, the linking members 101 and 102 that have the possibility of greatly accelerating rotation can be placed on the inner circumferential side. Thus, the thickness of the various linking members that linked these clutches and the various rotation elements of the planetary gear unit PU can be designed to be made relatively thin and lightweight, and an automatic transmission $1_3$ that is more lightweight with improved controllability can be designed. Further, the linking member 140 that rotates from the input rotation can be placed on the outer circumferential side, and so an input rotation count sensor that detects the number of input rotations can be easily affixed.

Also, the hydraulic oil is supplied from the oil line c51 that is provided on the support wall 120 to the hydraulic servo 50 of the fourth clutch C-4, and so the number of sealing rings can be reduced compared to the case wherein the hydraulic oil is supplied from the input shaft 12 (or the intermediate shaft 13) via the linking member 101 and the linking member 102. Thus, efficiency improvements of the automatic transmission $1_3$ due to the decrease in sliding resistance by the sealing rings, decrease in hydraulic oil leaking from the sealing rings, and preventing decrease of controllability, is enabled.

Further, the clutch drum 52 of the hydraulic servo 50 of the fourth clutch C-4 is open toward the planetary gear DP side, and so the member that outputs the rotation of the fourth clutch C-4 and the linking member 140 can be prevented from clashing.

Also, the input rotation from the fourth clutch C-4 and the reduced speed rotation from the third clutch C-3 can be transmitted to the sun gear S2, both using the linking member 101. Thus, the number of parts can be reduced and the automatic transmission $1_3$ can be designed to be more lightweight and compact.

Further, the first brake B-1 is linked to the linking member 101 via the hub member 156 that passes between the axial direction of the fourth clutch C-4 and the planetary gear unit PU, and so the rotation of the sun gear S2 oaf the planetary gear unit PU can be fixed, and the linking member 140 and the hub member 156 can be prevented from clashing.

Further, the hydraulic servo 20 of the first clutch C-1 is placed between the axial direction of the planetary gear DP and the hydraulic servo 40 of the third clutch C-3, and the hydraulic oil is supplied from the oil line provided within the input shaft 12 to the hydraulic servo 20 of the first clutch C-1, and so the number of sealing rings can be reduced as compared to the case wherein the hydraulic oil is supplied via the members that relatively rotate such as the first linking member 140 from the oil line provided on the boss unit 3b that extends from the case 3, for example. Thus, an automatic transmission $1_1$ that is more efficient or has improved controllability can be designed.

Further, the hydraulic servo 30 of the second clutch C-2 is placed on the side opposite from the planetary gear DP in the axial direction as to the planetary gear unit PU, and so multiple oil lines being provided concentrated within the boss unit 3b or on the support wall 120 can be prevented.

Also, the forward first speed is achieved by engaging the first clutch C-1 and also retaining the one-way clutch F-1 (or the second brake B-2), the forward second speed by engaging the first clutch C-1 and by also retaining the first brake B-1, the forward third speed by engaging the first clutch C-1 and the third clutch C-3, the forward fourth speed by engaging the first clutch C-1 and the fourth clutch C-4, the forward fifth speed by engaging the first clutch C-1 and the second clutch C-2, the forward sixth speed by engaging the second clutch C-2 and the fourth clutch C-4, the forward seventh speed by engaging the second clutch C-2 and the third clutch C-3, the forward eighth speed by engaging the second clutch C-2 and by also retaining the first brake B-1, and the reverse speed by engaging the third clutch C-3 or the fourth clutch C-4 and by also retaining the second brake B-2.

Fourth Embodiment

Figure 7:
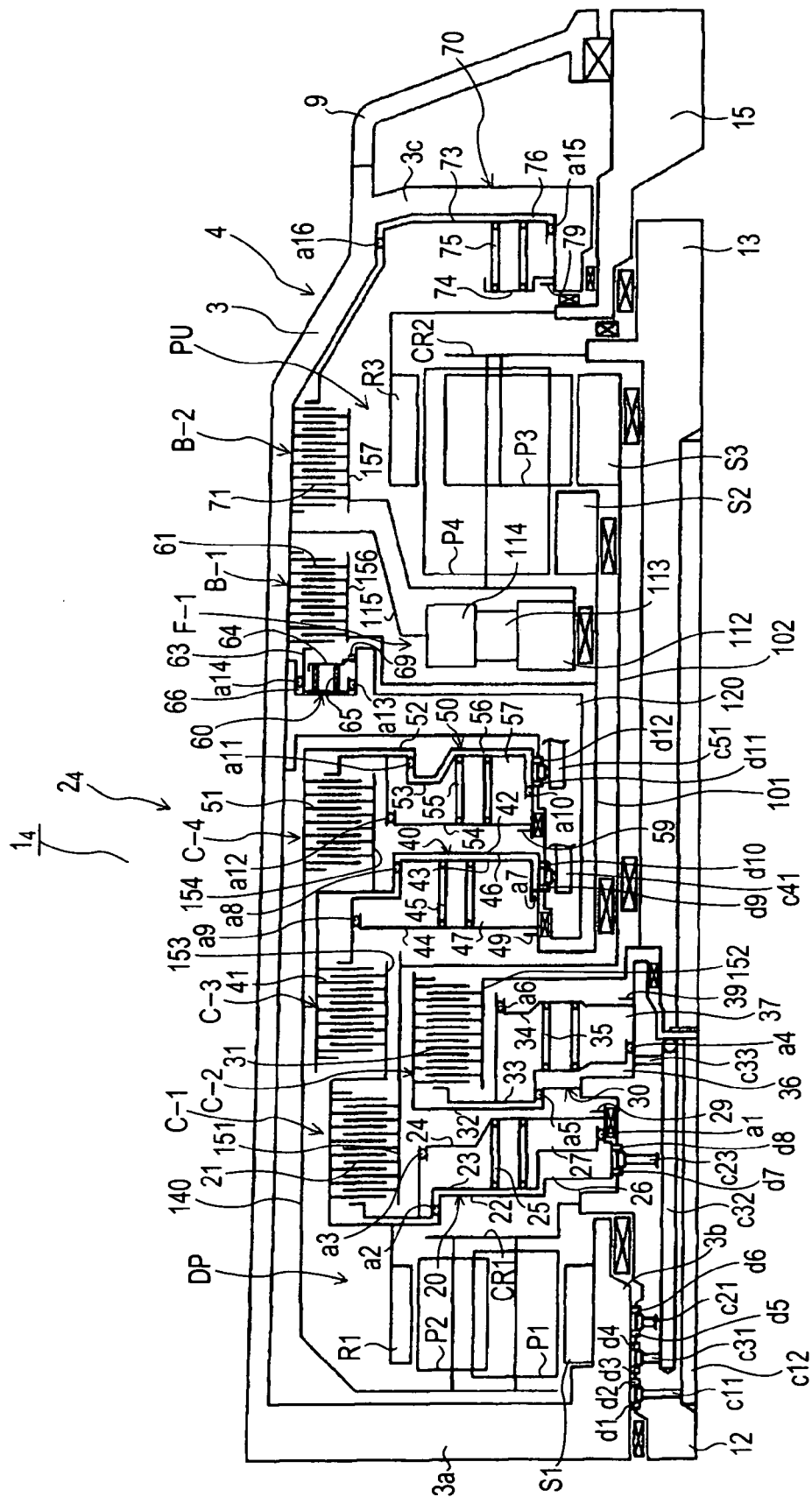
FIG. 7 is a cross-sectional diagram illustrating an automatic transmission relating to a fourth embodiment.

Next, a fourth embodiment wherein a portion of the above-mentioned third embodiment has been changed will be described, following FIG. 7. FIG. 7 is a cross-sectional diagram illustrating the automatic transmission 14 relating to the fourth embodiment. With the fourth embodiment to be described below, the portions that have a similar configuration as the automatic transmission $1_3$ relating to the third embodiment will have the same reference numerals, and the description thereof will be omitted.

The automatic transmission $1_4$ relating to the present fourth embodiment comprises a speed shifting mechanism $2_4$, and this speed shifting mechanism $2_4$ has a second clutch C-2 and the hydraulic servo 30 thereof that are placed between the axial direction of the planetary gear DP and the planetary gear unit PU as to the speed shifting mechanism $2_3$ of the automatic transmission $1_3$ relating to the third embodiment, and specifically, the hydraulic servo 30 of the second clutch C-2 is placed between the axial direction of the hydraulic servo 20 of the first clutch C-1 and the hydraulic servo 40 of the third clutch C-3. In other words, the hydraulic servo 30 of this second clutch C-2 is placed on the outer circumferential side of the back edge of the input shaft 12 and is also on the inner circumferential side of the friction plate 41 of the third clutch C-3. Also, the clutch drum 32 thereof is linked to the input shaft 12. Further, the hub member 152 that is splined with the inner friction plate of the friction plate 31 of the second clutch C-2 is linked to the intermediate shaft 13. The intermediate shaft 13 of the present embodiment is provided as to the input shaft 12 so as to be capable of rotating. In other words, the intermediate shaft 13 becomes a linking member for the purpose of transmitting the rotation of the hub member 152 to the carrier CR2 of the planetary gear unit PU. The clutch drum 22 of the first clutch C-1 is linked to the hub member 153 that is splined with the friction plate 41 of the third clutch C-3, similar to the automatic transmission $1_1$ relating to the above-mentioned first embodiment.

Continuing, the oil line, configuration of the various configuration elements in the present embodiments will be described.

An oil line that communicates with the oil pump (not shown) is provided within the boss unit 3b that extends from the above-mentioned transmission case 3, and this oil line is sealed by the sealing rings d1 and d2, and communicates with the oil line c11 that is bored in the input shaft 12 in the radial direction. The input shaft 12 has an oil line c12 bored in the axial direction, and also communicates with the oil line c11 in the radial direction. Also, on the back side of the input shaft 12, multiple unshown oil lines are bored that pass through from the oil line c12 to the outer circumferential side of the input shaft 12 in the radial direction, and the supplied oil is sprayed from these multiple oil lines to the outer circumferential side of the input shaft 12 as lubricating oil. Thus, the various members within the transmission case 3, in other words the various gears of the planetary gear DP and the various members of the first clutch C-1 and the second clutch C-2 are lubricated. Now, for example, the oil within the cancel oil chamber 27 of the first clutch C-1 and within the cancel oil chamber 37 of the second clutch C-2 is supplied similarly to the lubricating oil, and in the case of being discharged, lubricates the various members within the transmission case 3 by merging with other lubricating oil.

Further, an unshown oil line that communicates with an unshown oil pressure control device is bored in the above-mentioned boss unit 3b, and this oil line is sealed between the boss unit 3b and the input shaft 12 with the sealing rings d3 and d4, and communicates with the oil line c31 bored in the input shaft 12 in the radial direction. This oil line c31 communicates with the oil line c32 that is bored in the input shaft 12 in the axial direction, that is to say bored parallel to the above-mentioned oil line c12, and this oil line c32 communicates with the oil line c33 that is bored at the back edge side of the input shaft 12 in the radial direction. Also, this oil line c33 communicates with the hydraulic oil chamber 36. In other words, when the hydraulic oil pressure of the second clutch C-2 is supplied from the unshown oil pressure control device to the oil line c31, it is supplied to the hydraulic oil chamber 36 of the hydraulic servo 30 of the second clutch C-2.

Further, an unshown oil line that communicates with an unshown oil pressure control device is bored in the above-mentioned boss unit 3b, and this oil line is sealed between the boss unit 3b and the input shaft 12 with the sealing rings d5 and d6, and communicates with the oil line c21 bored in the input shaft 12 in the radial direction. This oil line c21 communicates with the oil line c32 that is bored in the input shaft 12 in the axial direction, that is to say communicating with an oil line omitted from the diagram, that is bored in parallel to the above-mentioned oil line c12 and the oil line c32, and this oil line communicates with the oil line c23 that is bored at approximately the middle of the input shaft 12 in the radial direction. Also, this oil line c23 is sealed between the input shaft 12 and the clutch drum 22 of the first clutch C-1 with the sealing rings d7 and d8, and communicates with the hydraulic oil chamber 26. In other words, when the hydraulic oil pressure of the first clutch C-1 is supplied from the oil pressure control device to the oil line c21, it is supplied to the hydraulic oil chamber 26 of the hydraulic servo 20 of the first clutch C-1.

On the other hand, oil lines c41 and c51 that communicate with the unshown oil pressure control device are bored in the support wall 120. This oil line c41 is sealed between the support wall 120 and the clutch drum 42 of the third clutch C-3 with the sealing rings d9 and d10, and communicates with the hydraulic oil chamber 46. Further, this oil line c51 is sealed between the center support wall 120 and the clutch drum 52 of the fourth clutch C-4 with the sealing rings d11 and d12, and communicates with the hydraulic oil chamber 56. In other words, when the hydraulic oil pressure of the third clutch C-3 is supplied from the unshown oil pressure control device to the oil line c41, and the hydraulic oil pressure of the fourth clutch C-4 is supplied to the oil line c51, it is supplied to the hydraulic oil chamber 46 of the hydraulic servo 40 of the third clutch C-3 and the hydraulic oil chamber 56 of the hydraulic servo 50 of the fourth clutch C-4, respectively.

Now, the hydraulic oil pressure is supplied from the oil pressure control device to the hydraulic oil chamber 66 of the hydraulic servo 60 of the first brake B-1 by the unshown oil line via the support wall 120 from the transmission case 3, and further, the hydraulic oil pressure is supplied from the oil pressure control device to the hydraulic oil chamber 76 of the hydraulic servo 70 of the second brake B-2 by the unshown oil line from the transmission case 3.

As in the above, according to the automatic transmission $1_4$ relating to the present invention, the hydraulic servo 50 of the fourth clutch C-4 is placed between the axial direction of the planetary gear unit PU and the planetary gear DP, and the hydraulic servos 20 and 40 of the first and third clutches C-1 and C-3 are placed on the side opposite from the planetary gear unit PU in the axial direction as to the hydraulic servo 50 of the fourth clutch C-4, and the input shaft 12 and the fourth clutch C-4 are linked via the linking member 140 that passes by the outer circumferential side of the first and third clutches C-1 and C-3, and the first and third clutches C-1 and C-3 are each linked to the sun gears S2 and S3 of the planetary gear unit PU via the linking members 101 and 102 that pass through the inner circumferential side of the fourth clutch C-4, and so the members that link the various clutches and the various rotation elements of the planetary gear PU are prevented from clashing, and while the linking member 140 that rotates from the input rotation (in other words, not rotated at an increased speed nor does the transmitting torque increase) can be placed on the outer circumferential side, the linking members 101 and 102 that have the possibility of greatly accelerating rotation can be placed on the inner circumferential side. Thus, the thickness of the various linking members that linked these clutches and the various rotation elements of the planetary gear unit PU can be designed to be made relatively thin and lightweight, and an automatic transmission $1_4$ that is more lightweight with improved controllability can be designed. Further, the linking member 140 that rotates from the input rotation can be placed on the outer circumferential side, and so an input rotation count sensor that detects the number of input rotations can be easily affixed.

Also, the hydraulic oil is supplied from the oil line c51 that is provided on the support wall 120 to the hydraulic servo 50 of the fourth clutch C-4, and so the number of sealing rings can be reduced compared to the case wherein the hydraulic oil is supplied from the input shaft 12 (or the intermediate shaft 13) via the linking member 101 and the linking member 102. Thus, efficiency improvements of the automatic transmission 14 due to the decrease in sliding resistance by the sealing rings, decrease in hydraulic oil leaking from the sealing rings, and preventing decrease of controllability, is enabled.

Further, the clutch drum 52 of the hydraulic servo 50 of the fourth clutch C-4 is open toward the planetary gear DP side, and so the member that outputs the rotation of the fourth clutch C-4 and the linking member 140 can be prevented from clashing.

Also, the input rotation from the fourth clutch C-4 and the reduced speed rotation from the third clutch C-3 can be transmitted to the sun gear S2, both using the linking member 101. Thus, the number of parts can be reduced and the automatic transmission 14 can be designed to be more lightweight and compact.

Further, the first brake B-1 is linked to the linking member 101 via the hub member 156 that passes between the axial direction of the fourth clutch C-4 and the planetary gear unit PU, and so the rotation of the sun gear S2 of the planetary gear unit PU can be fixed, and the linking member 140 and the hub member 156 can be prevented from clashing.

Further, the hydraulic servo 20 of the first clutch C-1 is placed between the axial direction of the planetary gear DP and the hydraulic servo 40 of the third clutch C-3, and the hydraulic oil is supplied from the oil line provided within the input shaft 12 to the hydraulic servo 20 of the first clutch C-1, and so the number of sealing rings can be reduced as compared to the case wherein the hydraulic oil is supplied via the members that relatively rotate such as the first linking member 140 from the oil line provided on the boss unit 3b that extends from the case 3, for example. Thus, an automatic transmission 14 that is more efficient or has improved controllability can be designed.

Further, the hydraulic servo 30 of the second clutch C-2 is placed between the axial direction of the planetary gear unit PU and the planetary gear DP, and so the planetary gear unit PU and the output shaft 15 of the automatic transmission 14 can be closer to one another, and a large torque can be transmitted at a relatively low speed, and the member that links the ring gear R3 that makes a high rotation at a relatively reverse speed and the output shaft 15 can be shortened. Thus, an automatic transmission 14 with reduced weight and improved controllability can be designed. Further, this planetary gear unit PU can be placed closer to the supporting unit (in other words the portion supported by the output shaft 15) of the shaft wherein the planetary gear unit PU is placed (in other words the intermediate shaft 13), and the gear positions can be stabilized.

Further, the hydraulic servo 30 of the second clutch C-2 is placed between the axial direction of the hydraulic servo 40 of the third clutch C-3 and the hydraulic servo 20 of the first clutch, and so can be placed between the axial direction of the planetary gear unit PU and the planetary gear DP. Thus, the second clutch C-2 which has a relatively small volume can be placed on the inner circumferential side of the friction plate 41 of the third clutch C-3, and so the shaft length of the automatic transmission 14 can be shortened.

Also, the forward first speed is achieved by engaging the first clutch C-1 and also retaining the one-way clutch F-1 (or the second brake B-2), the forward second speed by engaging the first clutch C-1 and by also retaining the first brake B-1, the forward third speed by engaging the first clutch C-1 and the third clutch C-3, the forward fourth speed by engaging the first clutch C-1 and the fourth clutch C-4, the forward fifth speed by engaging the first clutch C-1 and the second clutch C-2, the forward sixth speed by engaging the second clutch C-2 and the fourth clutch C-4, the forward seventh speed by engaging the second clutch C-2 and the third clutch C-3, the forward eighth speed by engaging the second clutch C-2 and by also retaining the first brake B-1, and the reverse speed by engaging the third clutch C-3 or the fourth clutch C-4 and by also retaining the second brake B-2.

Fifth Embodiment

Figure 8:
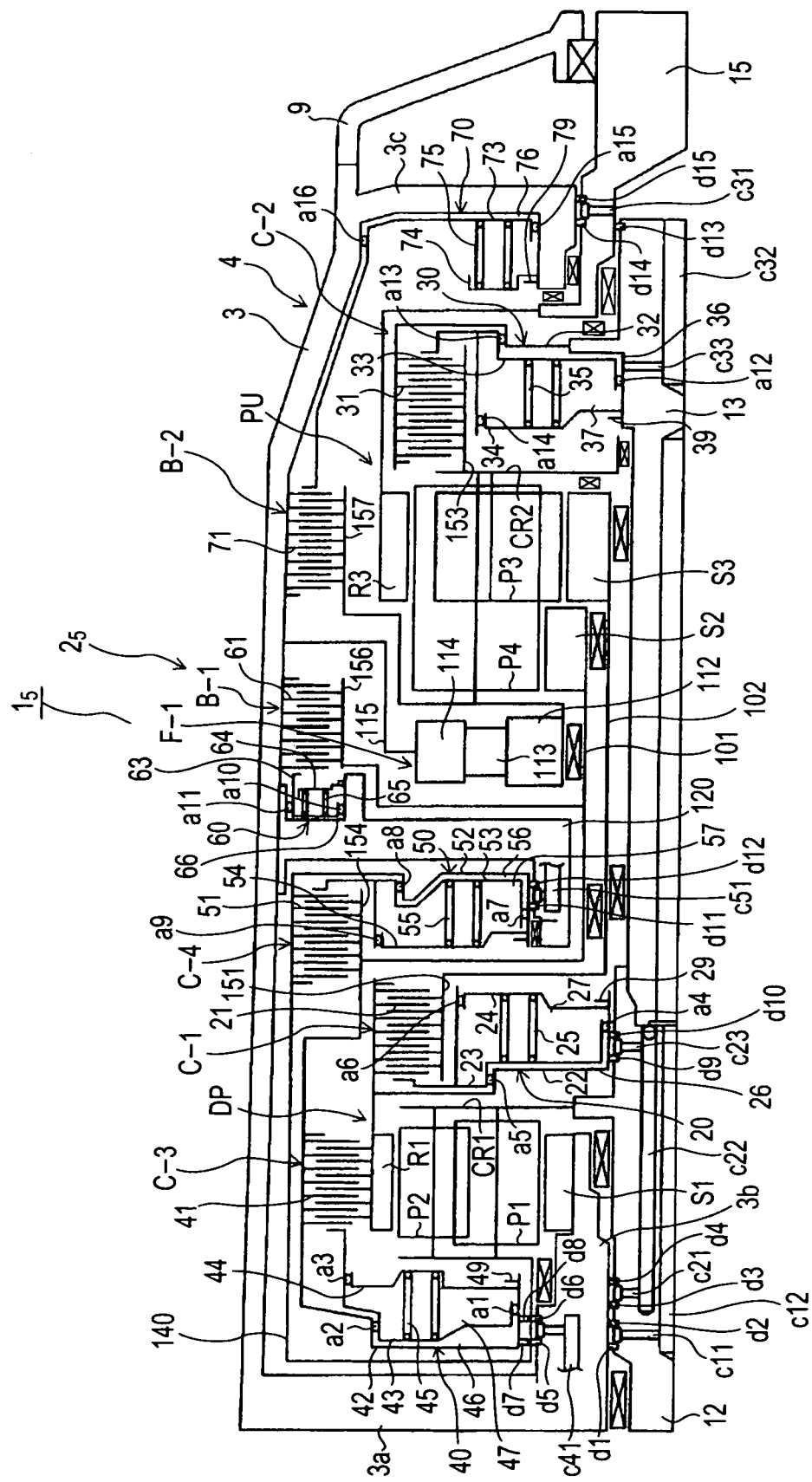
FIG. 8 is a cross-sectional diagram illustrating an automatic transmission relating to a fifth embodiment.

Next, a fifth embodiment wherein a portion of the above-mentioned first embodiment has been changed will be described, following FIG. 8. FIG. 8 is a cross-sectional diagram illustrating the automatic transmission 15 relating to the fifth embodiment. With the fifth embodiment to be described below, the portions that have a similar configuration as the automatic transmission $1_1$ relating to the first embodiment will have the same reference numerals, and the description thereof will be omitted.

The automatic transmission $1_5$ relating to the present fifth embodiment comprises a speed shifting mechanism $2_5$, and this speed shifting mechanism 25 has a hydraulic servo 40 of the third clutch C-3 that is placed on the side opposite from the planetary gear unit PU in the axial direction as to the planetary gear DP, in other words on the front side of the planetary gear DP, as to the speed shifting mechanism $2_1$ of the automatic transmission $1_1$ relating to the first embodiment. Further, the hydraulic servo 20 of the first clutch C-1 is placed between the axial direction of the planetary gear DP and the planetary gear unit PU, and specifically, the hydraulic servo 20 of the first clutch C-1 is placed between the axial direction of the planetary gear DP and the hydraulic servo 50 of the fourth clutch C-4.

In other words, the hydraulic servo 40 of this third clutch C-3 is placed on the boss unit 3b that is extended from the transmission case 3, and the friction plate 41 of the third clutch C-3 is placed so as to be splined to the outer circumferential side of the ring gear R1 of the planetary gear DP. The clutch drum 42 of this third clutch C-3 is extended to the back side and linked to the hub member 154 of the fourth clutch C-4, while also being linked to the linking member 101. Further, the hydraulic servo 20 of the first clutch C-1 is placed on the outer circumferential side of the back edge of the input shaft 12, and the clutch drum 22 thereof is supported on the input shaft 12 so as to be capable of rotating. The clutch drum 22 of this first clutch C-1 is linked on the outer portion of the ring gear R1 of the planetary gear DP.

Continuing, the oil line configuration of the various configuration elements in the present embodiments will be described.

An oil line that communicates with the oil pump (not shown) is provided within the boss unit 3b that extends from the above-mentioned transmission case 3, and this oil line is sealed by the sealing rings d1 and d2, and communicates with the oil line c11 that is bored in the input shaft 12 in the radial direction. The input shaft 12 has an oil line c12 bored in the axial direction, and also communicates with the oil line c11 in the radial direction. Also, on the back side of the input shaft 12, multiple unshown oil lines are bored that pass through from the oil line c12 to the outer circumferential side of the input shaft 12 in the radial direction, and the supplied oil is sprayed from these multiple oil lines to the outer circumferential side of the input shaft 12 as lubricating oil. Thus, the various members within the transmission case 3, in other words the various gears of the planetary gear DP and the various members of the first clutch C-1 are lubricated. Now, for example, the oil within the cancel oil chamber 27 of the first clutch C-1 is also supplied similarly to the lubricating oil, and in the case of being discharged, lubricates the various members within the transmission case 3 by merging with other lubricating oil.

Further, an unshown oil line that communicates with an unshown oil pressure control device is bored in the above-mentioned boss unit 3b, and this oil line is sealed between the boss unit 3b and the input shaft 12 with the sealing rings d3 and d4, and communicates with the oil line c21 bored in the input shaft 12 in the radial direction. This oil line c21 communicates with the oil line c22 that is bored in the input shaft 12 in the axial direction, that is to say bored parallel to the above-mentioned oil line c12, and this oil line c22 communicates with the oil line c23 that is bored at the back edge side of the input shaft 12 in the radial direction. Also, this oil line c23 is sealed between the input shaft 12 and the clutch drum 22 of the first clutch C-1 with the sealing rings d9 and d10, and communicates with the hydraulic oil chamber 26. In other words, when the hydraulic oil pressure of the first clutch C-1 is supplied from the oil pressure control device to the oil line c21, it is supplied to the hydraulic oil chamber 26 of the hydraulic servo 20 of the first clutch C-1.

Also, an oil line c41 that communicates with the unshown oil pressure control device is bored in the above-mentioned boss unit 3b, and this oil line c41 is sealed between the boss unit 3b and the linking member 140 with the sealing rings d5 and d6, and further is sealed between this linking member 140 and the clutch drum 42 of the third clutch C-3 with the sealing rings d7 and d8, and communicates with the hydraulic oil chamber 46. In other words, when the hydraulic oil pressure of the third clutch C-3 is supplied from the unshown oil pressure control device to the oil line c41, it is supplied to the hydraulic oil chamber 46 of the hydraulic servo 40 of the third clutch C-3.

On the other hand, the oil line c51 that communicates with the unshown oil pressure control device is bored in the support wall 120. This oil line c51 is sealed between the support wall 120 and the clutch drum 52 of the fourth clutch C-4 with the sealing rings d11 and d12, and communicates with the hydraulic oil chamber 56. In other words, when the hydraulic oil pressure of the fourth clutch C-4 is supplied from the unshown oil pressure control device to the oil line c51, it is supplied to the hydraulic oil chamber 56 of the hydraulic servo 50 of the fourth clutch C-4.

Also, an unshown oil line that communicates with the unshown oil pressure control device is bored in the bulkhead member 3c of the above-mentioned transmission case 3, and this oil line is sealed between the bulkhead member 3c and the output shaft 15 with the sealing rings d14 and d15, and communicates with the oil line c31. Further, this oil line c31 is sealed between the intermediate shaft 13 and the output shaft 15 with the scaling ring d13, and communicates with the oil line c32 that is bored in the intermediate shaft 13 in the axial direction, and further, the oil line c32 communicates with the oil line c33 that is bored in the intermediate shaft 13 in the radial direction, and communicates with the hydraulic oil chamber 36. In other words, when the hydraulic oil pressure of the second clutch C-2 is supplied from the unshown oil pressure control device to the oil line c31, it is supplied to the hydraulic oil chamber 36 of the hydraulic servo 30 of the second clutch C-2.

Now, the hydraulic oil pressure is supplied from the oil pressure control device to the hydraulic oil chamber 66 of the hydraulic servo 60 of the first brake B-1 by the unshown oil line via the support wall 120 from the transmission case 3, and further, the hydraulic oil pressure is supplied from the oil pressure control device to the hydraulic oil chamber 76 of the hydraulic servo 70 of the second brake B-2 by the unshown oil line from the transmission case 3.

As in the above, according to the automatic transmission 15 relating to the present invention, the hydraulic servo 50 of the fourth clutch C-4 is placed between the axial direction of the planetary gear unit PU and the planetary gear DP, and the hydraulic servos 20 and 40 of the first and third clutches C-1 and C-3 are placed on the side opposite from the planetary gear unit PU in the axial direction as to the hydraulic servo 50 of the fourth clutch C-4, and the input shaft 12 and the fourth clutch C-4 are linked via the linking member 140 that passes by the outer circumferential side of the first and third clutches C-1 and C-3, and the first and third clutches C-1 and C-3 are each linked to the sun gears S2 and S3 of the planetary gear unit PU via the linking members 101 and 102 that pass through the inner circumferential side of the fourth clutch C-4, and so the members that link the various clutches and the various rotation elements of the planetary gear PU are prevented from clashing, and while the linking member 140 that rotates from the input rotation (in other words, not rotated at an increased speed nor does the transmitting torque increase) can be placed on the outer circumferential side, the linking members 101 and 102 that have the possibility of greatly accelerating rotation can be placed on the inner circumferential side. Thus, the thickness of the various linking members that linked these clutches and the various rotation elements of the planetary gear unit PU can be designed to be made relatively thin and lightweight, and an automatic transmission $1_5$ that is more lightweight with improved controllability can be designed. Further, the linking member 140 that rotates from the input rotation can be placed on the outer circumferential side, and so an input rotation count sensor that detects the number of input rotations can be easily affixed.

Also, the hydraulic oil is supplied from the oil line c51 that is provided on the support wall 120 to the hydraulic servo 50 of the fourth clutch C-4, and so the number of sealing rings can be reduced compared to the case wherein the hydraulic oil is supplied from the input shaft 12 (or the intermediate shaft 13) via the linking member 101 and the linking member 102. Thus, efficiency improvements of the automatic transmission $1_5$ due to the decrease in sliding resistance by the sealing rings, decrease in hydraulic oil leaking from the sealing rings, and preventing decrease of controllability, is enabled.

Further, the clutch drum 52 of the hydraulic servo 50 of the fourth clutch C-4 is open toward the planetary gear DP side, and so the member that outputs the rotation of the fourth clutch C-4 and the linking member 140 can be prevented from clashing.

Also, the input rotation from the fourth clutch C-4 and the reduced speed rotation from the third clutch C-3 can be transmitted to the sun gear S2, both using the linking member 101. Thus, the number of parts can be reduced and the automatic transmission 15 can be designed to be more lightweight and compact.

Further, the first brake B-1 is linked to the linking member 101 via the hub member 156 that passes between the axial direction of the fourth clutch C-4 and the planetary gear unit PU, and so the rotation of the sun gear S2 of the planetary gear unit PU can be fixed, and the linking member 140 and the hub member 156 can be prevented from clashing.

Also, the hydraulic servo 40 of the third clutch C-3 is placed on the side opposite from the hydraulic servo 50 of the fourth clutch C-4 in the axial direction as to the planetary gear DP and on the boss unit 3b that extends from the case 3, and the hydraulic oil is supplied to the hydraulic servo 40 of the third clutch C-3 from the oil line c41 provided within the boss unit 3b, and so the hydraulic oil pressure is supplied to the third clutch C-3 so as to be capable of engaging, and the linking of the third clutch C-3 and the linking member 101 is enabled.

Further, the hydraulic servo 20 of the first clutch C-1 is placed between the axial direction of the planetary gear DP and the hydraulic servo 50 of the fourth clutch C-4, and the hydraulic oil is supplied to the hydraulic servo 20 of the first clutch C-1 from the oil line c21 provided within the input shaft 12, and so the hydraulic oil pressure can be supplied to the first clutch C-1 so as to be capable of engaging, and compared to the case of placing the first clutch C-1 on the side opposite of the planetary gear unit PU in the axial direction as to the planetary gear DP, placing the transmitting member that transmits the output rotation of the first clutch C-1 through the outer circumferential side of the planetary gear DP becomes unnecessary, in other words the number of members that pass by the outer circumferential side of the planetary gear DP can be fewer. Thus, a more compact automatic transmission 15 in the radial direction can be designed.

Further, the hydraulic servo 30 of the second clutch C-2 is placed on the side opposite from the planetary gear DP in the axial direction as to the planetary gear unit PU, and so multiple oil lines being provided concentrated within the boss unit 3b or on the support wall 120 can be prevented.

Also, the forward first speed is achieved by engaging the first clutch C-1 and also retaining the one-way clutch F-1 (or the second brake B-2), the forward second speed by engaging the first clutch C-1 and by also retaining the first brake B-1, the forward third speed by engaging the first clutch C-1 and the third clutch C-3, the forward fourth speed by engaging the first clutch C-1 and the fourth clutch C-4, the forward fifth speed by engaging the first clutch C-1 and the second clutch C-2, the forward sixth speed by engaging the second clutch C-2 and the fourth clutch C-4, the forward seventh speed by engaging the second clutch C-2 and the third clutch C-3, the forward eighth speed by engaging the second clutch C-2 and by also retaining the first brake B-1, and the reverse speed by engaging the third clutch C-3 or the fourth clutch C-4 and by also retaining the second brake B-2.

Sixth Embodiment

Figure 9:
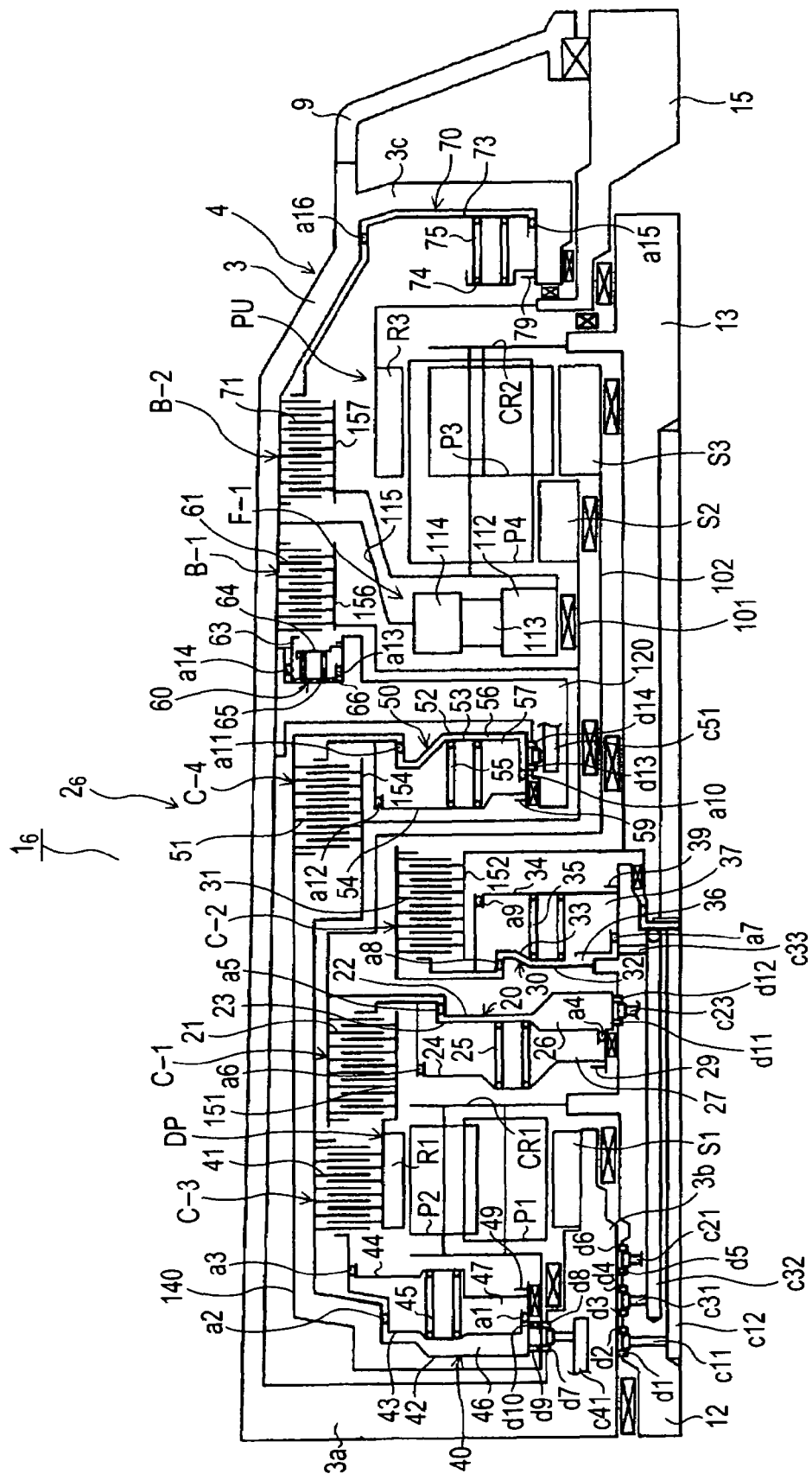
FIG. 9 is a cross-sectional diagram illustrating an automatic transmission relating to a sixth embodiment.

Next, a sixth embodiment wherein a portion of the above-mentioned fifth embodiment has been changed will be described, following FIG. 9. FIG. 9 is a cross-sectional diagram illustrating the automatic transmission $1_6$ relating to the sixth embodiment. With the sixth embodiment to be described below, the portions that have a similar configuration as the automatic transmission 15 relating to the fifth embodiment will have the same reference numerals, and the description thereof will be omitted.

The automatic transmission $1_6$ relating to the present sixth embodiment comprises a speed shifting mechanism $2_6$, and this speed shifting mechanism $2_6$ has a second clutch C-2 and the hydraulic servo 30 thereof that are placed between the axial direction of the planetary gear DP and the planetary gear unit PU as to the speed shifting mechanism $2_5$ of the automatic transmission $1_5$ relating to the fifth embodiment, and specifically, the hydraulic servo 30 of the second clutch C-2 is placed between the axial direction of the hydraulic servo 30 of the second clutch C-2 and the hydraulic servo 50 of the fourth clutch C-4. In other words, the hydraulic servo 30 of this second clutch C-2 is placed on the outer circumferential side of the back edge of the input shaft 12, and the clutch drum 32 thereof is linked to the input shaft 12. Further, the hub member 152 that is splined with the inner friction plate of the friction plate 31 of the second clutch C-2 is linked to the intermediate shaft 13. The intermediate shaft 13 of the present embodiment is provided as to the input shaft 12 so as to be capable rotating. In other words the intermediate shaft 13 becomes a linking member for the purpose of transmitting the rotation of the hub member 152 to the carrier CR2 of the planetary gear unit PU. Further, the clutch drum 22 of the first clutch C-1 is placed open towards the planetary gear DP side (the front side), and the hub member 151 that is splined with the inner circumferential side of the friction plate 21 is linked to the ring gear R1 of the planetary gear DP.

Continuing, the oil line configuration of the various configuration elements in the present embodiments will be described.

An oil line that communicates with the oil pump (not shown) is provided within the boss unit 3b that extends from the above-mentioned transmission case 3, and this oil line is sealed by the sealing rings d1 and d2, and communicates with the oil line c11 that is bored in the input shaft 12 in the radial direction. The input shaft 12 has an oil line c12 bored in the axial direction, and also communicates with the oil line c11 in the radial direction. Also, on the back side of the input shaft 12, multiple unshown oil lines are bored that pass through from the oil line c12 to the outer circumferential side of the input shaft 12 in the radial direction, and the supplied oil is sprayed from these multiple oil lines to the outer circumferential side of the input shaft 12 as lubricating oil. Thus, the various members within the transmission case 3, in other words the various gears of the planetary gear DP and the various members of the first clutch C-1 and the second clutch C-2 are lubricated. Now, for example, the oil within the cancel oil chamber 27 of the first clutch C-1 and within the cancel oil chamber 37 of the second clutch C-2 is supplied similarly to the lubricating oil, and in the case of being discharged, lubricates the various members within the transmission case 3 by merging with other lubricating oil.

Further, an unshown oil line that communicates with an unshown oil pressure control device is bored in the above-mentioned boss unit 3b, and this oil line is sealed between the boss unit 3b and the input shaft 12 with the sealing rings d3 and d4, and communicates with the oil line c31 bored in the input shaft 12 in the radial direction. This oil line c31 communicates with the oil line c32 that is bored in the input shaft 12 in the axial direction, that is to say bored parallel to the above-mentioned oil line c12, and this oil line c32 communicates with the oil line c33 that is bored at the back edge side of the input shaft 12 in the radial direction. Also, this oil line c33 communicates with the hydraulic oil chamber 36. In other words, when the hydraulic oil pressure of the second clutch C-2 is supplied from the unshown oil pressure control device to the oil line c31, it is supplied to the hydraulic oil chamber 36 of the hydraulic servo 30 of the second clutch C-2.

Further, an unshown oil line that communicates with an unshown oil pressure control device is bored in the above-mentioned boss unit 3b, and this oil line is sealed between the boss unit 3b and the input shaft 12 with the sealing rings d5 and d6, and communicates with the oil line c21 bored in the input shaft 12 in the radial direction. This oil line c21 communicates with the oil line that is bored in the input shaft 12 in the axial direction, that is to say communicating with an oil line omitted from the diagram, that is bored in parallel to the above-mentioned oil line c12 and the oil line c32, and this oil line communicates with the oil line c23 that is bored slightly behind the middle of the input shaft 12 in the radial direction. Also, this oil line c23 is sealed between the input shaft 12 and the clutch drum 22 of the first clutch C-1 with the sealing rings d11 and d12, and communicates with the hydraulic oil chamber 26. In other words, when the hydraulic oil pressure of the first clutch C-1 is supplied from the unshown oil pressure control device to the oil line c21, it is supplied to the hydraulic oil chamber 26 of the hydraulic servo 20 of the first clutch C-1.

Also, an oil line c41 that communicates with the unshown oil pressure control device is bored in the above-mentioned boss unit 3b, and this oil line c41 is sealed between the boss unit 3b and the linking member 140 with the sealing rings d7 and d8, and further is sealed between this linking member 140 and the clutch drum 42 of the third clutch C-3 with the sealing rings d9 and d10, and communicates with the hydraulic oil chamber 46. In other words, when the hydraulic oil pressure of the third clutch C-3 is supplied from the unshown oil pressure control device to the oil line c41, it is supplied to the hydraulic oil chamber 46 of the hydraulic servo 40 of the third clutch C-3.

On the other hand, the oil line c51 that communicates with the unshown oil pressure control device is bored in the center support wall 120. This oil line c51 is sealed between the support wall 120 and the clutch drum 52 of the fourth clutch C-4 with the sealing rings d13 and d14, and communicates with the hydraulic oil chamber 56. In other words, when the hydraulic oil pressure of the fourth clutch C-4 is supplied from the unshown oil pressure control device to the oil line c51, it is supplied to the hydraulic oil chamber 56 of the hydraulic servo 50 of the fourth clutch C-4.

Now, the hydraulic oil pressure is supplied from the oil pressure control device to the hydraulic oil chamber 66 of the hydraulic servo 60 of the first brake B-1 by the unshown oil line via the support wall 120 from the transmission case 3, and further, the hydraulic oil pressure is supplied from the oil pressure control device to the hydraulic oil chamber 76 of the hydraulic servo 70 of the second brake B-2 by the unshown oil line from the transmission case 3.

As in the above, according to the automatic transmission 16 relating to the present invention, the hydraulic servo 50 of the fourth clutch C-4 is placed between the axial direction of the planetary gear unit PU and the planetary gear DP, and the hydraulic servos 20 and 40 of the first and third clutches C-1 and C-3 are placed on the side opposite from the planetary gear unit PU in the axial direction as to the hydraulic servo 50 of the fourth clutch C-4, and the input shaft 12 and the fourth clutch C-4 are linked via the linking member 140 that passes by the outer circumferential side of the first and third clutches C-1 and C-3, and the first and third clutches C-1 and C-3 are each linked to the sun gears S2 and S3 of the planetary gear unit PU via the linking members 101 and 102 that pass through the inner circumferential side of the fourth clutch C-4, and so the members that link the various clutches and the various rotation elements of the planetary gear PU are prevented from clashing, and while the linking member 140 that rotates from the input rotation (in other words, not rotated at an increased speed nor does the transmitting torque increase) can be placed on the outer circumferential side, the linking members 101 and 102 that have the possibility of greatly accelerating rotation can be placed on the inner circumferential side. Thus, the thickness of the various linking members that linked these clutches and the various rotation elements of the planetary gear unit PU can be designed to be made relatively thin and lightweight, and an automatic transmission $1_6$ that is more lightweight with improved controllability can be designed. Further, the linking member 140 that rotates from the input rotation can be placed on the outer circumferential side, and so an input rotation count sensor that detects the number of input rotations can be easily affixed.

Also, the hydraulic oil is supplied from the oil line c51 that is provided on the support wall 120 to the hydraulic servo 50 of the fourth clutch C-4, and so the number of sealing rings can be reduced compared to the case wherein the hydraulic oil is supplied from the input shaft 12 (or the intermediate shaft 13) via the linking member 101 and the linking member 102. Thus, efficiency improvements of the automatic transmission 16 due to the decrease in sliding resistance by the sealing rings, decrease in hydraulic oil leaking from the sealing rings, and preventing decrease of controllability, is enabled.

Further, the clutch drum 52 of the hydraulic servo 50 of the fourth clutch C-4 is open toward the planetary gear DP side, and so the member that outputs the rotation of the fourth clutch C-4 and the linking member 140 can be prevented from clashing.

Also, the input rotation from the fourth clutch C-4 and the reduced speed rotation from the third clutch C-3 can be transmitted to the sun gear S2, both using the linking member 101. Thus, the number of parts can be reduced and the automatic transmission 16 can be designed to be more lightweight and compact.

Further, the first brake B-1 is linked to the linking member 101 via the hub member 156 that passes between the axial direction of the fourth clutch C-4 and the planetary gear unit PU, and so the rotation of the sun gear S2 of the planetary gear unit PU can be fixed, and the linking member 140 and the hub member 156 can be prevented from clashing.

Also, the hydraulic servo 40 of the third clutch C-3 is placed on the side opposite from the hydraulic servo 50 of the fourth clutch C-4 in the axial direction as to the planetary gear DP and on the boss unit 3b that extends from the case 3, and the hydraulic oil is supplied to the hydraulic servo 40 of the third clutch C-3 from the oil line c41 provided within the boss unit 3b, and so the hydraulic oil pressure is supplied to the third clutch C-3 so as to be capable of engaging, and the linking of the third clutch C-3 and the linking member 101 is enabled.

Further, the hydraulic servo 20 of the first clutch C-1 is placed between the axial direction of the planetary gear DP and the hydraulic servo 50 of the fourth clutch C-4, and the hydraulic oil is supplied to the hydraulic servo 20 of the first clutch C-1 from the oil line c21 provided within the input shaft 12, and so the hydraulic oil can be supplied to the first clutch C-1 so as to be capable of engaging, and compared to the case of placing the first clutch C-1 on the side opposite of the planetary gear unit PU in the axial direction as to the planetary gear DP, placing the transmitting member that transmits the output rotation of the first clutch C-1 through the outer circumferential side of the planetary gear DP becomes unnecessary, in other words the number of members that pass by the outer circumferential side of the planetary gear DP can be fewer. Thus, a more compact automatic transmission 16 in the radial direction can be designed.

Further, the hydraulic servo 30 of the second clutch C-2 is placed between the axial direction of the planetary gear unit PU and the planetary gear DP, and so the planetary gear unit PU and the output shaft 15 of the automatic transmission 14 can be closer to one another, and a large torque can be transmitted at a relatively low speed, and the member that links the ring gear R3 that makes a high rotation at a relatively reverse speed and the output shaft 15 can be shortened. Thus, an automatic transmission 14 with reduced weight and improved controllability can be designed. Further, this planetary gear unit PU can be placed closer to the supporting unit (in other words the portion supported by the output shaft 15) of the shaft wherein the planetary gear unit PU is placed (in other words the intermediate shaft 13), and the gear positions can be stabilized.

Further, the hydraulic servo 30 of the second clutch C-2 is placed between the axial direction of the hydraulic servo 20 of the first clutch and the hydraulic servo 50 of the fourth clutch C-4, and so can be placed between the axial direction of the planetary gear unit PU and the planetary gear DP. Thus, the second clutch C-2, which has a relatively small volume, can be placed on the inner circumferential side of the friction plate 41 of the third clutch C-3, and so the shaft length of the automatic transmission 16 can be shortened.

Also, the forward first speed is achieved by engaging the first clutch C-1 and also retaining the one-way clutch F-1 (or the second brake B-2), the forward second speed by engaging the first clutch C-1 and by also retaining the first brake B-1, the forward third speed by engaging the first clutch C-1 and the third clutch C-3, the forward fourth speed by engaging the first clutch C-1 and the fourth clutch C-4, the forward fifth speed by engaging the first clutch C-1 and the second clutch C-2, the forward sixth speed by engaging the second clutch C-2 and the fourth clutch C-4, the forward seventh speed by engaging the second clutch C-2 and the third clutch C-3, the forward eighth speed by engaging the second clutch C-2 and by also retaining the first brake B-1, and the reverse speed by engaging the third clutch C-3 or the fourth clutch C-4 and by also retaining the second brake B-2.

Seventh Embodiment

Figure 10:
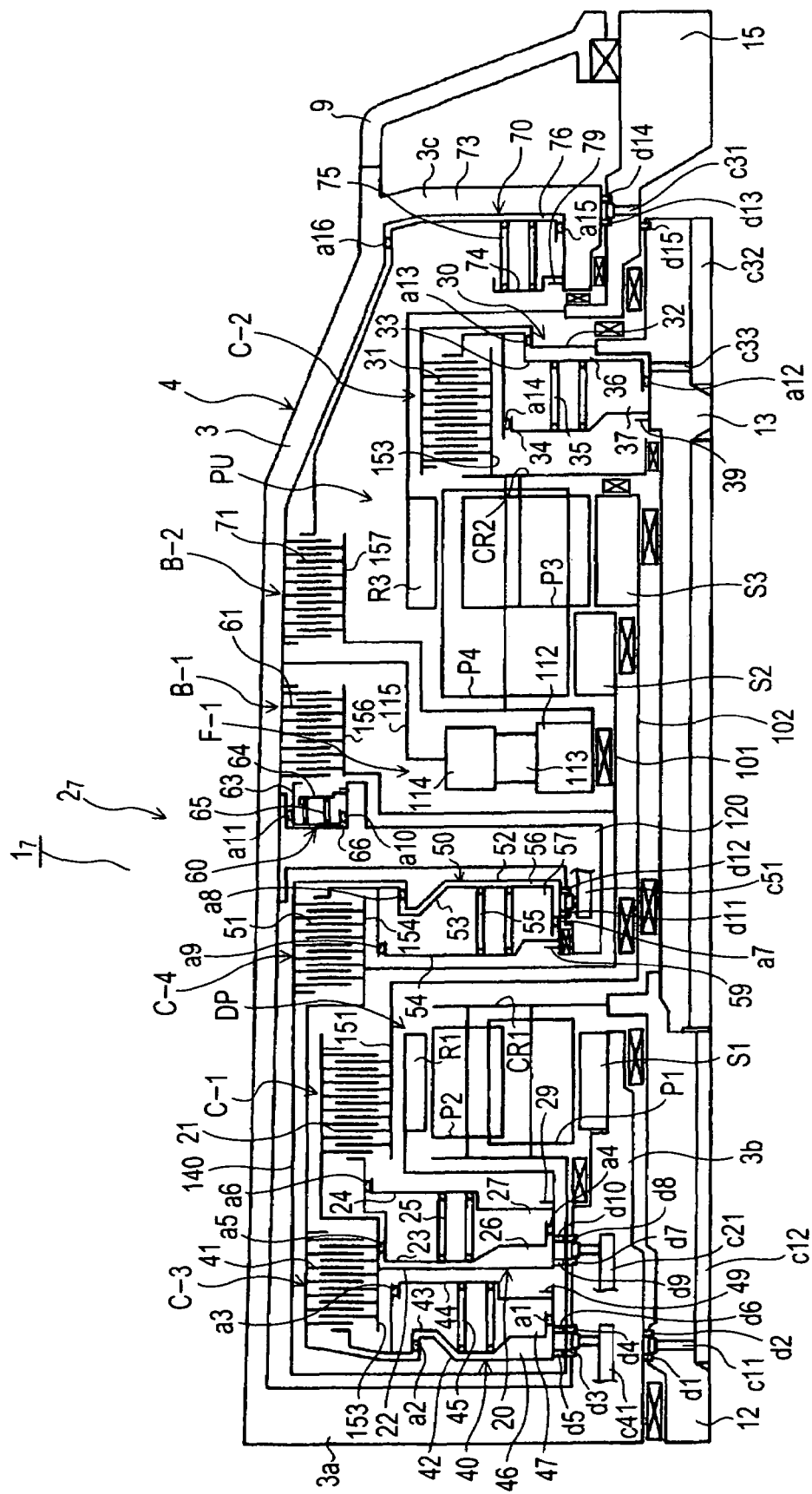
FIG. 10 is a cross-sectional diagram illustrating an automatic transmission relating to a seventh embodiment.

Next, a seventh embodiment wherein a portion of the above-mentioned fifth embodiment has been changed will be described, following FIG. 10. FIG. 10 is a cross-sectional diagram illustrating the automatic transmission $1_7$ relating to the seventh embodiment. With the seventh embodiment to be described below, the portions that have a similar configuration as the automatic transmission $1_5$ relating to the fifth embodiment will have the same reference numerals, and the description thereof will be omitted.

The automatic transmission $1_7$ relating to the present seventh embodiment comprises a speed shifting mechanism $2_7$, and this speed shifting mechanism $2_7$ has a first clutch C-1 and the hydraulic servo 20 thereof that are placed on the side opposite (on the front side) of the planetary gear DP and the planetary gear unit PU in the axial direction as to the speed shifting mechanism $2_5$ of the automatic transmission $1_5$ relating to the fifth embodiment, and specifically, the hydraulic servo 20 of the first clutch C-1 is placed between the axial direction of planetary gear DP and the hydraulic servo 40 of the third clutch C-3. In other words, the hydraulic servo 20 of this first clutch C-1 is placed on the boss unit 3b, with the clutch drum 22 thereof being rotatably supported by the boss unit 3b and the linking member 140. Also, the clutch drum 22 of the first clutch C-1 is linked to the hub member 153 that is splined with the inner friction plate of the friction plate 41 of the third clutch C-3, and the a portion of each of the clutch drum 22 and hub member 153 are stacked together. Further, the friction plate 21 of the first clutch C-1 is placed so as to be overlapped on the planetary gear DP.

Continuing, the oil line configuration of the various configuration elements in the present embodiments will be described.

An oil line that communicates with the oil pump not shown is provided within the boss unit 3b that extends from the above-mentioned transmission case 3, and this oil line is sealed by the sealing rings d1 and d2, and communicates with the oil line c11 that is bored in the input shaft 12 in the radial direction. The input shaft 12 has an oil line c12 bored in the axial direction, and also communicates with the oil line c11 in the radial direction. Also, on the back side of the input shaft 12, multiple unshown oil lines are bored that pass through from the oil line c12 to the outer circumferential side of the input shaft 12 in the radial direction, and the supplied oil is sprayed from these multiple oil lines to the outer circumferential side of the input shaft 12 as lubricating oil. Thus, the various members within the transmission case 3, in other words the various gears of the planetary gear DP and the various members of the first clutch C-1 are lubricated. Now, for example, the oil within the cancel oil chamber 27 of the first clutch C-1 is also supplied similarly to the lubricating oil, and in the case of being discharged, lubricates the various members within the transmission case 3 by merging with other lubricating oil.

Also, an oil line c41 that communicates with the unshown oil pressure control device is bored in the above-mentioned boss unit 3b, and this oil line c41 is sealed between the boss unit 3b and the linking member 140 with the sealing rings d3 and d4, and further is sealed between this linking member 140 and the clutch drum 42 of the third clutch C-3 with the sealing rings d5 and d6, and communicates with the hydraulic oil chamber 46. In other words, when the hydraulic oil pressure of the third clutch C-3 is supplied from the unshown oil pressure control device to the oil line c41, it is supplied to the hydraulic oil chamber 46 of the hydraulic servo 40 of the third clutch C-3.

Also, an oil line c21 that communicates with the unshown oil pressure control device is bored in the above-mentioned boss unit 3b, and this oil line c21 is sealed between the boss unit 3b and the linking member 140 with the sealing rings d7 and d8, and further is sealed between this linking member 140 and the clutch drum 42 of the third clutch C-3 with the sealing rings d9 and d10, and communicates with the hydraulic oil chamber 26. In other words, when the hydraulic oil pressure of the first clutch C-1 is supplied from the unshown oil pressure control device to the oil line c21, it is supplied to the hydraulic oil chamber 26 of the hydraulic servo 20 of the first clutch C-1.

On the other hand, the oil line c51 that communicates with the unshown oil pressure control device is bored in the support wall 120. This oil line c51 is sealed between the support wall 120 and the clutch drum 52 of the fourth clutch C-4 with the sealing rings d11 and d12, and communicates with the hydraulic oil chamber 56. In other words, when the hydraulic oil pressure of the fourth clutch C-4 is supplied from the unshown oil pressure control device to the oil line c51, it is supplied to the hydraulic oil chamber 56 of the hydraulic servo 50 of the fourth clutch C-4.

Also, an unshown oil line that communicates with the unshown oil pressure control device is bored in the bulkhead member 3c of the above-mentioned transmission case 3, and this oil line is sealed between the bulkhead member 3c and the output shaft 15 with the sealing rings d13 and d14, and communicates with the oil line c31. Further, this oil line c31 is sealed between the intermediate shaft 13 and the output shaft 15 with the sealing ring d15, and communicates with the oil line c32 that is bored in the intermediate shaft 13 in the axial direction, and further, the oil line c32 communicates with the oil line c33 that is bored in the intermediate shaft 13 in the radial direction, and communicates with the hydraulic oil chamber 36. In other words, when the hydraulic oil pressure of the second clutch C-2 is supplied from the unshown oil pressure control device to the oil line c31, it is supplied to the hydraulic oil chamber 36 of the hydraulic servo 30 of the second clutch C-2.

Now, the hydraulic oil pressure is supplied from the oil pressure control device to the hydraulic oil chamber 66 of the hydraulic servo 60 of the first brake B-1 by the unshown oil line via the support wall 120 from the transmission case 3, and further, the hydraulic oil pressure is supplied from the oil pressure control device to the hydraulic oil chamber 76 of the hydraulic servo 70 of the second brake B-2 by the unshown oil line from the transmission case 3.

As in the above, according to the automatic transmission $1_7$ relating to the present invention, the hydraulic servo 50 of the fourth clutch C-4 is placed between the axial direction of the planetary gear unit PU and the planetary gear DP, and the hydraulic servos 20 and 40 of the first and third clutches C-1 and C-3 are placed on the side opposite from the planetary gear unit PU in the axial direction as to the hydraulic servo 50 of the fourth clutch C-4, and the input shaft 12 and the fourth clutch C-4 are linked via the linking member 140 that passes by the outer circumferential side of the first and third clutches C-1 and C-3, and the first and third clutches C-1 and C-3 are each linked to the sun gears S2 and S3 of the planetary gear unit PU via the linking members 101 and 102 that pass through the inner circumferential side of the fourth clutch C-4, and so the members that link the various clutches and the various rotation elements of the planetary gear PU are prevented from clashing, and while the linking member 140 that rotates from the input rotation (in other words, not rotated at an increased speed nor does the transmitting torque increase) can be placed on the outer circumferential side, the linking members 101 and 102 that have the possibility of greatly accelerating rotation can be placed on the inner circumferential side. Thus, the thickness of the various linking members that linked these clutches and the various rotation elements of the planetary gear unit PU can be designed to be made relatively thin and lightweight, and an automatic transmission $1_7$ that is more lightweight with improved controllability can be designed. Further, the linking member 140 that rotates from the input rotation can be placed on the outer circumferential side, and so an input rotation count sensor that detects the number of input rotations can be easily affixed.

Also, the hydraulic oil is supplied from the oil line c51 that is provided on the support wall 120 to the hydraulic servo 50 of the fourth clutch C-4, and so the number of sealing rings can be reduced compared to the case wherein the hydraulic oil is supplied from the input shaft 12 (or the intermediate shaft 13) via the linking member 101 and the linking member 102. Thus, efficiency improvements of the automatic transmission $1_7$ due to the decrease in sliding resistance by the sealing rings, decrease in hydraulic oil leaking from the sealing rings, and preventing decrease of controllability, is enabled.

Further, the clutch drum 52 of the hydraulic servo 50 of the fourth clutch C-4 is open toward the planetary gear DP side, and so the member that outputs the rotation of the fourth clutch C-4 and the linking member 140 can be prevented from clashing.

Also, the input rotation from the fourth clutch C-4 and the reduced speed rotation from the third clutch C-3 can be transmitted to the sun gear S2, both using the linking member 101. Thus, the number of parts can be reduced and the automatic transmission $1_7$ can be designed to be more lightweight and compact.

Further, the first brake B-1 is linked to the linking member 101 via the hub member 156 that passes between the axial direction of the fourth clutch C-4 and the planetary gear unit PU, and so the rotation of the sun gear S2 of the planetary gear unit PU can be fixed, and the linking member 140 and the hub member 156 can be prevented from clashing.

Also, the hydraulic servo 40 of the third clutch C-3 is placed on the side opposite from the hydraulic servo 50 of the fourth clutch C-4 in the axial direction as to the planetary gear DP and on the boss unit 3b that extends from the case 3, and the hydraulic oil is supplied to the hydraulic servo 40 of the third clutch C-3 from the oil line c41 provided within the boss unit 3b, and so the hydraulic oil pressure is supplied to the third clutch C-3 so as to be capable of engaging, and the linking of the third clutch C-3 and the linking member 101 is enabled.

Further, the hydraulic servo 20 of the first clutch C-1 is placed between the axial direction of the planetary gear DP and the hydraulic servo 40 of the third clutch C-3 and on the boss unit 3b that extends from the case 3, and the hydraulic oil is supplied to the hydraulic servo 20 of the first clutch C-1 from the oil line c21 provided within the boss unit 3b, and so the hydraulic oil pressure is supplied to the first clutch C-1 so as to be capable of engaging, and the linking of the first clutch C-1 and the linking member 102 is enabled.

Further, the hydraulic servo 30 of the second clutch C-2 is placed on the side opposite from the planetary gear DP in the axial direction as to the planetary gear unit PU, and so multiple oil lines being provided concentrated within the boss unit 3b or on the support wall 120 can be prevented.

Also, the forward first speed is achieved by engaging the first clutch C-1 and also retaining the one-way clutch F-1 (or the second brake B-2), the forward second speed by engaging the first clutch C-1 and by also retaining the first brake B-1, the forward third speed by engaging the first clutch C-1 and the third clutch C-3, the forward fourth speed by engaging the first clutch C-1 and the fourth clutch C-4, the forward fifth speed by engaging the first clutch C-1 and the second clutch C-2, the forward sixth speed by engaging the second clutch C-2 and the fourth clutch C-4, the forward seventh speed by engaging the second clutch C-2 and the third clutch C-3, the forward eighth speed by engaging the second clutch C-2 and by also retaining the first brake B-1, and the reverse speed by engaging the third clutch C-3 or the fourth clutch C-4 and by also retaining the second brake B-2.

Eighth Embodiment

Figure 11:
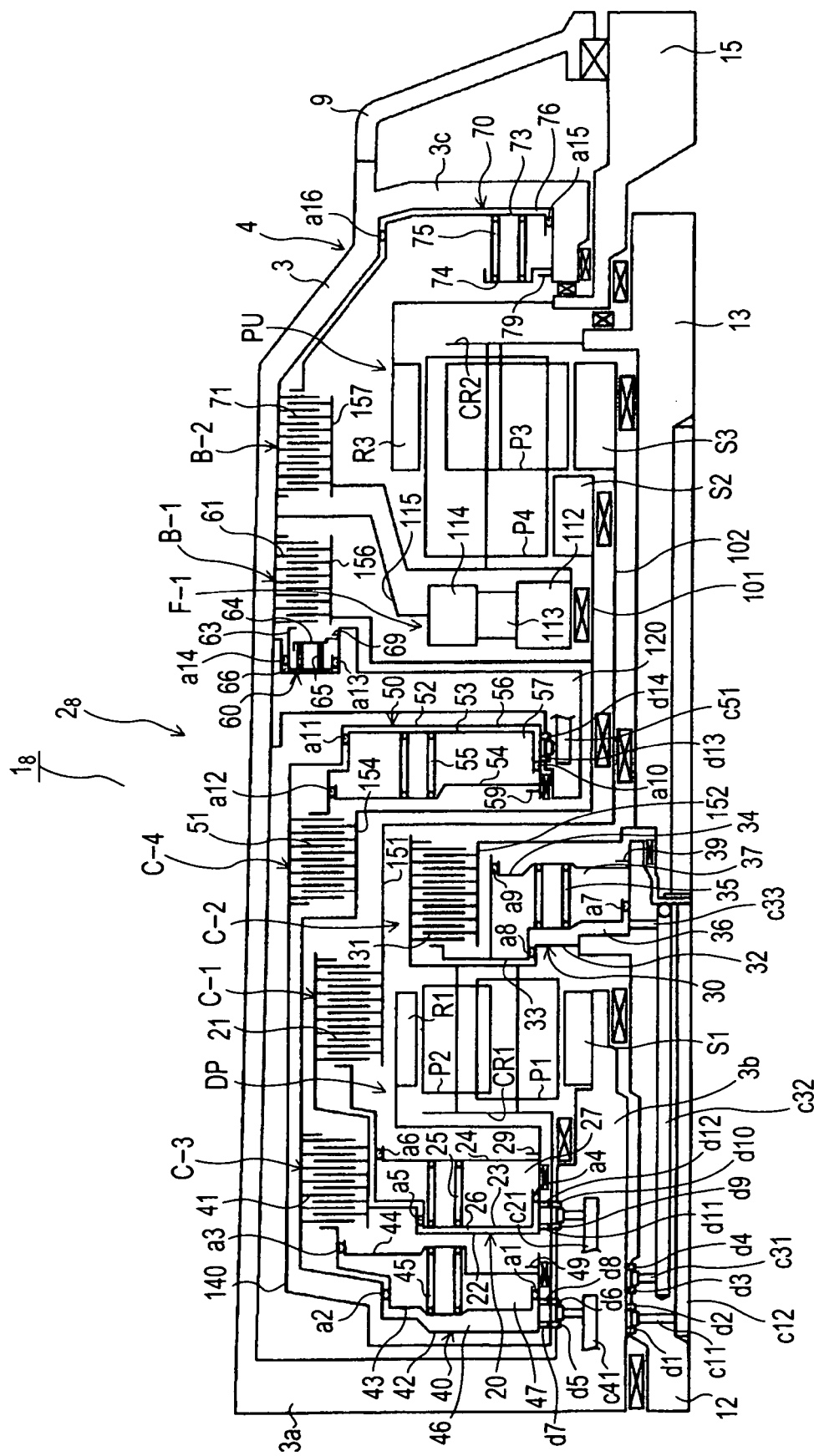
FIG. 11 is a cross-sectional diagram illustrating an automatic transmission relating to an eighth embodiment.

Next, an eighth embodiment wherein a portion of the above-mentioned seventh embodiment has been changed will be described, following FIG. 11. FIG. 11 is a cross-sectional diagram illustrating the automatic transmission $1_8$ relating to the eighth embodiment. With the eighth embodiment to be described below, the portions that have a similar configurations as the automatic transmission $1_7$ relating to the seventh embodiment will have the same reference numerals, and the description thereof will be omitted.

The automatic transmission $1_8$ relating to the present eighth embodiment comprises a speed shifting mechanism $2_8$, and this speed shifting mechanism $2_8$ has a second clutch C-2 and the hydraulic servo 30 thereof that are placed between the axial direction of the planetary gear DP and the planetary gear unit PU as to the speed shifting mechanism $2_7$ of the automatic transmission $1_7$ relating to the seventh embodiment, and specifically, the hydraulic servo 30 of the second clutch C-2 is placed between the axial direction of the planetary gear DP and the hydraulic servo 50 of the fourth clutch C-4. In other words, the hydraulic servo 30 of this second clutch C-2 is placed on the outer circumferential side of the back edge of the input shaft 12, and the clutch drum 32 thereof is linked to the input shaft 12. Further, the hub member 152 that is splined with the inner friction plate of the friction plate 31 of the second clutch C-2 is linked to the intermediate shaft 13. The intermediate shaft 13 of the present embodiment is provided as to the input shaft 12 so as to be capable of rotating, and in other words serves as a linking member for the purpose of transmitting the rotation of the hub member 152 to the carrier CR2 of the planetary gear unit PU.

Continuing, the oil line configuration of the various configuration elements in the present embodiments will be described.

An oil line that communicates with the oil pump not shown is provided within the boss unit 3b that extends from the above-mentioned transmission case 3, and this oil line is sealed by the sealing rings d1 and d2, and communicates with the oil line c11 that is bored in the input shaft 12 in the radial direction. The input shaft 12 has an oil line c12 bored in the axial direction, and also communicates with the oil line c11 in the radial direction. Also, on the back side of the input shaft 12, multiple unshown oil lines are bored that pass through from the oil line c12 to the outer circumferential side of the input shaft 12 in the radial direction, and the supplied oil is sprayed from these multiple oil lines to the outer circumferential side of the input shaft 12 as lubricating oil. Thus, the various members within the transmission case 3, in other words the various gears of the planetary gear DP and the various members of the first clutch C-1, are lubricated. Now, for example, the oil within the cancel oil chamber 27 of the first clutch C-1 is supplied similarly to the lubricating oil, and in the case of being discharged, lubricates the various members within the transmission case 3 by merging with other lubricating oil.

Further, an unshown oil line that communicates with an unshown oil pressure control device is bored in the above-mentioned boss unit 3b, and this oil line is sealed between the boss unit 3b and the input shaft 12 with the sealing rings d3 and d4, and communicates with the oil line c31 bored in the input shaft 12 in the radial direction. This oil line c31 communicates with the oil line c32 that is bored in the input shaft 12 in the axial direction, that is to say bored parallel to the above-mentioned oil line c12, and this oil line c32 communicates with the oil line c33 that is bored at the back edge side of the input shaft 12 in the radial direction. Also, this oil line c33 communicates with the hydraulic oil chamber 36. In other words, when the hydraulic oil pressure of the second clutch C-2 is supplied from the unshown oil pressure control device to the oil line c31, it is supplied to the hydraulic oil chamber 36 of the hydraulic servo 30 of the second clutch C-2.

Also, an oil line c41 that communicates with the unshown oil pressure control device is bored in the above-mentioned boss unit 3b, and this oil line c41 is sealed between the boss unit 3b and the linking member 140 with the sealing rings d5 and d6, and further is sealed between this linking member 140 and the clutch drum 42 of the third clutch C-3 with the sealing rings d7 and d8, and communicates with the hydraulic oil chamber 46. In other words, when the hydraulic oil pressure of the third clutch C-3 is supplied from the unshown oil pressure control device to the oil line c41, it is supplied to the hydraulic oil chamber 46 of the hydraulic servo 40 of the third clutch C-3.

Also, an oil line c21 that communicates with the unshown oil pressure control device is bored in the above-mentioned boss unit 3b, and this oil line c21 is sealed between the boss unit 3b and the linking member 140 with the sealing rings d9 and d10, and further is sealed between this linking member 140 and the clutch drum 42 of the third clutch C-3 with the sealing rings d11 and d12, and communicates with the hydraulic oil chamber 26. In other words, when the hydraulic oil pressure of the first clutch C-1 is supplied from the oil pressure control device to the oil line c21, it is supplied to the hydraulic oil chamber 26 of the hydraulic servo 20 of the first clutch C-1.

On the other hand, the oil line c51 that communicates with the unshown oil pressure control device is bored in the support wall 120. This oil line c51 is sealed between the support wall 120 and the clutch drum 52 of the fourth clutch C-4 with the sealing rings d13 and d14, and communicates with the hydraulic oil chamber 56. In other words, when the hydraulic oil pressure of the fourth clutch C-4 is supplied from the unshown oil pressure control device to the oil line c51, it is supplied to the hydraulic oil chamber 56 of the hydraulic servo 50 of the fourth clutch C-4.

Now, the hydraulic oil pressure is supplied from the oil pressure control device to the hydraulic oil chamber 66 of the hydraulic servo 60 of the first brake B-1 by the unshown oil line via the support wall 120 from the transmission case 3, and further, the hydraulic oil pressure is supplied from the oil pressure control device to the hydraulic oil chamber 76 of the hydraulic servo 70 of the second brake B-2 by the unshown oil line from the transmission case 3.

As in the above, according to the automatic transmission 18 relating to the present invention, the hydraulic servo 50 of the fourth clutch C-4 is placed between the axial direction of the planetary gear unit PU and the planetary gear DP, and the hydraulic servos 20 and 40 of the first and third clutches C-1 and C-3 are placed on the side opposite from the planetary gear unit PU in the axial direction as to the hydraulic servo 50 of the fourth clutch C-4, and the input shaft 12 and the fourth clutch C-4 are linked via the linking member 140 that passes by the outer circumferential side of the first and third clutches C-1 and C-3, and the first and third clutches C-1 and C-3 are each linked to the sun gears S2 and S3 of the planetary gear unit PU via the linking members 101 and 102 that pass through the inner circumferential side of the fourth clutch C-4, and so the members that link the various clutches and the various rotation elements of the planetary gear PU are prevented from clashing, and while the linking member 140 that rotates from the input rotation (in other words, not rotated at an increased speed nor does the transmitting torque increase) can be placed on the outer circumferential side, the linking members 101 and 102 that have the possibility of greatly accelerating rotation can be placed on the inner circumferential side. Thus, the thickness of the various linking members that linked these clutches and the various rotation elements of the planetary gear unit PU can be designed to be made relatively thin and lightweight, and an automatic transmission $1_8$ that is more lightweight with improved controllability can be designed. Further, the linking member 140 that rotates from the input rotation can be placed on the outer circumferential side, and so an input rotation count sensor that detects the number of input rotations can be easily affixed.

Also, the hydraulic oil is supplied from the oil line c51 that is provided on the support wall 120 to the hydraulic servo 50 of the fourth clutch C-4, and so the number of sealing rings can be reduced compared to the case wherein the hydraulic oil is supplied from the input shaft 12 (or the intermediate shaft 13) via the linking member 101 and the linking member 102. Thus, efficiency improvements of the automatic transmission $1_8$ due to the decrease in sliding resistance by the sealing rings, decrease in hydraulic oil leaking from the sealing rings, and preventing decrease of controllability, is enabled.

Further, the clutch drum 52 of the hydraulic servo 50 of the fourth clutch C-4 is open toward the planetary gear DP side, and so the member that outputs the rotation of the fourth clutch C-4 and the linking member 140 can be prevented from clashing.

Also, the input rotation from the fourth clutch C-4 and the reduced speed rotation from the third clutch C-3 can be transmitted to the sun gear S2, both using the linking member 101. Thus, the number of parts can be reduced and the automatic transmission 18 can be designed to be more lightweight and compact.

Further, the first brake B-1 is linked to the linking member 101 via the hub member 156 that passes between the axial direction of the fourth clutch C-4 and the planetary gear unit PU, and so the rotation of the sun gear S2 of the planetary gear unit PU can be fixed, and the linking member 140 and the hub member 156 can be prevented from clashing.

Also, the hydraulic servo 40 of the third clutch C-3 is placed on the side opposite from the hydraulic servo 50 of the fourth clutch C-4 in the axial direction as to the planetary gear DP and on the boss unit 3b that extends from the case 3, and the hydraulic oil is supplied to the hydraulic servo 40 of the third clutch C-3 from the oil line c41 provided within the boss unit 3b, and so the hydraulic oil pressure is supplied to the third clutch C-3 so as to be capable of engaging, and the linking of the third clutch C-3 and the linking member 101 is enabled.

Further, the hydraulic servo 20 of the first clutch C-1 is placed between the axial direction of the planetary gear DP and the hydraulic servo 40 of the third clutch C-3 and on the boss unit 3b that extends from the case 3, and the hydraulic oil is supplied to the hydraulic servo 20 of the first clutch C-1 from the oil line c21 provided within the boss unit 3b, and so the hydraulic oil pressure is supplied to the first clutch C-1 so as to be capable of engaging, and the linking of the first clutch C-1 and the linking member 102 is enabled.

Further, the hydraulic servo 30 of the second clutch C-2 is placed between the axial direction of the planetary gear unit PU and the planetary gear DP, and so the planetary gear unit PU and the output shaft 15 of the automatic transmission 18 can be closer to one another, and a large torque can be transmitted at a relatively low speed, and the member that links the ring gear R3 that makes a high rotation at a relatively reverse speed and the output shaft 15 can be shortened. Thus, an automatic transmission 18 with reduced weight and improved controllability can be designed. Further, this planetary gear unit PU can be placed closer to the supporting unit (in other words the portion supported by the output shaft 15) of the shaft wherein the planetary gear unit PU is placed (in other words the intermediate shaft 13), and the gear positions can be stabilized.

Further, the hydraulic servo 30 of the second clutch C-2 is placed between the axial direction of the hydraulic servo 20 of the first clutch C-1 and the hydraulic servo 50 of the fourth clutch C-4, and so can be placed between the axial direction of the planetary gear unit PU and the planetary gear DP. Therefore, the second clutch C-2 which has a relatively small volume can be placed on the inner circumferential side of the friction plate 41 of the third clutch C-3, and so the shaft length of the automatic transmission $1_8$ can be shortened. Further, the member that inputs the input rotation into the planetary gear DP and the clutch drum 32 of the second clutch C-2 can be made to have commonality and so the shaft length of the automatic transmission $1_8$ can be shortened.

Also, the forward first speed is achieved by engaging the first clutch C-1 and also retaining the one-way clutch F-1 (or the second brake B-2), the forward second speed by engaging the first clutch C-1 and by also retaining the first brake B-1, the forward third speed by engaging the first clutch C-1 and the third clutch C-3, the forward fourth speed by engaging the first clutch C-1 and the fourth clutch C-4, the forward fifth speed by engaging the first clutch C-1 and the second clutch C-2, the forward sixth speed by engaging the second clutch C-2 and the fourth clutch C-4, the forward seventh speed by engaging the second clutch C-2 and the third clutch C-3, the forward eighth speed by engaging the second clutch C-2 and by also retaining the first brake B-1, and the reverse speed by engaging the third clutch C-3 or the fourth clutch C-4 and by also retaining the second brake B-2.

Ninth Embodiment

Figure 12:
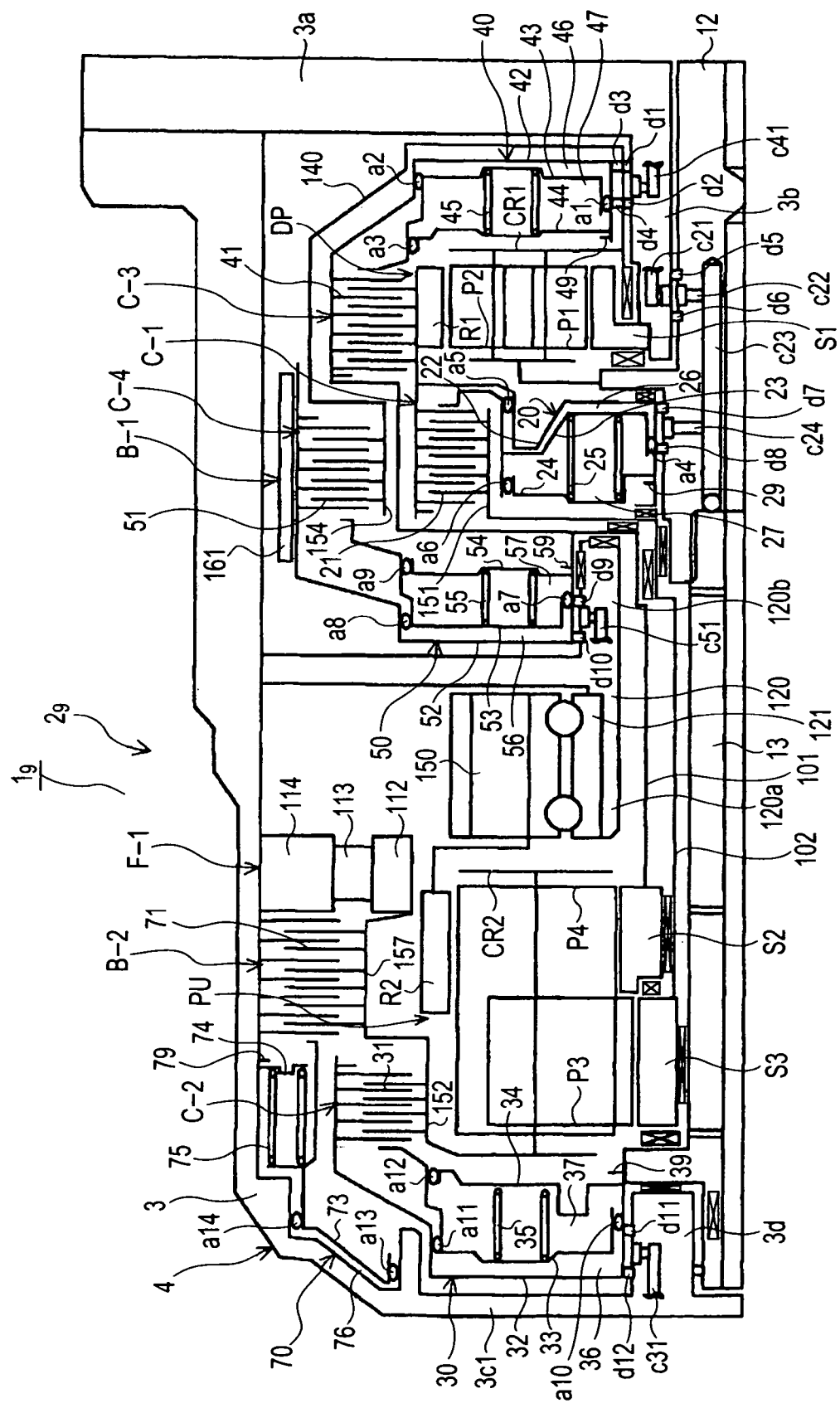
FIG. 12 is a cross-sectional diagram illustrating an automatic transmission relating to a ninth embodiment.

Next, a ninth embodiment wherein a portion of the above-mentioned first through eighth embodiments has been changed will be described, following FIG. 12. FIG. 12 is a cross-sectional diagram illustrating the automatic transmission $1_9$ relating to the ninth embodiment. With the ninth embodiment to be described below, the portions that have a similar configurations as the automatic transmission $1_1$ relating to the first through eighth embodiments will have the same reference numerals except for a portion of the construction such as the oil lines, the sealing rings, and the hub members, and the description thereof will be omitted.

As illustrated in FIG. 12, the automatic transmission 19 which is suitable for mounting on a vehicle which is an FF type (front drive, front engine), for example, has a case 4 which is constructed by connecting a transmission case 3 or a housing case or the like which encloses a torque converter not shown, and within this transmission case 3 is placed a speed shifting mechanism $2_9$, a counter shaft of which the diagram is omitted, and a differential device. This speed shifting mechanism $2_9$ is placed on, for example, the input shaft 12 which is on the same axis as the output shaft of the engine (not shown), and on the axis upon which the intermediate shaft 13 is the center, and further, the unshown counter shaft is placed on an axis parallel to these input shaft 12 and intermediate shaft 13, and further, the differential gear device (not shown) is placed on an axis parallel to this counter shaft so as to form a left and right wheel. The above-mentioned input shaft 12 and intermediate shaft 13, the counter shaft, and the left and right wheels are arranged in a dogleg shape relative to each other as viewed from the side. Further, generally the counter shaft or the differential device is placed in a position adjacent to the torque converter, in other words is placed in a position to overlap on the input side of the input shaft 12 in the axial direction.

With the automatic transmission which is suitable for mounting on a vehicle which is an FR type according to the above-described first through eighth embodiments, the left and right directions in the diagram actually are front and back directions, but with the automatic transmission which is suitable for mounting on a vehicle which is an FF type as described below, the left and right directions in the diagram are actually left and right directions on the vehicle. However, depending on the direction of mounting, the right side of the diagram can be the left side of the vehicle and the left side of the diagram can be the right side of the vehicle, but in the descriptions below, in the case of stating simply "right side" or "left side", the "right side" or "left side" of the diagram will be indicated.

Within the transmission case 3, the planetary gear DP and the planetary gear unit PU are placed on the same axis, and a hydraulic servo 50 of the fourth clutch C-4 of which the friction plate 51 is placed on the outer circumferential side is placed between the axial direction of this planetary gear DP and the planetary gear unit PU. Further, a support wall (center support) 120 so as to be adjacent to the hydraulic servo 50 of this fourth clutch C-4 is placed between the hydraulic servo 50 of this fourth clutch C-4 and this planetary gear unit PU in the axial direction. The boss unit 120*b* on the right side inner circumferential side of this support wall 120 is extended to the inner portion of the hydraulic servo 50 of this fourth clutch C-4, and further, the boss unit 120*a* on the left side inner circumferential side of this support wall 120 is extended to the inner portion of the counter gear (output member) 150. In other words, this hydraulic servo 40 and counter gear 150 are placed and supported so as to each be adjacent to each other on opposite sides via the support wall 120.

The hydraulic servo 20 of the first clutch C-1 of which the friction plate 21 is placed on the inner circumferential side of the friction plate 51 of the fourth clutch C-4 is disposed between the axial direction of the planetary gear unit PU and the planetary gear DP. Specifically, the hydraulic servo 20 of this first clutch C-1 is disposed on the input shaft 12 between the hydraulic servo 50 of the fourth clutch C-4 and the planetary gear DP in the axial direction.

On the other hand, the hydraulic servo 40 of the third clutch of which the friction plate 41 is placed on the right side of the above-mentioned friction plate 51, is placed on the front side which is the side opposite in the axial direction from the planetary gear set PU as to the hydraulic servo 50 of the aforementioned fourth clutch C-4. Further, the hydraulic servo 40 of the third clutch C-3 is placed on the boss unit 3*b* which extends from the bulkhead member 3*a* which separates between the transmission case 3 and the housing case (not shown).

Further, the hydraulic servo 30 of the second clutch C-2 of which the friction plate 31 is placed on the outer circumferential side is placed on the boss unit 3*d* which extends from the side wall portion 3*c*1 of the transmission case 3, on the left side which is the side opposite in the axial direction from the planetary gear DP as to the planetary gear set PU.

Further, the brake band 161 of the first brake B-1, omitted from the diagram, of the hydraulic servo is placed on the outer diameter side of the friction plate 51 of the fourth clutch C-4 so as to form an overlap. Within this description, the brake band 161 is in a band shape, but is described as one type of friction plate, that is to say, "the friction plate of the brake" includes the friction plate of a multi-disc brake and the brake band of a band brake.

Further, the hydraulic servo 70 of the second brake B-2 of which the friction plate 71 is placed on the outer circumferential side of the planetary gear unit PU, is placed on the side wall portion 3*c*1 of the outer circumferential side of the hydraulic servo 30 of the second clutch C-2. Also, a one-way clutch F-1 is placed on the outer circumferential side of this planetary gear unit PU.

Continuing, the speed shifting mechanism 29 will be described in detail. The planetary gear DP which is placed on the inner circumferential side of the transmission case 3 comprises a sun gear S1, a carrier CR1, and a ring gear R1. On the right side of this planetary gear DP, the above-described boss unit 3*b* is provided on the outer face of the input shaft 12 so as to cover, and the above-mentioned sun gear S1 is fixed so as to be incapable of rotating. Further, the carrier CR1 supports the pinions P1 and P2 so as to be capable of rotating, and these pinions P1 and P2 mesh with each other and also the former pinion P1 meshes with the sun gear S1, and the latter pinion P2 meshes with the ring gear R1. The carrier plate on the left side of this carrier CR1 is linked to the input shaft 12, and also the carrier plate on the right side is linked to the (first) linking member 140 in a drum shape. Also, the ring gear R1 is linked to the clutch drum 22 of the above-mentioned first clutch C-1.

This first clutch C-1 comprises a friction plate 21 and a hydraulic servo 20 which disconnects this friction plate 21. This hydraulic servo 20 has a clutch drum 22 which is open towards the left side, a piston member 23, a cancel plate 24, and a return spring 25. The piston member 23 is placed to the left side of the clutch drum 22 so as to be movable in the left and right directions, so as to configure an oil-tight hydraulic oil chamber with the clutch drum 22, with two seals rings a4 and a5. Further, the cancel plate 24 is inhibited from moving to the left by a snap spring 29 fit to the cancel plate. The cancel plate 24 configures an oil-tight cancel oil chamber 27 with the piston member 23 placed to the right side thereof, with the two seal rings a4 and a6, upon the return spring 25 being compressed.

Further, an outer friction plate of the friction plate 21 is splined to the inner circumferential side of the front edge portion of the clutch drum 22, and also the inner friction plate thereof is splined to the hub member 151. In other words, when this first clutch C-1 engages, the reduced speed rotation of the ring gear R1 of the above-mentioned planetary gear DP is output to the hub member 151. This hub member 151 is linked to the (third) linking member 102 supported so as to be capable of rotating on the outer circumferential side of the intermediate shaft 13, and this linking member 102 is linked to the sun gear S3 of the above-mentioned planetary gear unit PU.

On the other hand, the linking member 140 that is linked to the above-mentioned carrier CR1 is linked to the hub member 154 which is splined to the inner friction plate of the friction plate 51 of the fourth clutch C-4. This fourth clutch C-4 comprises a friction plate 51 and a hydraulic servo 50 that disconnects this friction plate 51. This hydraulic servo 50 has a clutch drum 52 that is open towards the right side (planetary gear DP side), a piston member 53, a cancel plate 54, and a return spring 55. Further, the piston member 53 is placed on the right side of the clutch drum 52 so as to be capable of moving forward or backwards, and from two sealing rings a7 and a8, an oil-tight hydraulic oil chamber 56 is configured between the clutch drum 52. Further, the cancel plate 54 is prevented from moving towards the right side by the snap ring 59 fit to the clutch drum 52. The cancel plate 54 has a return spring 55 placed compressed between the piston member 53 placed on the left side of the cancel plate 54, and also comprises an oil tight canceling oil chamber 57 by two sealing rings a7 and a9.

Further, an outer friction plate of the friction plate 51 is splined to the inner circumferential side of the front edge portion of the clutch drum 52, and also the inner friction plate thereof is splined to the above-mentioned hub member 154. In other words, when this fourth clutch C-4 engages, the input rotation of the carrier CR1 of the above-mentioned planetary gear DP is output to the clutch drum 52. This clutch drum 52 is linked to the (second) linking member 101 that is supported so as to be capable of rotating on the further outer circumferential side of the aforementioned linking member 102, and this linking member 101 is linked to the sun gear S2 of the above-mentioned planetary gear unit PU.

The clutch drum 52 of the clutch C-4 clutch which is linked to the second linking member is further on the outer circumferential side than the first linking member 140, but the clutch C-4 requires a relatively small transmitting torque, and so the member does not require a great degree of strength, and even at a high rotation the generation of inertia torque is small, and does not influence the controllability greatly.

The third clutch C-3 is placed on the inner circumferential side of the above-mentioned linking member 140 and comprises a friction plate 41 and a hydraulic servo 40 that disengages this friction plate 41. This hydraulic servo 40 has a clutch drum 42 that is open towards the left, a piston member 43, a cancel plate 44, and a return spring 45. Further, the piston member 43 is placed on the left of the clutch drum 42 so as to be capable of moving forward or backwards, and from two sealing rings a1 and a2, an oil-tight hydraulic oil chamber 46 is configured between the clutch drum 42. Further, the cancel plate 44 is prevented from moving towards the left by the snap ring 49 fit to the clutch drum 42. The cancel plate 44 has a return spring 45 placed compressed between the piston member 43 placed on the right of the cancel plate 44, and also comprises an oil tight canceling oil chamber 47 by two sealing rings a1 and a3.

Also, an outer friction plate of the friction plate 41 is splined to the inner circumferential side of the front edge portion of the clutch drum 42, and also the inner friction plate thereof is splined to the outer circumferential side of the above-mentioned ring gear R1. In other words when this third clutch C-3 engages, the reduced speed rotation thereof is input to the clutch drum 42. This clutch drum 42 is linked to the linking member 101 that is linked to the sun gear S2 of the planetary gear unit PU.

Further, the first brake B-1 is placed on the outer diameter side of the clutch drum 52, and comprises an unshown hydraulic servo which is placed so as to be incapable of rotation as to the transmission case 3, and a brake band 161 which tightens and releases the outer portion of the clutch drum 52 by this hydraulic servo. In other words, when this first brake B-1 is retained, the clutch drum 52 is fixed so as to be incapable of rotation, and the rotation of the above-described linking member 101 and sun gear R2 is fixed.

On the other hand, the second clutch C-2 is placed on the back side of the planetary gear unit PU which is linked to the input shaft 12 and on the outer circumferential side of the back edge of the intermediate shaft 13. This second clutch C-2 comprises a friction plate 31 and a hydraulic servo 30 that disengages the friction plate 31. This hydraulic servo 30 has a clutch drum 32 that is open towards the left while being supported by the above-mentioned boss unit 3d so as to be capable of rotating and is linked to the above-mentioned intermediate shaft 13 (that is to say, the input shaft 12), a piston member 33, a cancel plate 34, and a return spring 35. Further, the piston member 33 is placed on the left of the clutch drum 32 so as to be capable of moving forward or backwards, and from two sealing rings a10 and a11, an oil-tight hydraulic oil chamber 36 is configured between the clutch drum 32. Further, the cancel plate 34 is prevented from moving towards the left by the snap ring 39 fit to the intermediate shaft 13. The cancel plate 34 has a return spring 35 placed compressed between the piston member 33 placed on the right of the cancel plate 34, and also comprises an oil tight canceling oil chamber 37 by two sealing rings a10 and a12.

Also, an outer friction plate of the friction plate 31 is splined to the inner circumferential side of the front edge portion of the clutch drum 32, and also the inner friction plate thereof is splined to the hub member 152. In other words, when this second clutch C-2 is engaged, the input rotation of the above-mentioned intermediate shaft 13 is output to the hub member 152. This hub member 152 is linked to the carrier plate on the back side of the carrier CR2 of the planetary gear unit PU.

Further, the on the carrier plate of the front side of this carrier CR2 is linked to the hub member 157 via the above-mentioned hub member 152 and is also linked to the inner race 112 of the one-way clutch F-1. This one-way clutch F-1 comprises the above-mentioned inner race 112, a sprag mechanism 113, and an outer race 114, and this outer race 114 is linked to the transmission case 3 by the linking member 115, and the rotation thereof is fixed. In the case that the inner race 112 rotates as to the outer race 114, the rotation in only one direction is restricted by the sprag mechanism 113 and is fixed.

The above-mentioned hub member 157 is splined with the inner friction plate of the friction plate 71 of the second brake B-2. This second brake B-2 has a hydraulic servo 70 wherein the side face of the bulkhead portion 3c on the left of the transmission case 3 is a cylinder portion, and this hydraulic servo 70 has a piston member 73, a cancel plate 74, and a return spring 75. The piston member 73 is placed on the right of the cylinder portion of the bulkhead portion 3c so as to be capable of moving forward or backwards, and from two sealing rings a13 and a14, an oil-tight hydraulic oil chamber 76 is configured between this cylinder portion. Further, the cancel plate 74 is prevented from moving to the right side by the snap ring 79 fit to the transmission case 3. Also, a return spring 75 is placed compressed between the cancel plate 74 and the piston member 73 placed on the right side thereof.

The outer friction plate of the friction plate 71 of the second brake B-2 is splined with the inner face of the transmission case 3, that is to say, when this second brake B-2 is retained, the hub member 157 is fixed so as to be incapable of rotating, and the rotation of the carrier CR2 of the above-mentioned planetary gear unit PU is fixed.

This planetary gear unit PU comprises a sun gear S2, a sun gear S3, a carrier CR2, and a ring gear R2. Of these, the sun gear S3 is supported by the intermediate shaft 13 so as to be capable of rotating, while also being linked to the linking member 102 as described above, and is capable of inputting the reduced speed rotation from the first clutch C-1. Further, the sun gear S2 is supported by the linking member 102 so as to be capable of rotating, and is linked to the linking member 101 as described above, and the reduced speed rotation from the third clutch C-3 or the fourth clutch C-4 or the input rotation is capable of inputting, and is capable of retaining by the first brake B-1. Further, the carrier CR2 is capable of the input rotation from the second clutch C-2 being input, and the rotation in one direction by the one-way clutch F-1 is restricted, and the rotation is capable of fixing the rotation by the second brake B-2.

This carrier CR2 supports the short pinion P3 and the long pinion P4 so as to be capable of rotating, and these pinions P3 and P4 mesh together, and the short pinion P3 meshes with the sun gear S3 and the long pinion P4 meshes with the sun gear S2 and the ring gear R3. Also, this ring gear R3 is linked to the counter gear 150.

The counter gear 150 is placed between the planetary gear unit PU and the planetary gear DP in the axial direction, and is adjacent to the left side of the support wall 120 as described above. Specifically, the counter gear 150 is placed on the boss unit 120a which extends from the inner diameter side of the support wall 120, via a ball bearing 121. Also, a gear which is linked to the unshown counter shaft meshes with the outer circumferential side of this counter gear 150, and further this counter shaft is linked to a drive wheel via gear mechanism or differential or the like not shown.

Continuing, the oil line configuration of each configuration element will be described.

The oil chamber 56 of the hydraulic servo 50 of the fourth clutch C-4, in other words the oil chamber 56 which is constructed by the clutch drum 52 and the piston member 53 being sealed together with the sealing rings a9 and a10 communicates with an oil line c51 wherein the clutch drum 52 and the support wall 120 are sealed together with the sealing rings d9 and d10 and is within the support wall 120, and the hydraulic oil is supplied from this oil line c51. The cancel oil chamber 57 which is constructed by the piston member 53 and the cancel plate 54 being sealed together with the sealing rings a7 and a9 has the oil supplied thereto from an oil line omitted from the diagram.

With the oil chamber 46 of the hydraulic servo 40 of the third clutch C-3, in other words the oil chamber 46 which is constructed by the clutch drum 42 and the piston member 43 being sealed together with the sealing rings a1 and a2, and the linking member 140 and the clutch drum 42 being sealed together with the sealing rings d3 and d4, wherein each of these are sealed and communicate with the oil line c41 within the boss unit $3b$, and the hydraulic oil is supplied from this oil line c41. The cancel oil chamber 47 which is constructed by the piston member 43 and the cancel plate 44 being sealed together with the sealing rings a1 and a3 has the oil supplied thereto from an oil line omitted from the diagram.

With the oil chamber 26 of the hydraulic servo 20 of the first clutch C-1, in other words the oil chamber 26 which is constructed by the clutch drum 22 and the piston member 23 being sealed together with the sealing rings a4 and a5, and the boss unit $3b$ and the input shaft 12 being sealed together with the sealing rings d5 and d6, each of these are sealed to communicate with the oil lines c22, c23, and c24 within the input shaft 12, and the hydraulic oil is supplied from this oil line c24. The cancel oil chamber 27 which is constructed by the piston member 23 and the cancel plate 24 being sealed together with the sealing rings a4 and a6 has the oil supplied thereto from an oil line omitted from the diagram.

The oil chamber 36 of the hydraulic servo 30 of the second clutch C-2, in other words the oil chamber 36 which is constructed by the clutch drum 32 and the boss unit $3d$ being sealed together with the sealing rings a4 and a6, communicates with the oil line c31 within the boss unit $3b$, wherein between the clutch drum 32 and the boss unit $3d$ is sealed with the sealing rings d11, d12, and the hydraulic oil is supplied from this oil line c31. The cancel oil chamber 37 which is constructed by the piston member 33 and the cancel plate 34 being sealed together with the sealing rings a10 and a12 has the oil supplied thereto from an oil line omitted from the diagram.

Further, the oil chamber 76 of the hydraulic servo 70 of the second brake B-2, in other words the oil chamber 76 which is constructed by the cylinder portion provided on the side wall portion $3c1$ of the transmission case 3 and the piston member 73 being sealed together with the sealing rings a13 and a14, has the oil supplied thereto from an oil line of the side wall portion omitted from the diagram.

As in the above, according to the automatic transmission $1_9$ relating to the present invention, the hydraulic servo 50 of the fourth clutch C-4 is placed between the axial direction of the planetary gear unit PU and the planetary gear DP, and the hydraulic servos 20 and 40 of the first and third clutches C-1 and C-3 are placed on the side opposite from the planetary gear unit PU in the axial direction as to the hydraulic servo 50 of the fourth clutch C-4, and the input shaft 12 and the fourth clutch C-4 are linked via the linking member 140 that passes by the outer circumferential side of the first and third clutches C-1 and C-3, and the first and third clutches C-1 and C-3 are each linked to the sun gears S2 and S3 of the planetary gear unit PU via the linking members 101 and 102 that pass through the inner circumferential side of the fourth clutch C-4, and so the members that link the various clutches and the various rotation elements of the planetary gear PU are prevented from clashing, and while the linking member 140 that rotates from the input rotation (in other words, not rotated at an increased speed nor does the transmitting torque increase) can be placed on the outer circumferential side, the linking members 101 and 102 that have the possibility of greatly accelerating rotation or the large transmitting torque can be placed on the inner circumferential side. Thus, the thickness of the various linking members that linked these clutches and the various rotation elements of the planetary gear unit PU can be designed to be made relatively thin and lightweight, and an automatic transmission $1_1$ that is more lightweight with improved controllability can be designed. Further, the linking member 140 that rotates from the input rotation can be placed on the outer circumferential side, and so an input rotation count sensor that detects the number of input rotations can be easily affixed.

Also, the hydraulic oil is supplied from the oil line c51 that is provided on the support wall 120 to the hydraulic servo 50 of the fourth clutch C-4, and so the number of sealing rings can be reduced compared to the case wherein the hydraulic oil is supplied from the input shaft 12 (or the intermediate shaft 13) via the linking member 101 and the linking member 102. Thus, efficiency improvements of the automatic transmission $1_1$ due to the decrease in sliding resistance by the sealing rings, decrease in hydraulic oil leaking from the sealing rings, and decrease of controllability, are enabled.

Further, the clutch drum 52 of the hydraulic servo 50 of the fourth clutch C-4 is open toward the planetary gear DP side, and so the member that outputs the rotation of the fourth clutch C-4 and the linking member 140 can be prevented from clashing.

Also, the input rotation from the fourth clutch C-4 and the reduced speed rotation from the third clutch C-3 can be transmitted to the sun gear S2, both using the linking member 101. Thus, the number of parts can be reduced and the automatic transmission 19 can be designed to be more lightweight and compact.

Further, the hydraulic servo 40 of the third clutch C-3 is placed on the side opposite in the axial direction from the hydraulic servo 50 of the fourth clutch C-4 as to the planetary gear DP, and upon the boss unit $3b$ which extends from the case 3, and the hydraulic oil is supplied to the hydraulic servo 40 of the third clutch C-3 via the oil line c41 provided within the boss unit $3b$, so as to have the hydraulic oil pressure capable of being supplied to the third clutch C-3, while also the linking of the third clutch C-3 and the linking member 101 is enabled.

Further, the hydraulic servo 20 of the first clutch C-1 is placed between the axial direction of the planetary gear DP and the hydraulic servo 50 of the fourth clutch C-4, and the hydraulic oil is supplied from the oil line c21 provided within the input shaft 12, and the hydraulic oil pressure is supplied to the first clutch C-1 so as to be capable of engaging, while also compared to the case wherein the first clutch C-1 is placed on the side opposite of the planetary gear unit PU in the axial direction as to the planetary gear DP, placing the transmitting member which transmits the output rotation of the first clutch C-1 through the outer circumferential side of the planetary gear DP becomes unnecessary. In other words the number of members which pass by the outer circumferential side of the planetary gear DP can be reduced. Thus, the automatic transmission 19 can be designed to be more compact in the radial direction.

Further, the hydraulic servo 30 of the second clutch C-2 is placed on the side opposite from the planetary gear DP in the axial direction as to the planetary gear unit PU, and so multiple oil lines being provided concentrated within the boss unit $3b$ or on the support wall 120 can be prevented.

Also, the forward first speed is achieved by engaging the first clutch C-1 and also retaining the one-way clutch F-1 (or the second brake B-2), the forward second speed achieved by engaging the first clutch C-1 and by also retaining the first brake B-1, the forward third speed achieved by engaging the first clutch C-1 and the third clutch C-3, the forward fourth speed achieved by engaging the first clutch C-1 and the fourth clutch C-4, the forward fifth speed achieved by engaging the first clutch C-1 and the second clutch C-2, the forward sixth speed achieved by engaging the second clutch C-2 and the fourth clutch C-4, the forward seventh speed achieved by engaging the second clutch C-2 and the third clutch C-3, the forward eighth speed achieved by engaging the second clutch C-2 and by also retaining the first brake B-1, and the reverse speed achieved by engaging the third clutch C-3 or the fourth clutch C-4 and by also retaining the second brake B-2.

Now, the vehicle automatic transmission $1_9$ relating to the present ninth embodiment can have the vehicle automatic transmission $1_{19}$ relating to the later-described nineteenth embodiment configured by the speed shifting mechanism $2_9$ being flipped in the left and right direction (the axial direction) with virtually no change.

Tenth Embodiment

Figure 13:
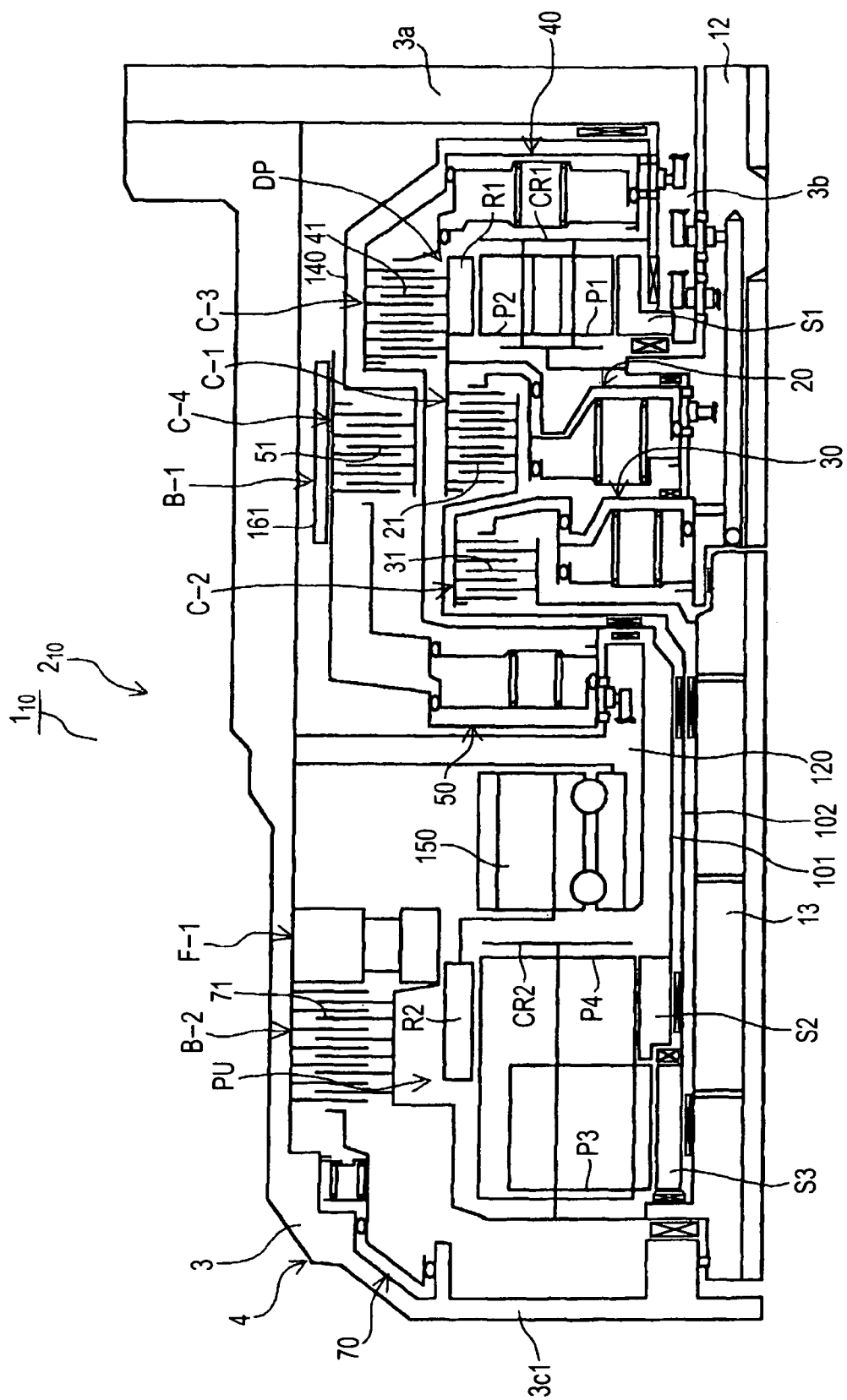
FIG. 13 is a cross-sectional diagram illustrating an automatic transmission relating to a tenth embodiment.

Next, a tenth embodiment wherein a portion of the above-mentioned ninth embodiment has been changed will be described, following FIG. 13. FIG. 13 is a cross-sectional diagram illustrating the automatic transmission $1_{10}$ relating to the tenth embodiment. With the tenth embodiment to be described below, only the portions that differ from the automatic transmission $1_9$ according to the ninth embodiment will be described, and the portions other than these are the same and therefore the description thereof will be omitted.

The vehicle automatic transmission $1_{10}$ relating to the present tenth embodiment has the hydraulic servo 30 of the second clutch C-2 disposed between the axial direction of the planetary gear unit PU (specifically the counter gear 150) and the planetary gear DP, and more specifically, between the axial direction of the hydraulic servo 50 of the fourth clutch C-4 and the hydraulic servo 20 of the first clutch C-1 as to the automatic transmission $1_9$ relating to the ninth embodiment.

Now, the vehicle automatic transmission $1_{10}$ relating to the present tenth embodiment can have the vehicle automatic transmission $1_{20}$ relating to the later-described twentieth embodiment configured by the speed shifting mechanism $2_{10}$ being flipped in the left and right direction (the axial direction) with virtually no change, adding a linking member which links the second clutch C-2 and the carrier CR2 of the planetary gear unit PU, and rotating the input shaft and the intermediate shaft integrally.

Eleventh Embodiment

Figure 14:
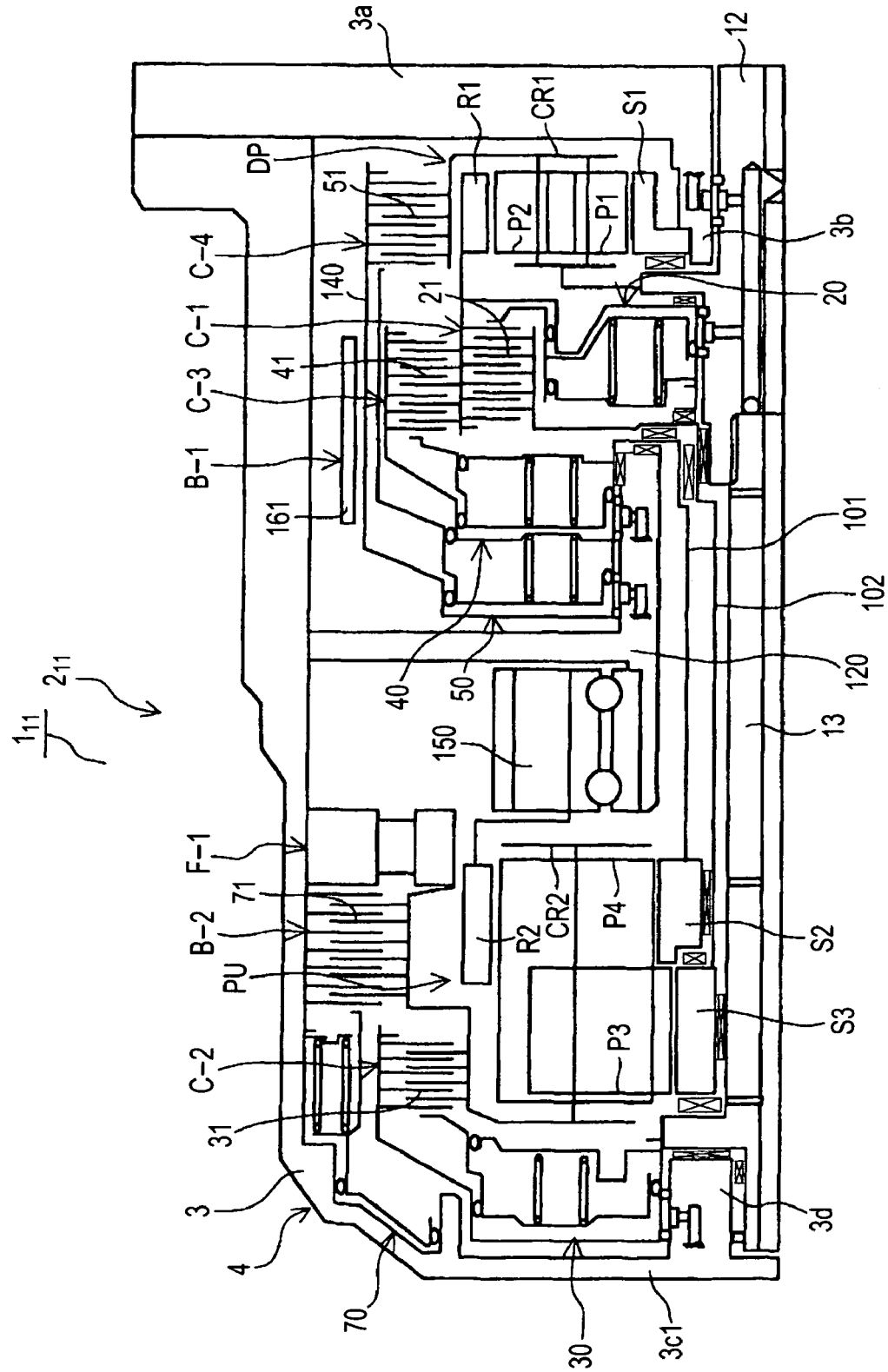
FIG. 14 is a cross-sectional diagram illustrating an automatic transmission relating to an eleventh embodiment.

Next, an eleventh embodiment wherein a portion of the above-mentioned ninth embodiment has been changed will be described, following FIG. 14. FIG. 14 is a cross-sectional diagram illustrating the automatic transmission $1_{11}$ relating to the eleventh embodiment. With the eleventh embodiment to be described below, only the portions that differ from the automatic transmission $1_9$ according to the ninth embodiment will be described, and the portions other than these are the same and therefore the description thereof will be omitted.

The vehicle automatic transmission $1_{11}$ relating to the eleventh embodiment has the hydraulic servo 40 of the third clutch C-3 disposed between the axial direction of the planetary gear unit PU (specifically the counter gear 150) and the planetary gear DP, and more specifically, between the axial direction of the hydraulic servo 50 of the fourth clutch C-4 and the hydraulic servo 20 of the first clutch C-1 as to the automatic transmission relating to the ninth embodiment $1_9$.

Now, the vehicle automatic transmission $1_{11}$ relating to the present eleventh embodiment can have the vehicle automatic transmission $1_{21}$ relating to the later-described twenty-first embodiment configured by the speed shifting mechanism $2_{11}$ being flipped in the left and right direction (the axial direction) with virtually no change.

Twelfth Embodiment

Figure 15:
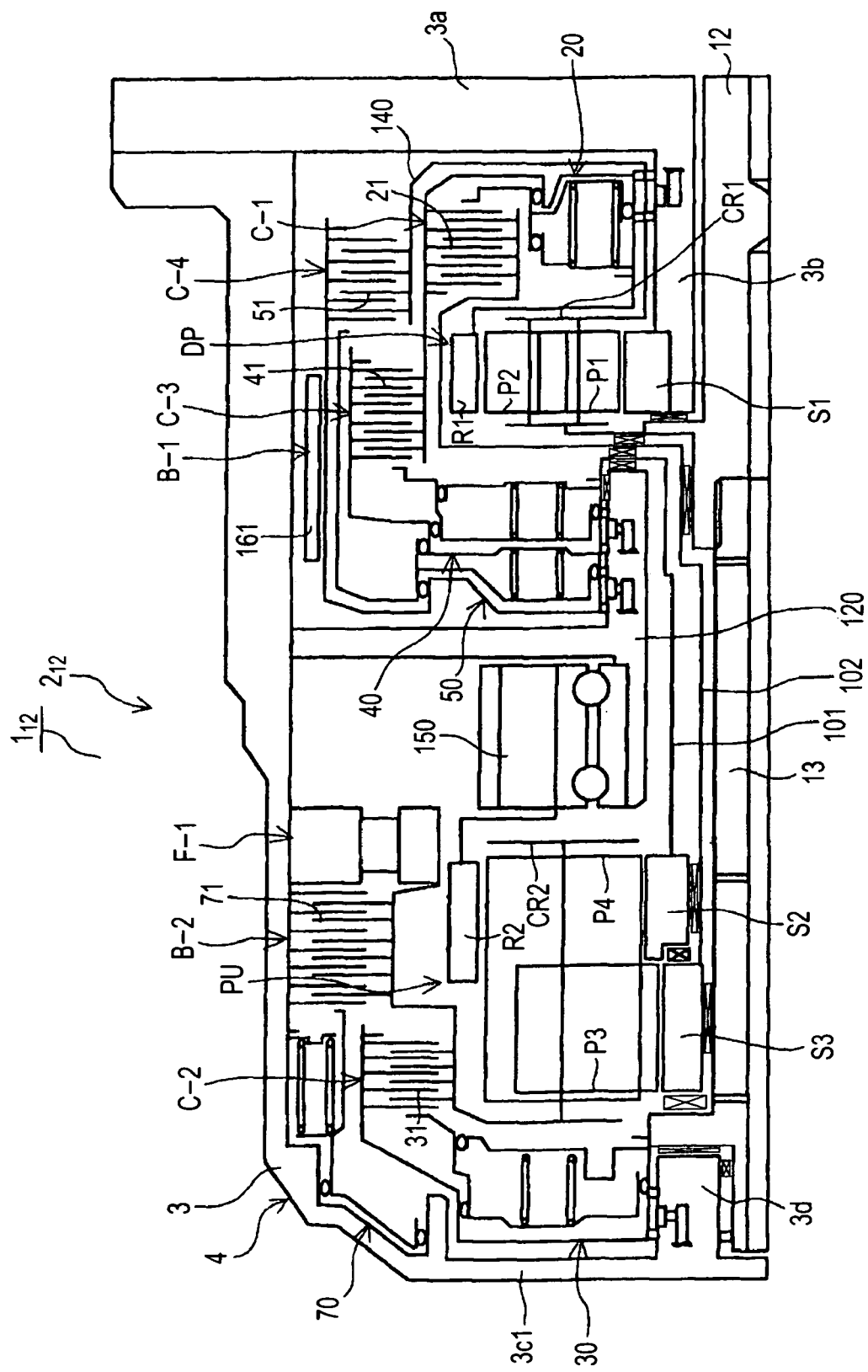
FIG. 15 is a cross-sectional diagram illustrating an automatic transmission relating to a twelfth embodiment.

Next, a twelfth embodiment wherein a portion of the above-mentioned ninth embodiment has been changed will be described, following FIG. 15. FIG. 15 is a cross-sectional diagram illustrating the automatic transmission $1_{12}$ relating to the twelfth embodiment. With the twelfth embodiment to be described below, only the portions that differ from the automatic transmission $1_9$ according to the ninth embodiment will be described, and the portions other than these are the same and therefore the description thereof will be omitted.

The vehicle automatic transmission $1_{12}$ relating to the twelfth embodiment has the hydraulic servo 40 of the third clutch C-3 disposed between the axial direction of the planetary gear unit PU (specifically the counter gear 150) and the planetary gear DP, and more specifically, is placed between the axial direction of the hydraulic servo 50 of the fourth clutch C-4 and the planetary gear DP. Further, the hydraulic servo 20 of the first clutch C-1 is placed on the side opposite of the planetary gear unit PU in the axial direction as to the planetary gear DP.

Now, the vehicle automatic transmission $1_{12}$ relating to the present twelfth embodiment can have the vehicle automatic transmission $1_{22}$ relating to the later-described twenty-second embodiment configured by the speed shifting mechanism $2_{12}$ being flipped in the left and right direction (the axial direction) with virtually no change.

Thirteenth Embodiment

Figure 16:
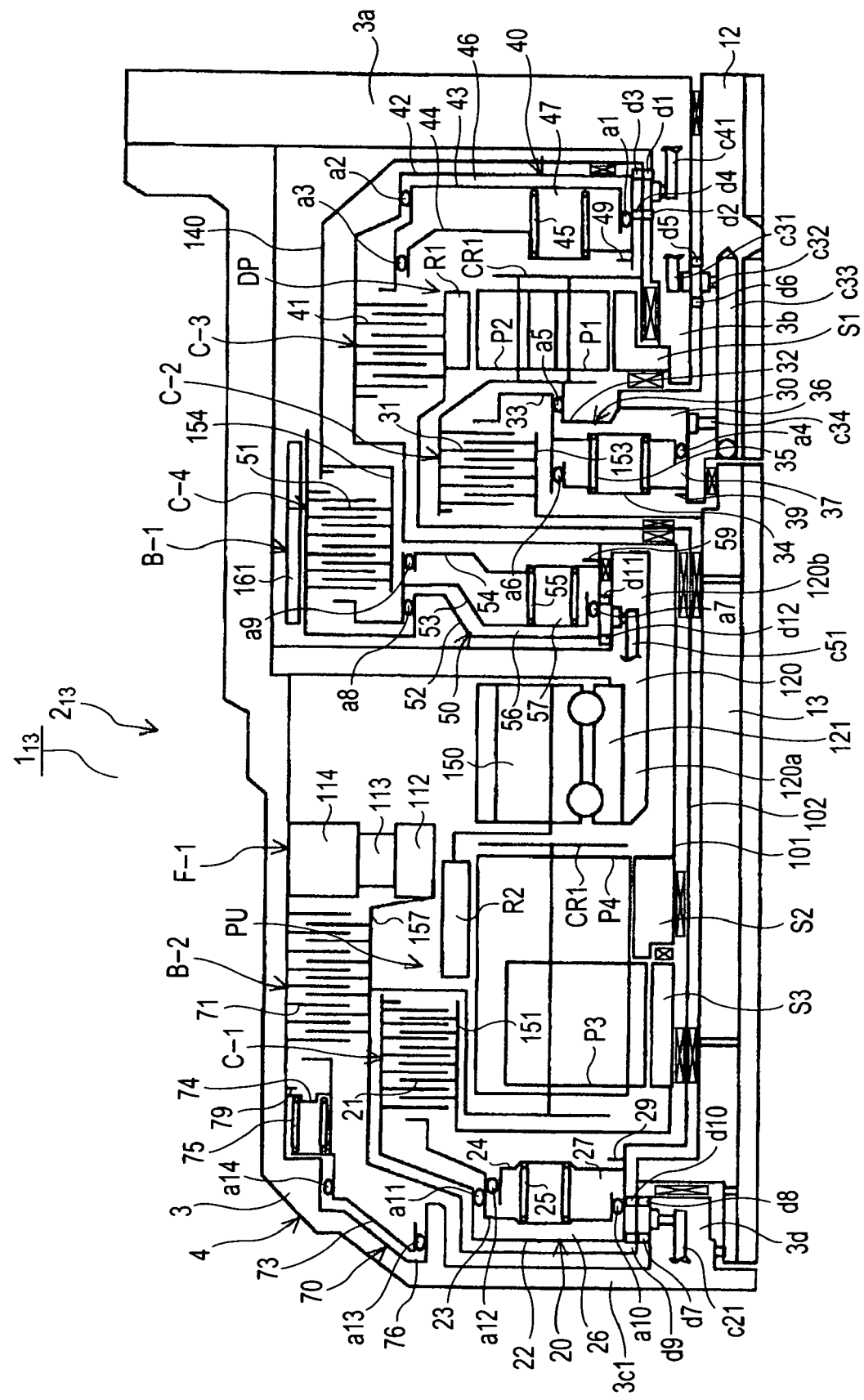
FIG. 16 is a cross-sectional diagram illustrating an automatic transmission relating to a thirteenth embodiment.

Next, a thirteenth embodiment wherein a portion of the above-mentioned first through tenth embodiments has been changed will be described, following FIG. 16. FIG. 16 is a cross-sectional diagram illustrating the automatic transmission $1_{13}$ relating to the thirteenth embodiment. With the thirteenth embodiment to be described below, only the portions that differ from the automatic transmission 19 according to the ninth embodiment will be described, and the portions other than these, except for a portion of the construction such as the oil lines, the sealing rings, and the hub members, are the same and therefore the description thereof will be omitted.

As illustrated in FIG. 16, the automatic transmission $1_{13}$ which is suitable for mounting on a vehicle which is an FF type (front drive, front engine) for example has a case 4 which is constructed by connecting a transmission case 3 or a housing case or the like which encloses a torque converter not shown, and within this transmission case 3 is placed a speed shifting mechanism $2_{13}$, a counter shaft of which the diagram is omitted, and a differential device. This speed shifting mechanism $2_{13}$ is placed on, for example, the input shaft 12 which is on the same axis as the output shaft of the engine (not shown), and on the axis upon which the intermediate shaft 13 is the center.

Within the transmission case 3, the planetary gear DP and the planetary gear unit PU are placed on the same axis, and a hydraulic servo 50 of the fourth clutch C-4 of which the friction plate 51 is placed on the outer circumferential side is placed between the axial direction of this planetary gear DP and the planetary gear unit PU. Further, a support wall (center support) 120 so as so be adjacent to the hydraulic servo 50 of this fourth clutch C-4 is placed between the hydraulic servo 50 of this fourth clutch C-4 and this planetary gear unit PU. The boss unit 120b on the right side inner circumferential side of this support wall 120 is extended to the inner portion of the hydraulic servo 50 of this fourth clutch C-4, and further, the boss unit 120a on the left side inner circumferential side of this support wall 120 is extended to the inner portion of the counter gear 150. In other words, this hydraulic servo 40 and counter gear 150 are placed and supported so as to each be adjacent to each other on opposite sides via the support wall 120.

The hydraulic servo 30 of the second clutch C-2 of which the friction plate 31 is placed on the outer circumferential side of the planetary gear DP is placed between the axial direction of the planetary gear unit PU and the planetary gear DP. Specifically, the hydraulic servo 30 of this second clutch C-2 is placed on the input shaft 12 within the axial direction of the hydraulic servo 50 of the fourth clutch C-4 and the hydraulic servo 50.

On the other hand, the hydraulic servo of the third clutch of which the friction plate 41 is placed on the right side of the above-mentioned friction plate 51, is placed on the front side which is the side opposite in the axial direction from the planetary gear set PU as to the hydraulic servo 50 of the aforementioned fourth clutch C-4. Further, the hydraulic servo 40 of the third clutch C-3 is placed on the boss unit 3b which extends from the bulkhead member 3a which separates between the transmission case 3 and the housing case not shown.

Further, the hydraulic servo 20 of the first clutch C-1 of which the friction plate 21 is placed on the outer circumferential side is placed on the boss unit 3d which extends from the side wall portion 3c1 of the transmission case 3, on the left side which is the side opposite in the axial direction from the planetary gear DP as to the planetary gear set PU.

Further, the brake band 161 of the first brake B-1, omitted from the diagram, of the hydraulic servo, is placed on the outer diameter side of the friction plate 51 of the fourth clutch C-4 so as to form an overlap. Within this description, the brake band 161 is in a band shape, but is described as one type of friction plate, that is to say, "the friction plate of the brake" includes the friction plate of a multi-disc brake and the brake band of a band brake.

Further, the hydraulic servo 70 of the second brake B-2 of which the friction plate 71 is placed on the outer circumferential side of the planetary gear unit PU, is placed on the side wall portion 3c1 of the outer circumferential side of the hydraulic servo 30 of the second clutch C-2. Also, a one-way clutch F-1 is placed on the outer circumferential side of this planetary gear unit PU.

Continuing, the speed shifting mechanism $2_{13}$ will be described in detail. The planetary gear DP which is placed on the inner circumferential side of the transmission case 3 comprises a sun gear S1, a carrier CR1, and a ring gear R1. On the right side of this planetary gear DP, the above-described boss unit 3b is provided on the outer face of the input shaft 12 as a cover, and the above-mentioned sun gear S1 is fixed so as to be incapable of rotating. Further, the carrier CR1 supports the pinions P1 and P2 so as to be capable of rotating, and these pinions P1 and P2 mesh with each other and also the former pinion P meshes with the sun gear S1, and the latter pinion P2 meshes with the ring gear R1. The carrier plate on the left side of this carrier CR1 is linked to the input shaft 12, and also the carrier plate on the right side is linked to the (first) linking member in a drum shape. Also, the ring gear R1 is linked specifically to the clutch drum 22 of the later-described first clutch C-1 via the fourth clutch C-4, the support wall 120, the counter gear 150, and the linking member 102 that passes through the inner circumferential side of the planetary gear unit PU.

On the other hand, the linking member 140 linked to the above-mentioned carrier CR1 is linked to the hub member 154 which is splined to the inner friction plate of the friction plate 51 of the fourth clutch C-4. This fourth clutch C-4 comprises a friction plate 51 and a hydraulic servo 50 that disengages this friction plate 51. This hydraulic servo 50 has a clutch drum 52 that is open towards the right (the planetary gear DP side), a piston member 53, a cancel plate 54, and a return spring 55. The piston member 53 is placed on the right side of the clutch drum 52 so as to be capable of moving forward or backwards, and from two sealing rings a7 and a8, an oil-tight hydraulic oil chamber 56 is configured between the clutch drum 52. Further, the cancel plate 54 is prevented from moving towards the back by the snap ring 59 fit to the clutch drum 52. The cancel plate 54 has a return spring 55 placed compressed between the piston member 53 placed on the left side of the cancel plate 54, and also comprises an oil tight canceling oil chamber 57 by two sealing rings a7 and a9.

Further, an outer friction plate of the friction plate 51 is splined to the inner circumferential side of the front edge portion of the clutch drum 52, and also the inner friction plate thereof is splined to the hub member 154. In other words, when this fourth clutch C-4 engages, the input rotation of the carrier CR1 of the above-mentioned planetary gear DP is output to the clutch drum 52. This clutch drum 52 is linked to the (second) linking member 101 supported so as to be capable of rotating on the further outer circumferential side of the aforementioned linking member 102, and this linking member 101 is linked to the sun gear S2 of the above-mentioned planetary gear unit PU.

The third clutch C-3 is placed on the inner circumferential side of the above-mentioned linking member 140 and comprises a friction plate 41 and a hydraulic servo 40 that disengages this friction plate 41. This hydraulic servo 40 has a clutch drum 42 that is open towards the left, a piston member 43, a cancel plate 44, and a return spring 45. Further, the piston member 43 is placed on the left of the clutch drum 42 so as to be capable of moving forward or backwards, and from two sealing rings a1 and a2, an oil-tight hydraulic oil chamber 46 is configured between the clutch drum 42. Further, the cancel plate 44 is prevented from moving towards the left by the snap ring 49 fit to the clutch drum 42. The cancel plate 44 has a return spring 45 placed compressed between the piston member 43 placed on the right of the cancel plate 44, and also comprises an oil tight canceling oil chamber 47 by two sealing rings a1 and a3.

Also, an outer friction plate of the friction plate 41 is splined to the inner circumferential side of the front edge portion of the clutch drum 42, and also the inner friction plate thereof is splined to the outer circumferential side of the above-mentioned ring gear R1. In other words when this third clutch C-3 engages, the reduced speed rotation thereof is input to the clutch drum 42. This clutch drum 42 is linked to the linking member 101 that is linked to the sun gear S2 of the planetary gear unit PU.

Further, the first brake B-1 is placed on the outer diameter side of the clutch drum 52, and comprises an unshown hydraulic servo which is placed so as to be incapable of rotation as to the transmission case 3, and a brake band 161 which tightens and releases the outer portion of the clutch drum 52 by this hydraulic servo. In other words, when this first brake B-1 is retained, the clutch drum 52 is fixed so as to be incapable of rotation, and the rotation of the above-described linking member 101 and sun gear R2 is fixed.

The second clutch C-2 is on the right side of the hydraulic servo 50 of the fourth clutch C-4, and is placed on the left edge outer circumferential side of the input shaft 12. This second clutch C-2 comprises a friction plate 31 and a hydraulic servo 30 that disengages the friction plate 31. This hydraulic servo 30 is open towards the left, so as to form a portion of the carrier plate of the left side of the above-mentioned carrier CR1 from one portion of the left side outer circumferential side of the input shaft 12, and has a clutch drum 32 which is linked to the input shaft 12, a piston member 33, a cancel plate 34, and a return spring 35. Further, the piston member 33 is placed on the right of the clutch drum 32 so as to be capable of moving forward or backwards, and from two sealing rings a4 and a5, an oil-tight hydraulic oil chamber 36 is configured between the clutch drum 32. Further, the cancel plate 34 is prevented from moving towards the right by the snap ring 39 fit to the input shaft. The cancel plate 34 has a return spring 35 placed compressed between the piston member 33 placed on the right of the cancel plate 34, and also comprises an oil tight canceling oil chamber 37 by two sealing rings a4 and a6.

Also, an outer friction plate of the friction plate 31 is splined to the inner circumferential side of the front edge portion of the clutch drum 32, and also the inner friction plate thereof is splined to the hub member 153 which is linked to the intermediate shaft 13. When this second clutch C-2 is engaged, the input rotation of the above-mentioned input shaft 12 is output to the intermediate shaft 13 via the hub member 153. The left side of this intermediate shaft 13 is linked to the hub member 157 which is splined to the inner friction plate of the friction plate 71 of the second brake B-2 after passing through the outer circumferential side from the left side of the later-described first clutch C-1, and also this hub member 157 is linked to the carrier plate on the left side of the carrier CR2 of the planetary gear unit PU. In other words, when this second clutch C-2 engages, the input rotation of the input shaft 12 is input to the carrier CR2 of the planetary gear unit PU via the intermediate shaft 13 and the hub member 157.

Further, on the carrier plate on the left side of the above-described carrier CR2, the hub member 157 is linked, and also the inner race 112 of the one-way clutch F-1 is linked. This one-way clutch F-1 comprises the above-mentioned inner race 112, a sprag mechanism 113, and an outer race 114, and this outer race 114 is linked to the transmission case 3 by the linking member 115, and the rotation thereof is fixed. In the case that the inner race 112 rotates as to the outer race 114, the rotation in only one direction is restricted by the sprag mechanism 113 and is fixed.

The above-mentioned hub member 157 is splined with the inner friction plate of the friction plate 71 of the second brake B-2. This second brake B-2 has a hydraulic servo 70 wherein the side face of the sidewall portion 3c1 on the left of the transmission case 3 is a cylinder portion, and this hydraulic servo 70 has a piston member 73, a cancel plate 74, and a return spring 75. The piston member 73 is placed on the right of the cylinder portion of the sidewall portion 3c1 so as to be capable of moving forward or backwards, and from two sealing rings a13 and a14, an oil-tight hydraulic oil chamber 76 is configured between this cylinder portion. Further, the cancel plate 74 is prevented from moving to the right side by the snap ring 79 fit to the transmission case 3. Also, a return spring 75 is placed compressed between the cancel plate 74 and the piston member 73 placed on the left side thereof.

The outer friction plate of the friction plate 71 of the second brake B-2 is splined with the inner face of the transmission case 3, that is to say, when this second brake B-2 is retained, the hub member 157 is fixed so as to be incapable of rotating, and the rotation of the carrier CR2 of the above-mentioned planetary gear unit PU is fixed.

On the other hand, the first clutch C-1 is placed on the left side of the planetary gear unit PU and on the outer circumferential side of the left edge of the intermediate shaft 13. This first clutch C-1 comprises a friction plate 21 and a hydraulic servo 20 that disengages the friction plate 21. This hydraulic servo 20 is open towards the right side and has a clutch drum 22 which is also linked to the ring gear R1 via the above-mentioned linking member 102, a piston member 23, a cancel plate 24, and a return spring 25. Further, the piston member 23 is placed on the right of the clutch drum 22 so as to be capable of moving forward or backwards, and from two sealing rings a10 and a11, an oil-tight hydraulic oil chamber 26 is configured between the clutch drum 22. Further, the cancel plate 24 is prevented from moving towards the right by the snap ring 29 fit to the intermediate shaft 13. The cancel plate 24 has a return spring 25 placed compressed between the piston member 23 placed on the right of the cancel plate 24, and also comprises an oil tight canceling oil chamber 27 by two sealing rings a10 and a12.

Further, the outer friction plate of the friction plate 21 is splined to the inner circumferential side of the front edge portion of the clutch drum 22, and also the inner friction plate thereof is splined to the hub member 151 which is linked to the sun gear S3 of the planetary gear unit PU. In other words, when this first clutch C-1 is engaged, the reduced speed rotation of the ring gear R1 of the above-mentioned planetary gear DP is output to the hub member 151, and the reduced speed rotation is input to the sun gear S3.

This planetary gear unit PU comprises a sun gear S2, a sun gear S3, a carrier CR2, and a ring gear R2. Of these, the sun gear S3 is supported by the intermediate shaft 13 so as to be capable of rotating, while also being linked to the hub member 151 as described above, and is capable of inputting the reduced speed rotation from the first clutch C-1. Further, the sun gear S2 is supported by the linking member 102 so as to be capable of rotating, and is linked to the linking member 101 as described above, and the reduced speed rotation from the third clutch C-3 or the fourth clutch C-4 or the input rotation is capable of inputting, and is capable of retaining by the first brake B-1. Further, the carrier CR2 is capable of the input rotation from the second clutch C-2 being input, and the rotation in one direction by the one-way clutch F-1 is restricted, and the rotation is capable of fixing the rotation by the second brake B-2.

This carrier CR2 supports the short pinion P3 and the long pinion P4 so as to be capable of rotating, and these pinions P3 and P4 mesh together, and the short pinion P3 meshes with the sun gear S3 and the long pinion P4 meshes with the sun gear S2 and the ring gear R3. Also, this ring gear R3 is linked to the counter gear 150.

The counter gear 150 is placed between the axial direction of the planetary gear unit PU and the planetary gear DP, and is adjacent to the left side of the support wall 120 as described above. Specifically, the counter gear 150 is placed on the boss unit 120a which extends from the inner diameter side of the support wall 120, via a ball bearing 121. Also, a gear which is linked to the unshown counter shaft meshes with the outer circumferential side of this counter gear 150, and further this counter shaft is linked to a drive wheel via gear mechanism or differential or the like, not shown.

Continuing, the oil line configuration of each configuration element will be described.

The oil chamber 56 of the hydraulic servo 50 of the fourth clutch C-4, in other words the oil chamber 56 which is constructed by the clutch drum 52 and the piston member 53 being sealed together with the sealing rings a9 and a10 communicates with an oil line c51 which has sealed together the clutch drum 52 and the support wall 120 with the sealing rings d11 and d12 and is within the support wall 120, and the hydraulic oil is supplied from this oil line c51. The cancel oil chamber 57 which is constructed by the piston member 53 and the cancel plate 54 being sealed together with the sealing rings a7 and a9 has the oil supplied thereto from an oil line omitted from the diagram.

The oil chamber 46 of the hydraulic servo 40 of the third clutch C-3, in other words the oil chamber 46 which is constructed by the clutch drum 42 and the piston member 43 being sealed by the seal rings a1 and a2, communicates with the oil line c41 within the boss unit 3b, the linking member 140 and the boss unit 3b being sealed together with the sealing rings d1 and d2, and the linking member 140 and the clutch drum 42 being sealed together with the sealing rings d3 and d4, and the hydraulic oil is supplied from this oil line c41. The cancel oil chamber 47 which is constructed by the piston member 43 and the cancel plate 44 being sealed together with the sealing rings a1 and a3 has the oil supplied thereto from an oil line omitted from the diagram.

The oil chamber 36 of the hydraulic servo 30 of the second clutch C-2, in other words the oil chamber 36 which is constructed by the clutch drum 32 and the piston member 33 being sealed together with the sealing rings a4 and a6, communicates with the oil line c31 within the boss unit 3d and the oil lines c32, c33, and c34 within the input shaft 12, wherein between the boss unit 3d and the input shaft 12, are sealed with the sealing rings d5 and d6, and the hydraulic oil is supplied from this oil line c34. The cancel oil chamber 37 which is constructed by the piston member 33 and the cancel plate 34 being sealed together with the sealing rings a4 and a6 has the oil supplied thereto from an oil line omitted from the diagram.

Further, the oil chamber 26 of the hydraulic servo 20 of the first clutch C-1, in other words the oil chamber 26 which is constructed by the clutch drum 22 and the piston member 23 being sealed together with the sealing rings a10 and a11, communicates with the oil line c21 within the boss unit 3d, the boss unit 3d and the linking member between the hub member 157 and the intermediate shaft being sealed together with the sealing rings d7 and d8, and the linking member to the hub member 157 from the intermediate shaft and the clutch drum 22 being sealed together with the sealing rings d9 and d10, and the hydraulic oil is supplied from this oil line c21. The cancel oil chamber 27 which is constructed by the piston member 23 and the cancel plate 24 being sealed together with the sealing rings a9 and a11 has the oil supplied thereto from an oil line omitted from the diagram.

Further, the oil chamber 76 of the hydraulic servo 70 of the second brake B-2, in other words the oil chamber 76 which is constructed by the side wall portion 3c1 of the transmission case 3 and the piston member 73 being sealed together with the sealing rings a13 and a14, has the oil supplied thereto from an oil line on the wall side portion 3c1 omitted from the diagram.

As in the above, according to the automatic transmission 1<sub>13</sub> relating to the present invention, the hydraulic servo 50 of the fourth clutch C-4 is placed between the axial direction of the planetary gear unit PU and the planetary gear DP, and the hydraulic servo 40 of the third clutch C-3 is placed on the side opposite from the planetary gear unit PU in the axial direction as to the hydraulic servo 50 of the fourth clutch C-4, and the input shaft 12 and the fourth clutch C-4 are linked via the linking member 140 that passes through the outer circumferential side of the third clutch C-3, and the third clutch C-3 is linked to the sun gear S2 of the planetary gear unit PU via the linking members 101 and 102 that pass through the inner circumferential side of the fourth clutch C-4, and so the members that link the various clutches and the various rotation elements of the planetary gear PU are prevented from clashing, and while the linking member 140 that rotates from the input rotation (in other words, not rotated at an increased speed nor does the transmitting torque increase) can be placed on the outer circumferential side, the linking member 101 which has the possibility of greatly accelerating rotation can be placed on the inner circumferential side. Thus, the thickness of the various linking members that linked these clutches and the various rotation elements of the planetary gear unit PU can be designed to be made relatively thin and lightweight, and an automatic transmission $1_1$ that is more lightweight with improved controllability can be designed. Further, the linking member 140 that rotates from the input rotation can be placed on the outer circumferential side, and so an input rotation count sensor that detects the number of input rotations can be easily affixed.

Also, the hydraulic oil is supplied from the oil line c51 that is provided on the support wall 120 to the hydraulic servo 50 of the fourth clutch C-4, and so the number of sealing rings can be reduced compared to the case wherein the hydraulic oil is supplied from the input shaft 12 (or the intermediate shaft 13) via the linking member 101 and the linking member 102. Thus, efficiency improvements of the automatic transmission $1_{13}$ due to the decrease in sliding resistance by the sealing rings, decrease in hydraulic oil leaking from the sealing rings, and preventing decrease of controllability, are enabled.

Further, the clutch drum 52 of the hydraulic servo 50 of the fourth clutch C-4 is open toward the planetary gear DP side, and so the member that outputs the rotation of the fourth clutch C-4 and the linking member 140 can be prevented from clashing.

Also, the input rotation from the fourth clutch C-4 and the reduced speed rotation from the third clutch C-3 can be transmitted to the sun gear S2, both using the linking member 101. Thus, the number of parts can be reduced and the automatic transmission $1_{13}$ can be designed to be more lightweight and compact.

Further, the hydraulic servo 40 of the third clutch C-3 is placed on the side opposite in the axial direction from the hydraulic servo 50 of the fourth clutch C-4 as to the planetary gear DP, and upon the boss unit 3b which extends from the case 3, and the hydraulic oil is supplied to the hydraulic servo 40 of the third clutch C-3 via the oil line c41 provided within the boss unit 3b, so as to have the hydraulic oil pressure capable of being supplied to the third clutch C-3, while also the linking of the third clutch C-3 and the linking member 101 is enabled.

Further, the hydraulic servo 30 of the second clutch C-2 is placed between the axial direction of the planetary gear DP and the hydraulic servo 50 of the fourth clutch C-4, and so disposing thereof between the axial direction of the planetary gear unit PU and the planetary gear DP can be enabled. Thus, the second clutch C-2, wherein a relatively smaller transmitting torque volume is sufficient, can be placed on the inner circumferential side of the friction plate 41 of the third clutch C-3, and the axial length of the vehicle automatic transmission $1_{13}$ can be shortened. Further, the carrier CR1 of the planetary gear DP and the clutch drum 32 of the second clutch C-2 can be made in common, and so the axial length of the automobile automatic transmission $1_{13}$ can be shortened.

Also, the forward first speed is achieved by engaging the first clutch C-1 and also retaining the one-way clutch F-1 (or the second brake B-2), the forward second speed achieved by engaging the first clutch C-1 and by also retaining the first brake B-1, the forward third speed achieved by engaging the first clutch C-1 and the third clutch C-3, the forward fourth speed achieved by engaging the first clutch C-1 and the fourth clutch C-4, the forward fifth speed achieved by engaging the first clutch C-1 and the second clutch C-2, the forward sixth speed achieved by engaging the second clutch C-2 and the fourth clutch C-4, the forward seventh speed achieved by engaging the second clutch C-2 and the third clutch C-3, the forward eighth speed achieved by engaging the second clutch C-2 and by also retaining the first brake B-1, and the reverse speed achieved by engaging the third clutch C-3 or the fourth clutch C-4 and by also retaining the second brake B-2.

Fourteenth Embodiment

Figure 17:
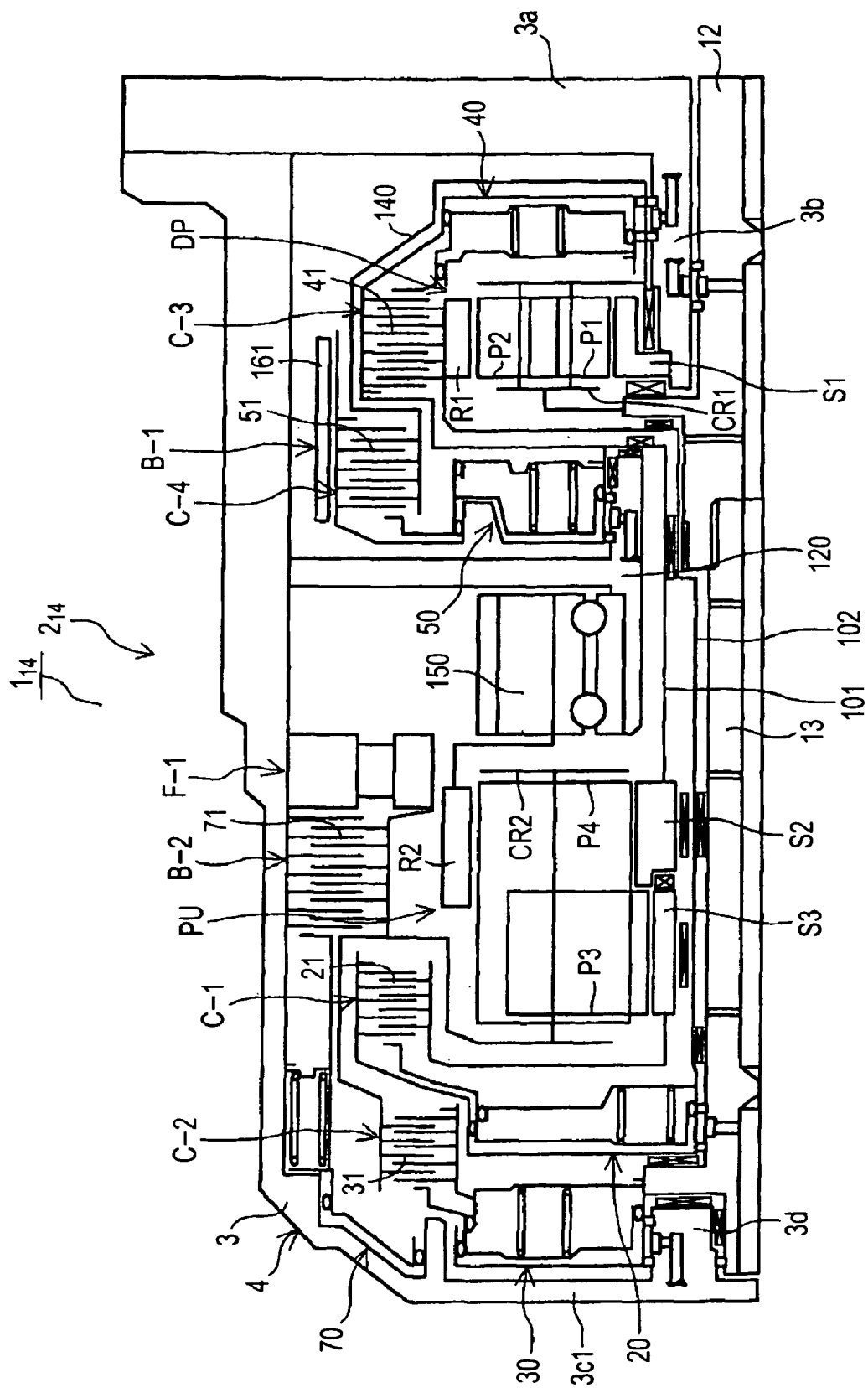
FIG. 17 is a cross-sectional diagram illustrating an automatic transmission relating to a fourteenth embodiment.

Next, a fourteenth embodiment wherein a portion of the above-mentioned thirteenth embodiment has been changed will be described, following FIG. 17. FIG. 17 is a cross-sectional diagram illustrating the automatic transmission $1_{14}$ relating to the fourteenth embodiment. With the fourteenth embodiment to be described below, only the portions that differ from the automatic transmission $1_{13}$ according to the thirteenth embodiment will be described, and the portions other than these are the same and therefore the description thereof will be omitted.

The automatic transmission $1_{14}$ relating to the present fourteenth embodiment has the hydraulic servo 30 of the second clutch C-2 on the side opposite of the planetary gear DP in the axial direction as to the planetary gear unit PU, compared to the automatic transmission $1_{13}$ relating to the thirteenth embodiment and specifically, the hydraulic servo 30 of the second clutch C-2 is placed on the side opposite in the axial direction from the planetary gear unit PU as to the hydraulic servo 20 of the first clutch C-1, and in other words, is placed further toward the left than the hydraulic servo 20 of the first clutch C-1.

Now, the vehicle automatic transmission $1_{14}$ relating to the present fourteenth embodiment can have the vehicle automatic transmission $1_{23}$ relating to the later-described twenty-third embodiment configured by the speed shifting mechanism $2_{14}$ being flipped in the left and right direction (the axial direction) with virtually no change.

Fifteenth Embodiment

Figure 18:
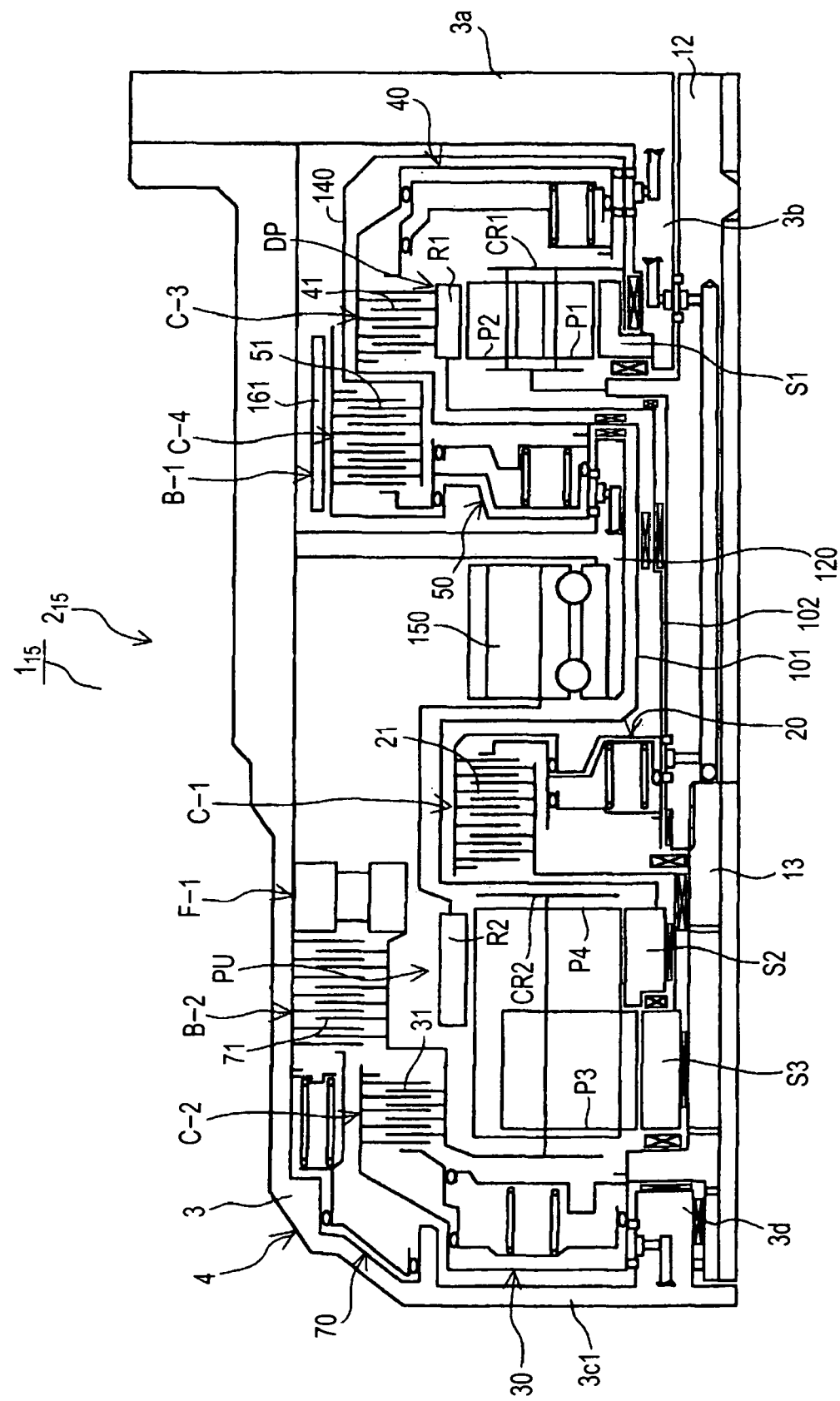
FIG. 18 is a cross-sectional diagram illustrating an automatic transmission relating to a fifteenth embodiment.

Next, a fifteenth embodiment wherein a portion of the above-mentioned thirteenth embodiment has been changed will be described, following FIG. 18. FIG. 18 is a cross-sectional diagram illustrating the automatic transmission $1_{15}$ relating to the fifteenth embodiment. With the fifteenth embodiment to be described below, only the portions that differ from the automatic transmission $1_{13}$ according to the thirteenth embodiment will be described, and the portions other than these are the same and therefore the description thereof will be omitted.

The automatic transmission $1_{15}$ relating to the fifteenth embodiment has the hydraulic servo 30 of the second clutch C-2 on the side opposite of the planetary gear DP in the axial direction as to the planetary gear unit PU, compared to the automatic transmission $1_{13}$ relating to the thirteenth embodiment and further, the hydraulic servo 20 of the first clutch C-1 is placed between the axial direction of the planetary gear unit PU and the planetary gear DP, specifically, between the axial direction of the planetary gear unit PU and the counter gear 150.

Now, the vehicle automatic transmission $1_{15}$ relating to the present fifteenth embodiment can have the vehicle automatic transmission $1_{24}$ relating to the later-described twenty-fourth embodiment configured by the speed shifting mechanism $2_{15}$ being flipped in the left and right direction (the axial direction) with virtually no change.

Sixteenth Embodiment

Figure 19:
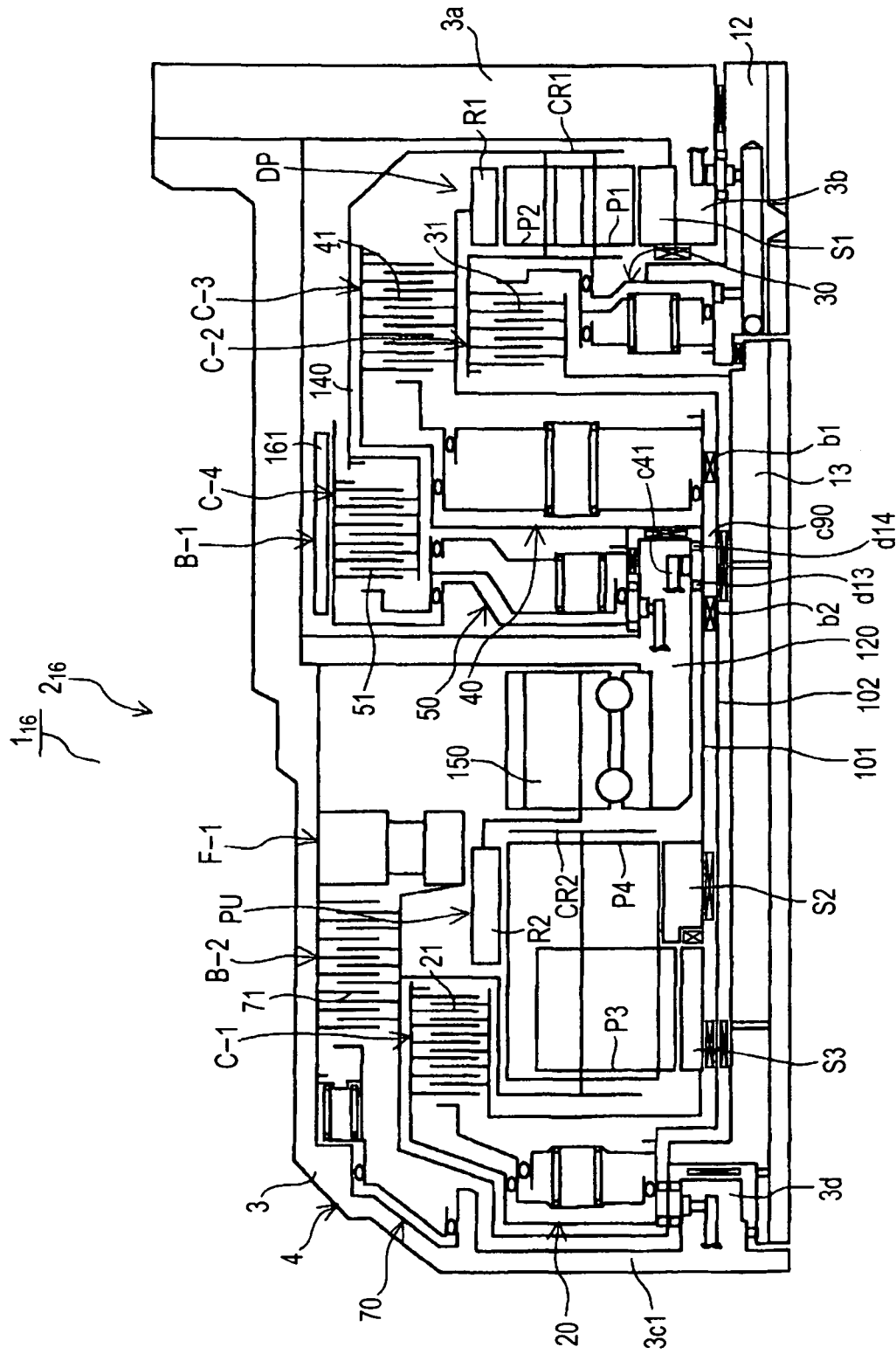
FIG. 19 is a cross-sectional diagram illustrating an automatic transmission relating to a sixteenth embodiment.

Next, a sixteenth embodiment wherein a portion of the above-mentioned thirteenth embodiment has been changed will be described, following FIG. 19. FIG. 19 is a cross-sectional diagram illustrating the automatic transmission $1_{16}$ relating to the sixteenth embodiment. With the sixteenth embodiment to be described below, only the portions that differ from the automatic transmission $1_{13}$ according to the thirteenth embodiment will be described, and the portions other than these are the same and therefore the description thereof will be omitted.

The vehicle automatic transmission $1_{16}$ relating to the sixteenth embodiment has the hydraulic servo 40 of the third clutch C-3 between the axial direction of the planetary gear unit PU (specifically the counter gear 150) and the planetary gear DP, and more specifically, between the axial direction of the hydraulic servo 50 of the fourth clutch C-4 and the hydraulic servo 30 of the second clutch C-2 as to the automatic transmission relating to the thirteenth embodiment $1_{13}$.

Further, according to the present embodiment, the support wall and the linking member 101 are sealed together with the sealing rings d13 and d14, and the linking member 101 and the linking member 102 are sealed together with the bushings b1 and b2 and an oil line c90 is formed, and thus forms the construction wherein the hydraulic oil is supplied from the oil line c53 within the support wall to the oil chamber 46 of the hydraulic servo 40 of the clutch C-3, via the oil line c90.

Seventeenth Embodiment

Figure 20:
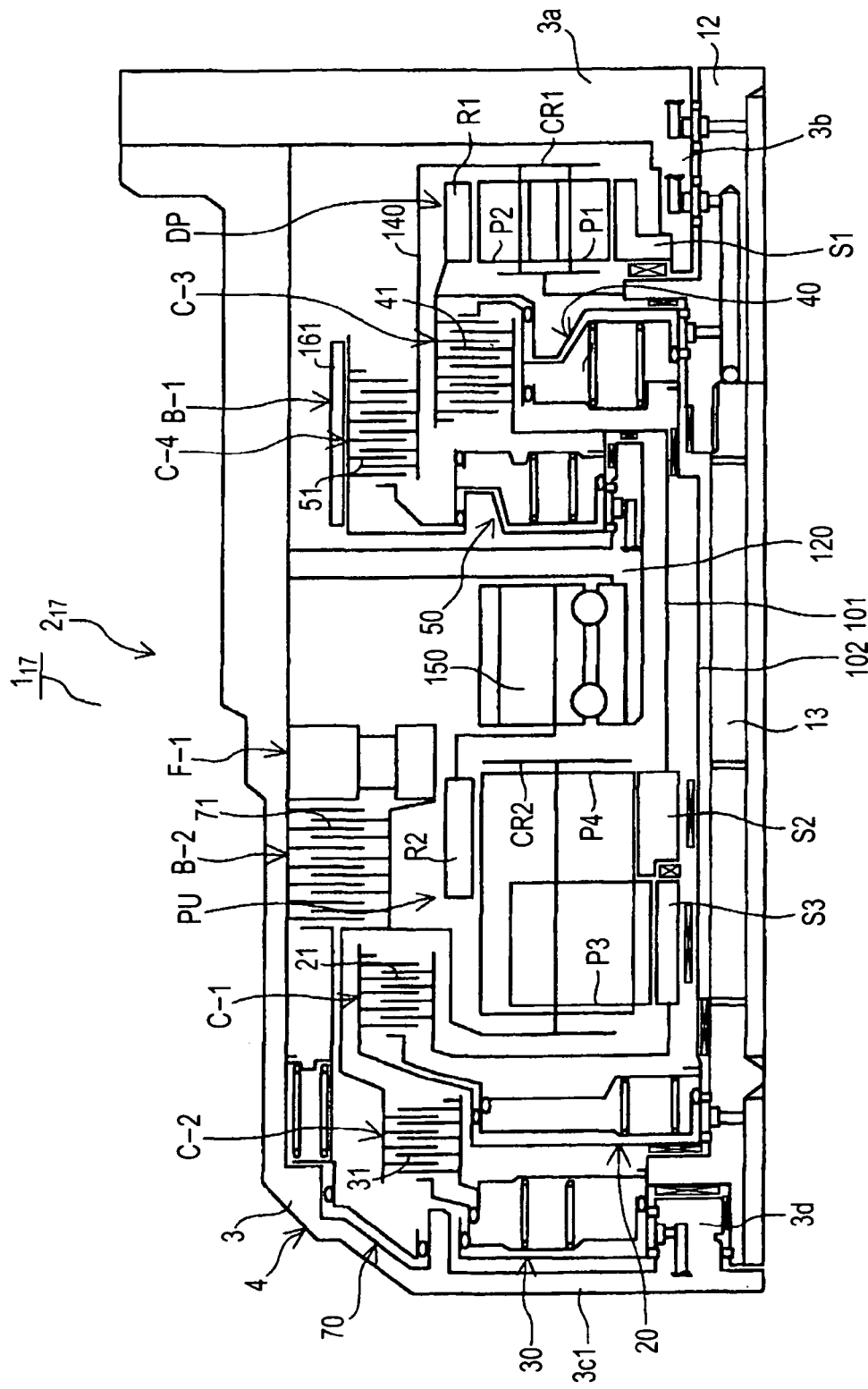
FIG. 20 is a cross-sectional diagram illustrating an automatic transmission relating to a seventeenth embodiment.

Next, a seventeenth embodiment wherein a portion of the above-mentioned thirteenth embodiment has been changed will be described, following FIG. 20. FIG. 20 is a cross-sectional diagram illustrating the automatic transmission $1_{17}$ relating to the seventeenth embodiment. With the seventeenth embodiment to be described below, only the portions that differ from the automatic transmission $1_{13}$ according to the thirteenth embodiment will be described, and the portions other than these are the same and therefore the description thereof will be omitted.

The automatic transmission $1_{17}$ relating to the seventeenth embodiment has the hydraulic servo 30 of the second clutch C-2 on the side opposite of the planetary gear DP in the axial direction as to the planetary gear unit PU, compared to the automatic transmission $1_{13}$ relating to the thirteenth embodiment and specifically, the hydraulic servo 30 of the second clutch C-2 is placed on the side opposite in the axial direction from the planetary gear unit PU as to the hydraulic servo 20 of the first clutch C-1, in other words is placed further towards the left than the hydraulic servo 20 of the first clutch C-1. Further, the hydraulic servo 40 of the third clutch C-3 is placed between the axial direction of the planetary gear unit PU (specifically the counter gear 150) and the planetary gear DP, and more specifically is placed between the axial direction of the hydraulic servo 50 of the fourth clutch C-4 and the planetary gear DP.

Now, the vehicle automatic transmission $1_{17}$ relating to the present seventeenth embodiment can have the vehicle automatic transmission $1_{25}$ relating to the later-described twenty-fifth embodiment configured by the speed shifting mechanism $2_{17}$ being flipped in the left and right direction (the axial direction) with virtually no change.

Eighteenth Embodiment

Figure 21:
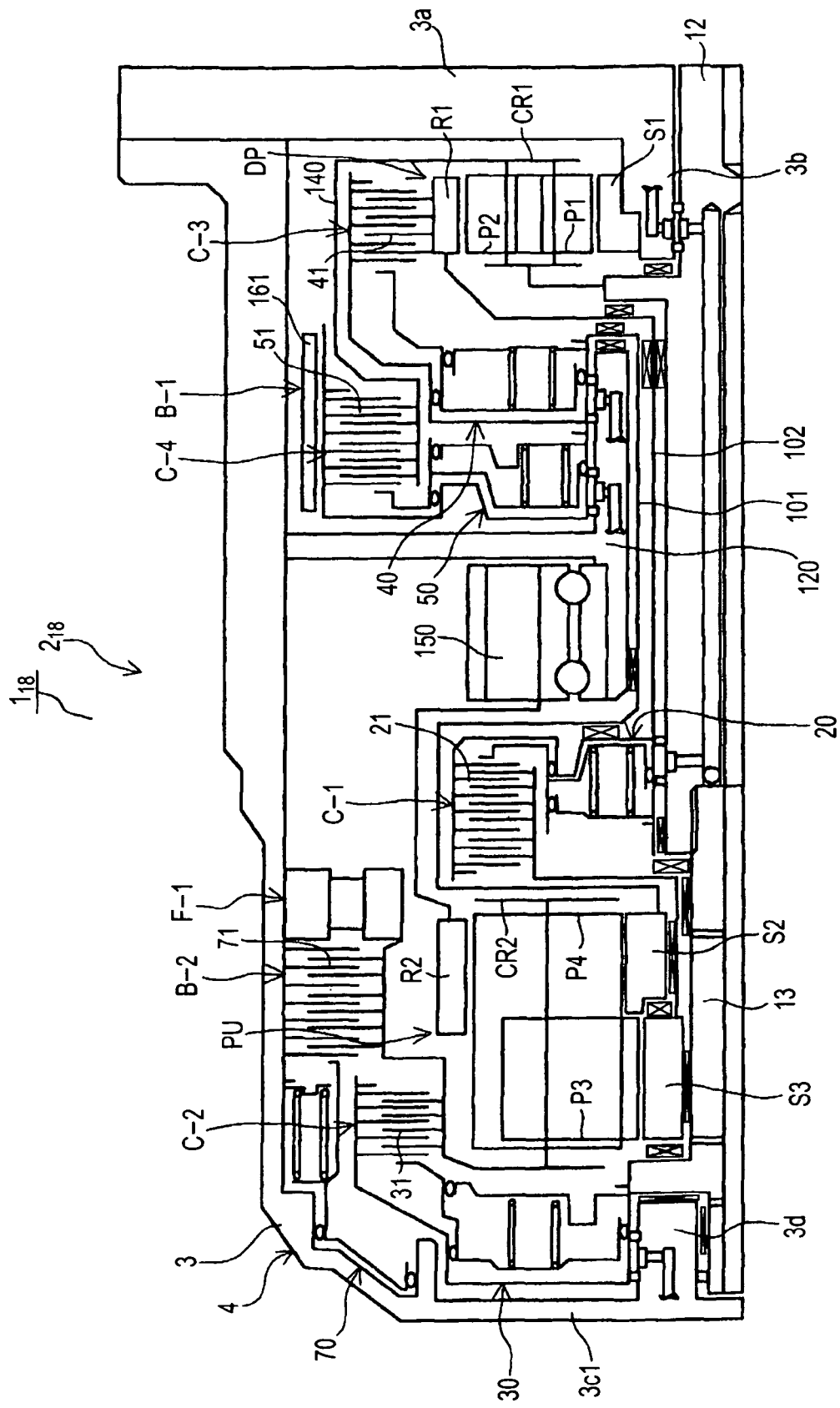
FIG. 21 is a cross-sectional diagram illustrating an automatic transmission relating to an eighteenth embodiment.

Next, an eighteenth embodiment wherein a portion of the above-mentioned thirteenth embodiment has been changed will be described, following FIG. 21. FIG. 21 is a cross-sectional diagram illustrating the automatic transmission $1_{18}$ relating to the eighteenth embodiment. With the eighteenth embodiment to be described below, only the portions that differ from the automatic transmission $1_{13}$ according to the thirteenth embodiment will be described, and the portions other than these are the same and therefore the description thereof will be omitted.

The automatic transmission $1_{18}$ relating to the eighteenth embodiment has the hydraulic servo 20 of the first clutch C-1 between the axial direction of the planetary gear DP and the planetary gear unit PU, compared to the automatic transmission $1_{13}$ relating to the thirteenth embodiment and specifically, it is placed between the axial direction of the counter gear 150 and the planetary gear unit PU. Also, the hydraulic servo 30 of the second clutch C-2 is placed opposite to the planetary gear DP in the axial direction as to the planetary gear unit PU. Further, the hydraulic servo 40 of the third clutch C-3 is placed between the axial direction of the planetary gear unit PU (specifically the counter gear 150) and the planetary gear DP, and more specifically is placed between the axial direction of the hydraulic servo 50 of the fourth clutch C-4 and the planetary gear DP.

Now, the vehicle automatic transmission $1_{18}$ relating to the present eighteenth embodiment can have the vehicle automatic transmission $1_{26}$ relating to the later-described twenty-sixth embodiment configured by the speed shifting mechanism $2_{18}$ being flipped in the left and right direction (the axial direction) with virtually no change.

Ninteenth Embodiment

Figure 22:
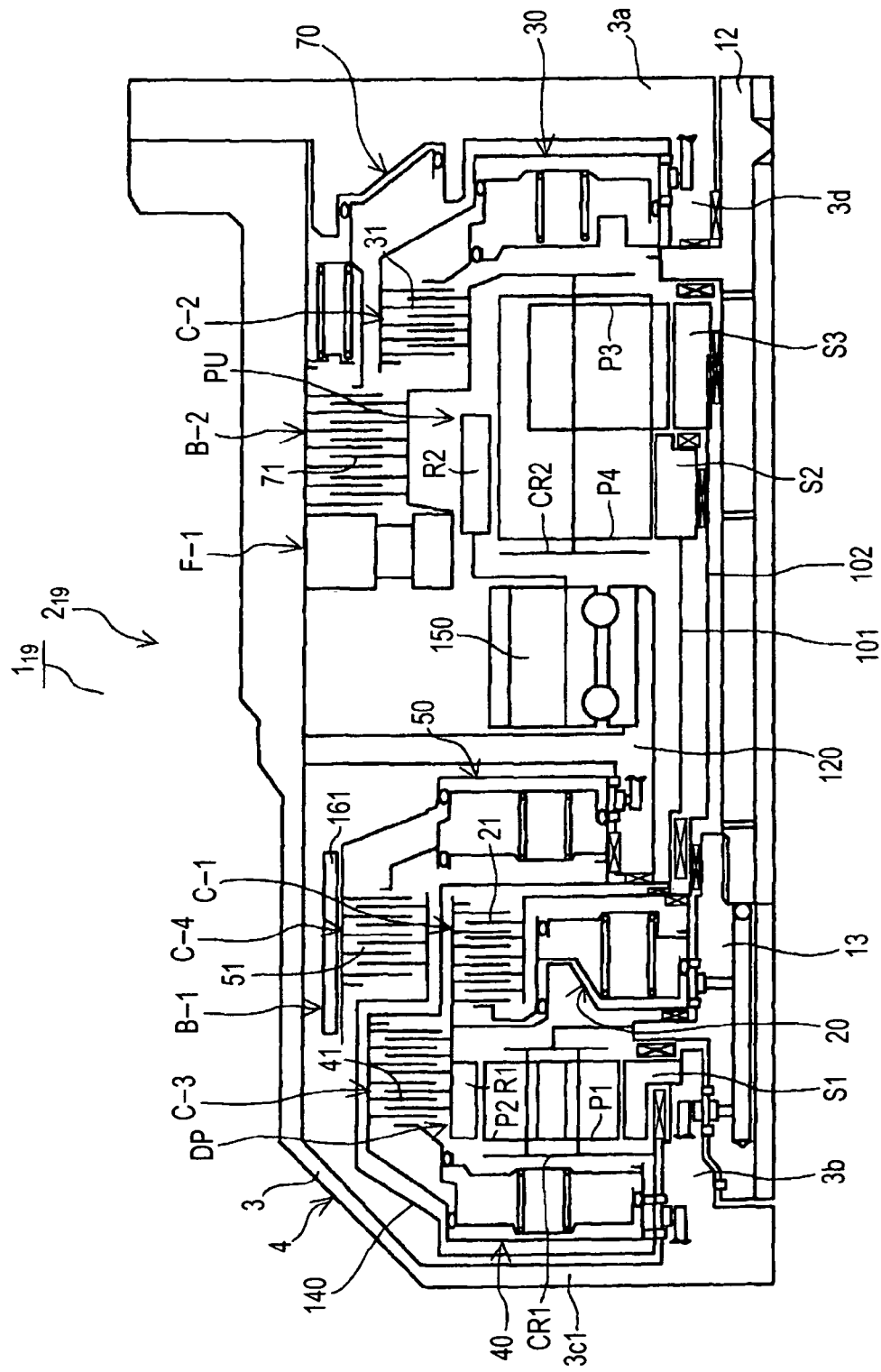
FIG. 22 is a cross-sectional diagram illustrating an automatic transmission relating to a nineteenth embodiment.

Next, a nineteenth embodiment wherein a portion of the above-mentioned ninth embodiment has been changed will be described, following FIG. 22. FIG. 22 is a cross-sectional diagram illustrating the automatic transmission 119 relating to the nineteenth embodiment. With the nineteenth embodiment to be described below, only the portions that differ from the automatic transmission 19 according to the ninth embodiment will be described, and the portions other than these are the same and therefore the description thereof will be omitted.

As illustrated in FIG. 22, the automatic transmission $1_{19}$ that is preferable for loading on a vehicle that is a FF-type (front drive, front engine), for example, is configured by the placement of the first through fourth clutches C-1 through C-4, the first and second brakes B-1 and B-2, the one-way clutch F-1, the planetary gear DP, the planetary gear unit PU, the counter gear 150 and so forth being flipped horizontally (in the axial direction) with virtually no change to the input shaft 12 and the intermediate shaft 13 (in other words, the direction in which the engine is placed is not changed), as to the above-described automatic transmission $1_9$ relating to the ninth embodiment, that is to say the speed shifting mechanism $2_{19}$ is configured by approximately the speed shifting mechanism $2_9$ being flipped in the left and right direction (the axial direction).

To further describe, with the automatic transmission $1_{19}$, the speed shifting mechanism $2_{19}$ is placed on an axis wherein the input shaft 12 and the intermediate shaft 13 are the center, which is the same axis as the output shaft of the engine (not shown), for example, and the planetary gear unit PU is placed on the above-mentioned input shaft 12 within the transmission case 3. On the left side in the axial direction of the planetary gear unit PU, the hydraulic servo 40 of the third clutch C-3 and the planetary gear DP and the hydraulic servo 20 of the first clutch C-1 and the hydraulic servo 50 of the fourth clutch C-4 and the counter gear 150 are placed in order from the left side. Further, on the outer circumferential side of the clutch drum of the fourth clutch C-4, a first brake B-1 is placed that is formed from a band brake.

The hydraulic servo 40 of the third clutch C-3 and the planetary gear DP are placed on the boss unit 3*b* which extends from the side wall portion 3*c*1 of the transmission case 3, and the hydraulic servo 20 of the first clutch C-1 is placed on the intermediate shaft 13.

Further, the hydraulic servo 50 of the fourth clutch C-4 is placed on the left side as to the support wall 120, and is also placed on this support wall 120, and the counter gear 150 is placed on the right side as to the support wall 120 and is also placed on this support wall 120.

On the other hand, on the right side (the input side) in the axial direction of the planetary gear unit PU, the hydraulic servo 30 of the second clutch C-2 is placed. Further, on the outer circumferential side of the planetary gear unit PU is placed the second brake B-2 and the one-way clutch F-1.

As described above, with the automatic transmission $1_{19}$, the hydraulic servo 50 of the fourth clutch C-4 is placed between the axial direction of the planetary gear unit PU and the planetary gear DP, and the hydraulic servo 40 of the third clutch C-3 is placed on the side opposite of the planetary gear unit PU in the axial direction as to the hydraulic servo 50 of the fourth clutch C-4, and the input shaft 12 and the fourth clutch C-4 are linked via the linking member 140 (and the intermediate shaft 13) which passes through the outer circumferential side of the third clutch C-3, and the third clutch C-3 and the sun gear S2 of the planetary gear unit PU are linked via the linking member 101 which passes through the inner circumferential side of the fourth clutch C-4.

Twentieth Embodiment

Figure 23:
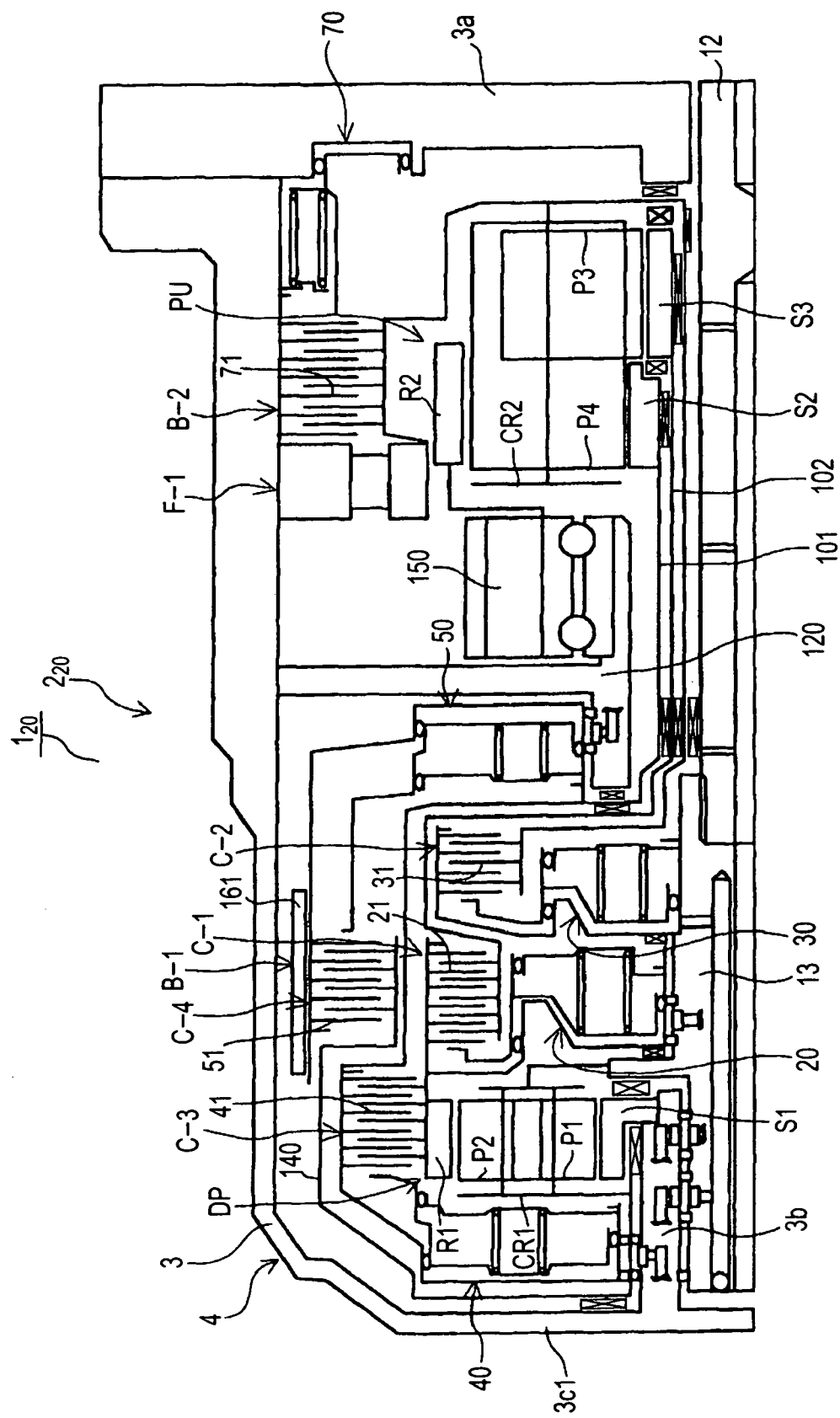
FIG. 23 is a cross-sectional diagram illustrating an automatic transmission relating to a twentieth embodiment.

Next, a twentieth embodiment wherein a portion of the above-mentioned nineteenth embodiment has been changed will be described, following FIG. 23. FIG. 23 is a cross-sectional diagram illustrating the automatic transmission $1_{20}$ relating to the twentieth embodiment. With the twentieth embodiment to be described below, only the portions that differ from the automatic transmission $1_{19}$ according to the nineteenth embodiment will be described, and the portions other than these are the same and therefore the description thereof will be omitted.

The automatic transmission $1_{20}$ relating to the twentieth embodiment has the hydraulic servo 30 of the second clutch C-2 between the axial direction of the planetary gear unit PU (specifically the counter gear 150) and the planetary gear DP, and more specifically, between the axial direction of the hydraulic servo 50 of the fourth clutch C-4 and the hydraulic servo 20 of the first clutch C-1 as to the automatic transmission 117 relating to the nineteenth embodiment.

Now, the vehicle automatic transmission $1_{20}$ relating to the present twentieth embodiment can have the vehicle automatic transmission $1_{10}$ relating to the above-described tenth embodiment configured by the speed shifting mechanism $2_{20}$ being flipped in the left and right direction (the axial direction) with virtually no change.

Twenty-First Embodiment

Figure 24:
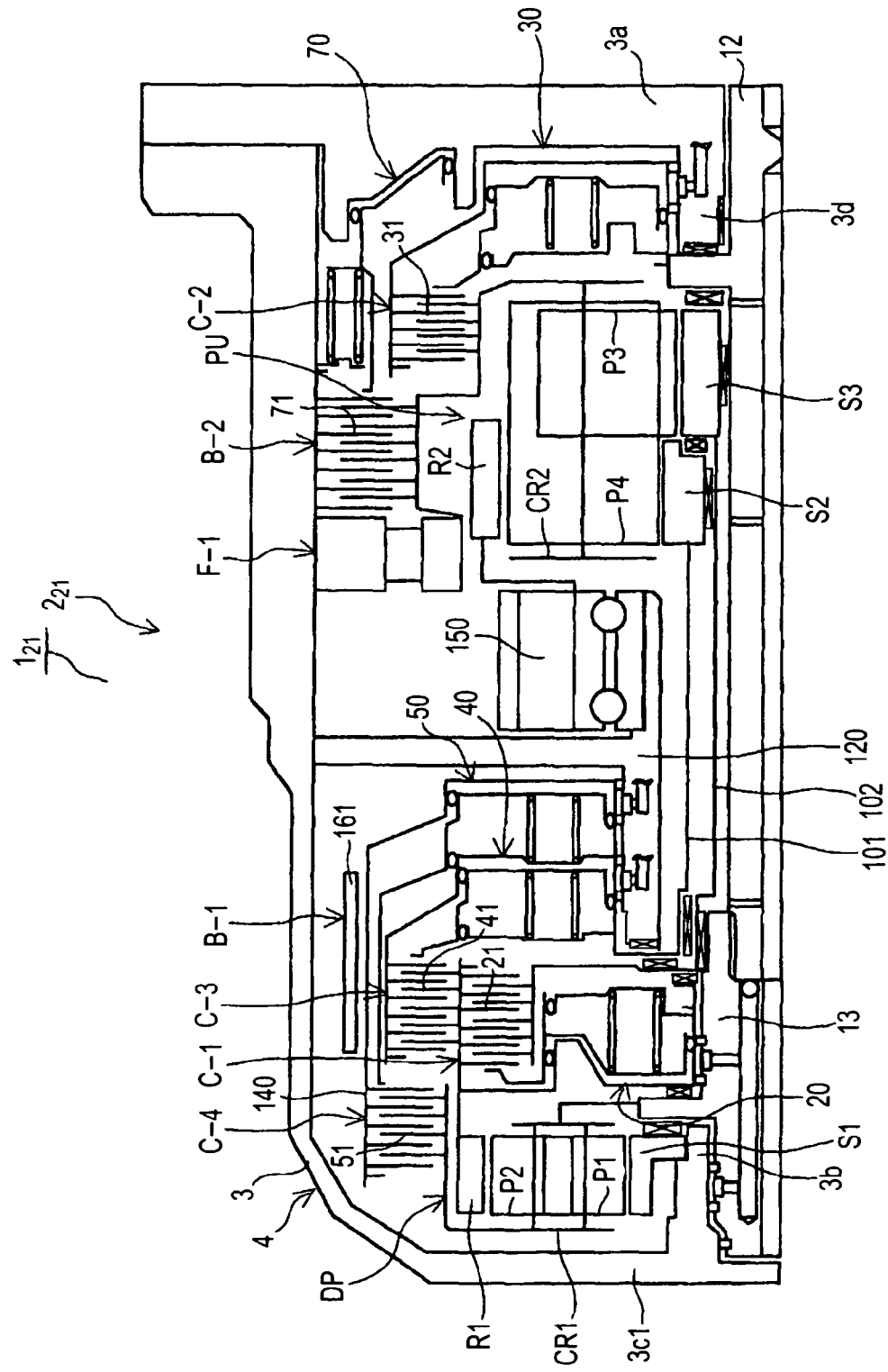
FIG. 24 is a cross-sectional diagram illustrating an automatic transmission relating to a twenty-first embodiment.

Next, a twenty-first embodiment wherein a portion of the above-mentioned nineteenth embodiment has been changed will be described, following FIG. 24. FIG. 24 is a cross-sectional diagram illustrating the automatic transmission $1_{21}$ relating to the twenty-first embodiment. With the twenty-first embodiment to be described below, only the portions that differ from the automatic transmission $1_{19}$ according to the nineteenth embodiment will be described, and the portions other than these are the same and therefore the description thereof will be omitted.

The vehicle automatic transmission $1_{21}$ relating to the twenty-first embodiment has the hydraulic servo 40 of the third clutch C-3 between the axial direction of the planetary gear unit PU (specifically the counter gear 150) and the planetary gear DP, and more specifically, between the axial direction of the hydraulic servo 50 of the fourth clutch C-4 and the hydraulic servo 20 of the first clutch C-1 as to the automatic transmission 117 relating to the nineteenth embodiment.

Now, the vehicle automatic transmission 121 relating to the present twenty-first embodiment can have the vehicle automatic transmission $1_{11}$ relating to the above-described eleventh embodiment configured by the speed shifting mechanism $2_{21}$ being flipped in the left and right direction (the axial direction) with virtually no change.

Twenty-Second Embodiment

Figure 25:
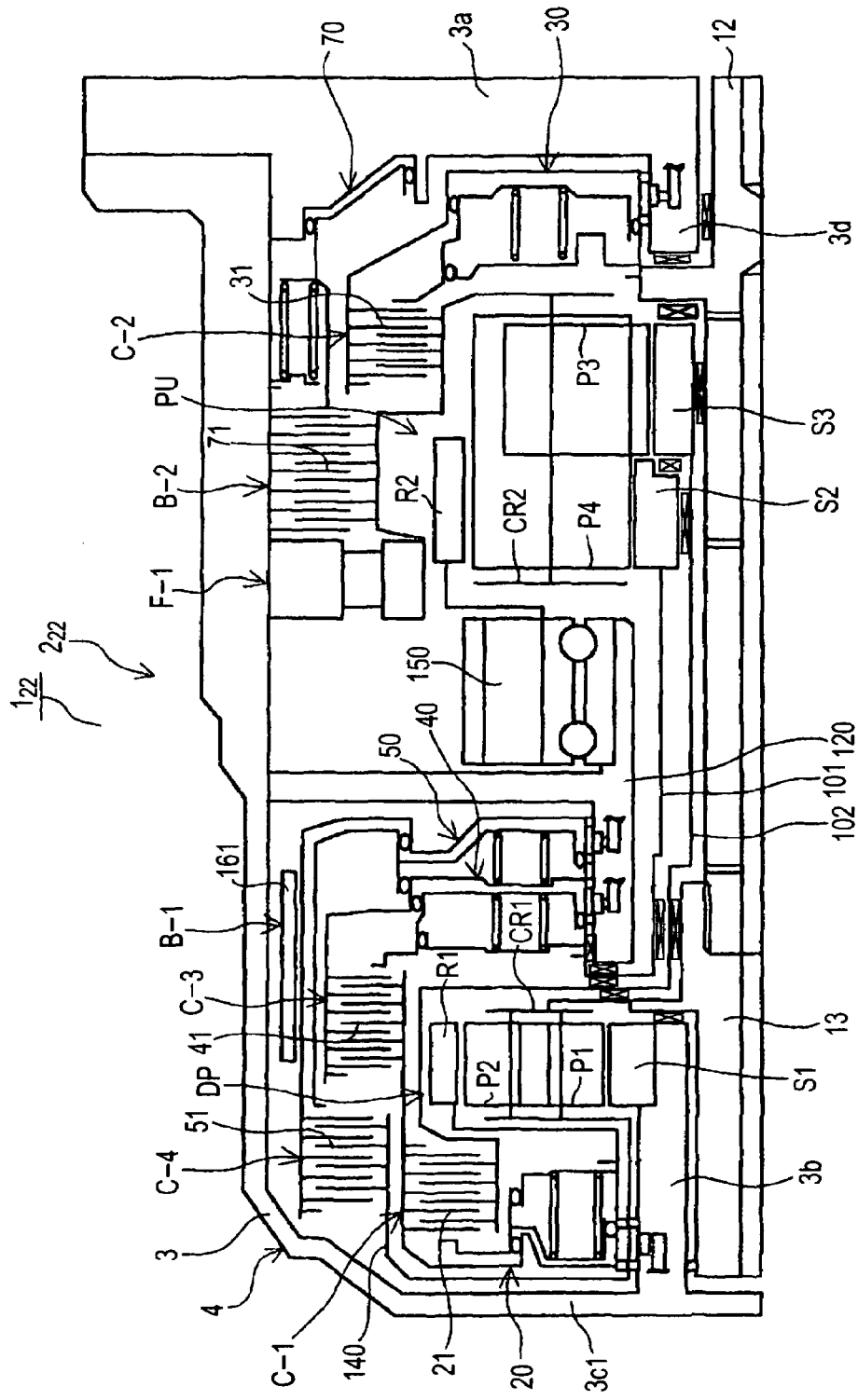
FIG. 25 is a cross-sectional diagram illustrating an automatic transmission relating to a twenty-second embodiment.

Next, a twenty-second embodiment wherein a portion of the above-mentioned nineteenth embodiment has been changed will be described, following FIG. 25. FIG. 25 is a cross-sectional diagram illustrating the automatic transmission $1_{22}$ relating to the twenty-second embodiment. With the twenty-second embodiment to be described below, only the portions that differ from the automatic transmission $1_{19}$ according to the nineteenth embodiment will be described, and the portions other than these are the same and therefore the description thereof will be omitted.

The automatic transmission $1_{22}$ relating to the twenty-second embodiment has the hydraulic servo 40 of the third clutch C-3 between the axial direction of the planetary gear unit PU (specifically the counter gear 150) and the planetary gear DP, and more specifically, between the axial direction of the hydraulic servo 50 of the fourth clutch C-4 and the planetary gear DP as to the automatic transmission $1_{19}$ relating to the nineteenth embodiment. Further, the hydraulic servo 20 of the first clutch C-1 is placed on the side opposite the planetary gear unit PU in the axial direction as to the planetary gear DP.

Now, the vehicle automatic transmission $1_{22}$ relating to the present twenty-second embodiment can have the vehicle automatic transmission $1_{12}$ relating to the above-described twelfth embodiment configured by the speed shifting mechanism $2_{22}$ being flipped in the left and right direction (the axial direction) with virtually no change.

Twenty-Third Embodiment

Figure 26:
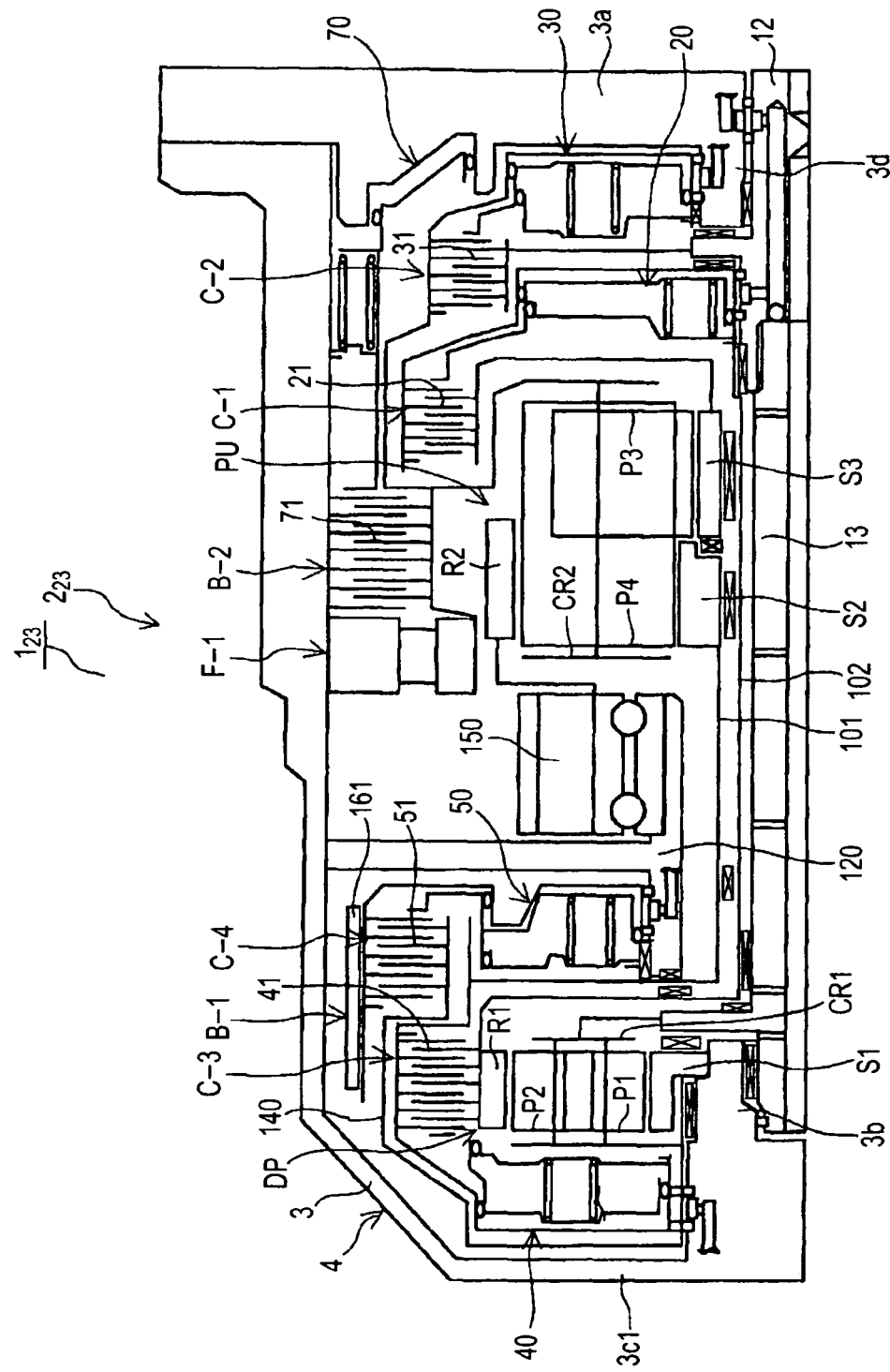
FIG. 26 is a cross-sectional diagram illustrating an automatic transmission relating to a twenty-third embodiment.

Next, a twenty-third embodiment wherein a portion of the above-mentioned nineteenth embodiment has been changed will be described, following FIG. 26. FIG. 26 is a cross-sectional diagram illustrating the automatic transmission $1_{23}$ relating to the twenty-third embodiment. With the twenty-third embodiment to be described below, only the portions that differ from the automatic transmission $1_{19}$ according to the nineteenth embodiment will be described, and the portions other than these are the same and therefore the description thereof will be omitted.

The automatic transmission $1_{23}$ relating to the twenty-third embodiment has the hydraulic servo 20 of the first clutch C-1 on the side opposite of the planetary gear DP in the axial direction as to the planetary gear unit PU, as to the automatic transmission $1_{19}$ relating to the nineteenth embodiment and more specifically, the hydraulic servo 20 of the first clutch C-1 is placed between the axial direction of the planetary gear unit PU and the hydraulic servo 30 of the second clutch C-2.

Now, the vehicle automatic transmission $1_{23}$ relating to the present twenty-third embodiment can have the vehicle automatic transmission $1_{14}$ relating to the above-described fourteenth embodiment configured by the speed shifting mechanism $2_{23}$ being flipped in the left and right direction (the axial direction) with virtually no change.

Twenty-Fourth Embodiment

Figure 27:
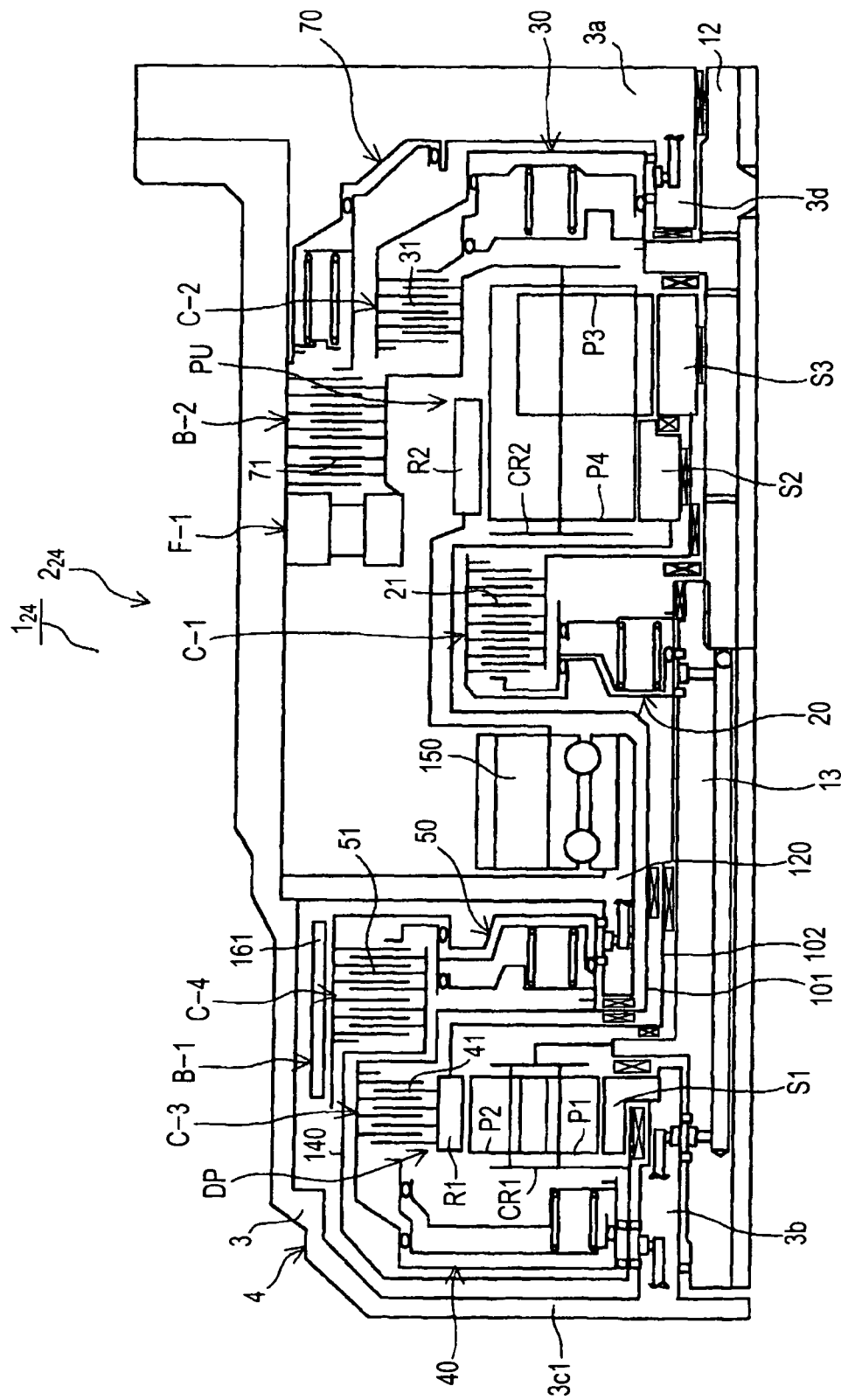
FIG. 27 is a cross-sectional diagram illustrating an automatic transmission relating to a twenty-fourth embodiment.

Next, a twenty-fourth embodiment wherein a portion of the above-mentioned nineteenth embodiment has been changed will be described, following FIG. 27. FIG. 27 is a cross-sectional diagram illustrating the automatic transmission $1_{24}$ relating to the twenty-fourth embodiment. With the twenty-fourth embodiment to be described below, only the portions that differ from the automatic transmission $1_{19}$ according to the nineteenth embodiment will be described, and the portions other than these are the same and therefore the description thereof will be omitted.

The automatic transmission $1_{24}$ relating to the twenty-fourth embodiment has the hydraulic servo 20 of the first clutch C-1 between the axial direction of the planetary gear unit PU and the planetary gear DP, and the hydraulic servo 20 of the first clutch C-1 is placed between the planetary gear unit PU and the counter gear 150 as to the automatic transmission $1_{19}$ relating to the nineteenth embodiment.

Now, the vehicle automatic transmission $1_{24}$ relating to the present twenty-fourth embodiment can have the vehicle automatic transmission $1_{15}$ relating to the above-described fifteenth embodiment configured by the speed shifting mechanism $2_{24}$ being flipped in the left and right direction (the axial direction) with virtually no change.

Twenty-Fifth Embodiment

Figure 28:
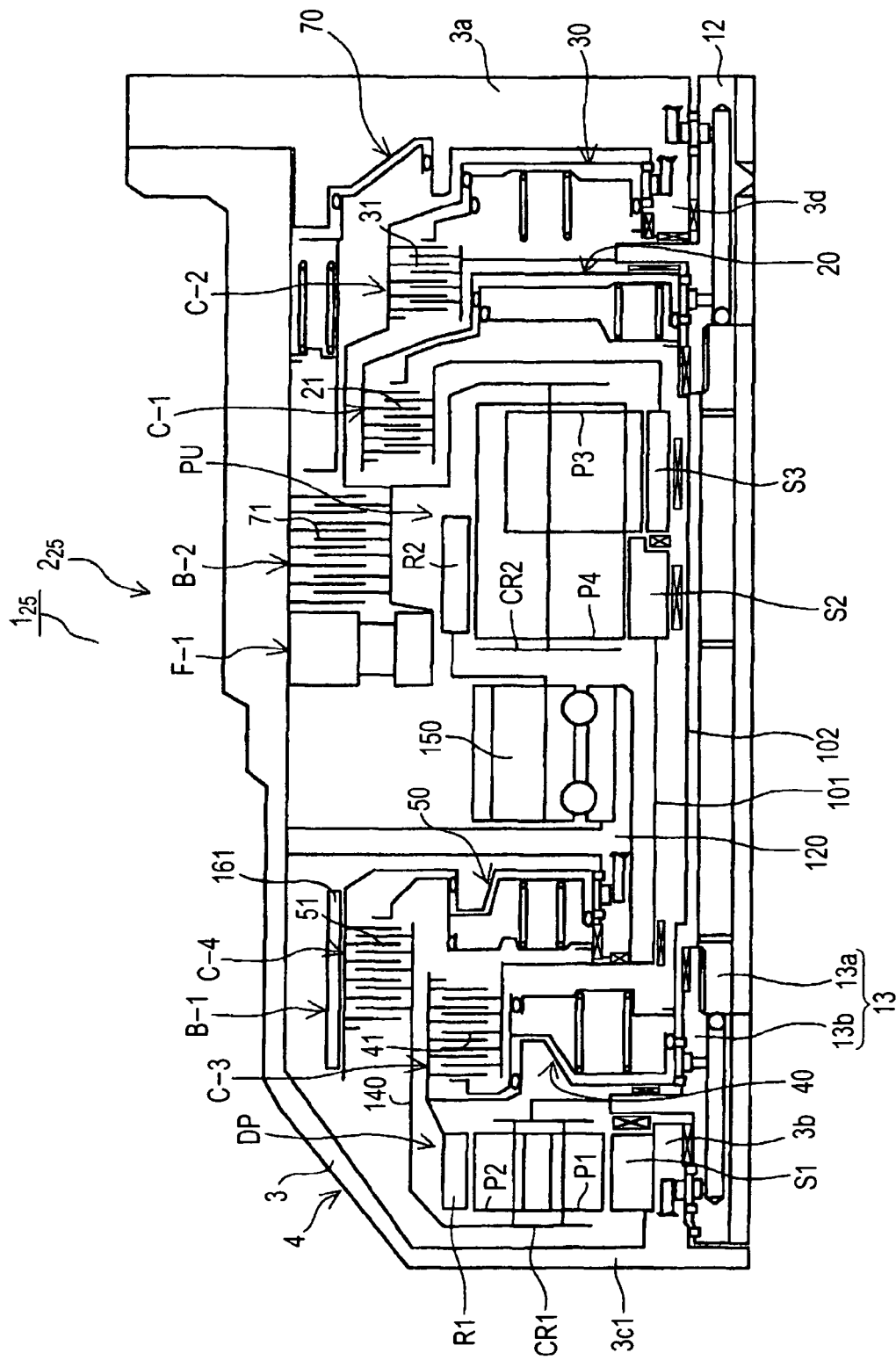
FIG. 28 is a cross-sectional diagram illustrating an automatic transmission relating to a twenty-fifth embodiment.

Next, a twenty-fifth embodiment wherein a portion of the above-mentioned nineteenth embodiment has been changed will be described, following FIG. 28. FIG. 28 is a cross-sectional diagram illustrating the automatic transmission $1_{25}$ relating to the twenty-fifth embodiment. With the twenty-fifth embodiment to be described below, only the portions that differ from the automatic transmission $1_{19}$ according to the nineteenth embodiment will be described, and the portions other than these are the same and therefore the description thereof will be omitted.

The automatic transmission $1_{25}$ relating to the twenty-fifth embodiment has the hydraulic servo 20 of the first clutch C-1 on the side opposite of the planetary gear DP in the axial direction as to the planetary gear unit PU, and specifically, the hydraulic servo 20 of the first clutch C-1 is placed between the axial direction of the planetary gear unit PU and the hydraulic servo 30 of the second clutch C-2 as to the automatic transmission $1_{19}$ relating to the nineteenth embodiment. Further, the hydraulic servo 40 of the third clutch C-3 is placed between the axial direction of the planetary gear DP and the planetary gear unit PU (specifically the counter gear 150), and more specifically, the hydraulic servo 40 of the third clutch C-3 is place between the axial direction of the planetary gear DP and the hydraulic servo 50 of the fourth clutch C-4.

Now, the vehicle automatic transmission $1_{25}$ relating to the present twenty-fifth embodiment can have the vehicle automatic transmission $1_{17}$ relating to the above-described seventeenth embodiment configured by the speed shifting mechanism $2_{25}$ being flipped in the left and right direction (the axial direction) with virtually no change.

Twenty-Sixth Embodiment

Figure 29:
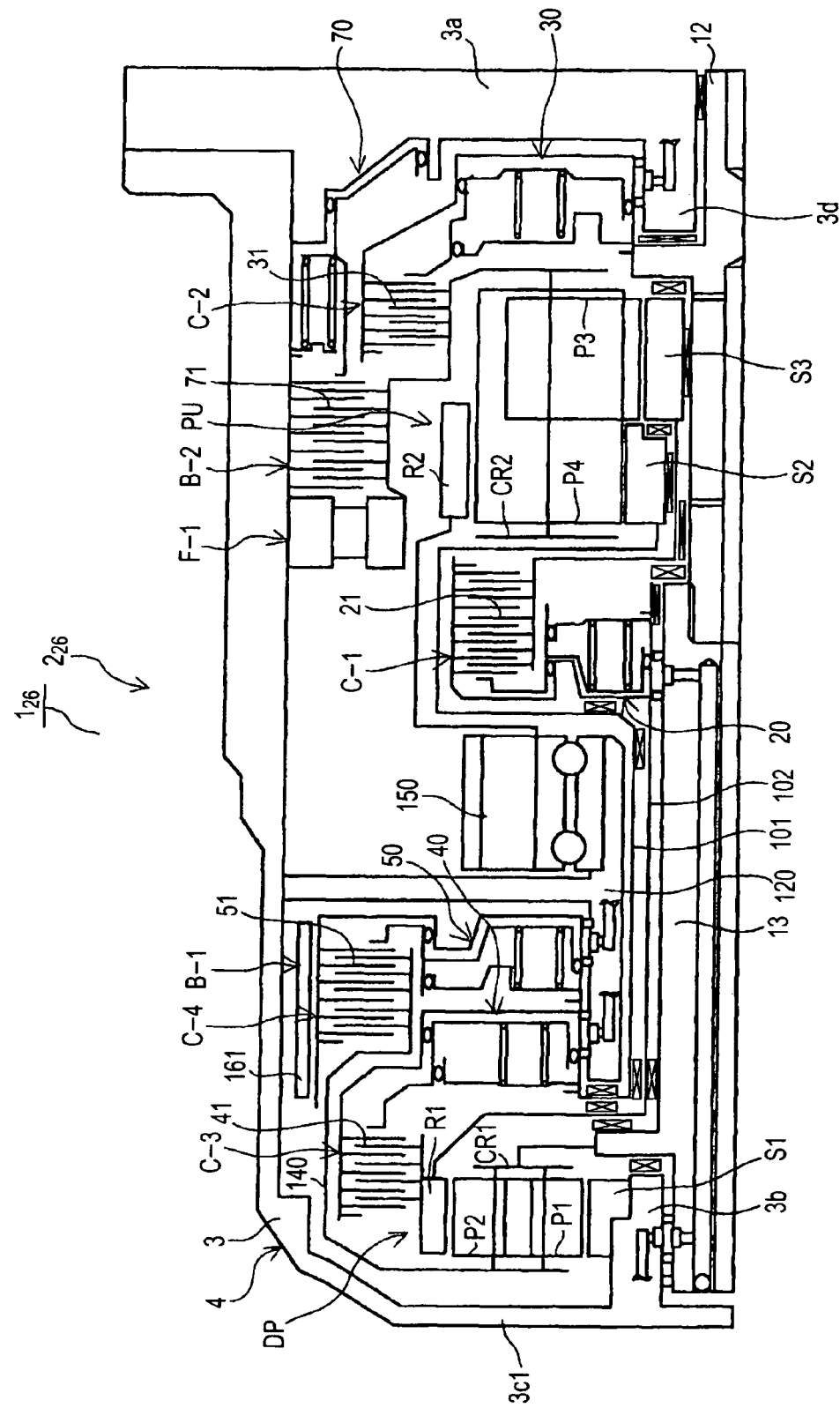
FIG. 29 is a cross-sectional diagram illustrating an automatic transmission relating to a twenty-sixth embodiment.

Next, a twenty-sixth embodiment wherein a portion of the above-mentioned nineteenth embodiment has been changed will be described, following FIG. 29. FIG. 29 is a cross-sectional diagram illustrating the automatic transmission $1_{26}$ relating to the twenty-sixth embodiment. With the twenty-sixth embodiment to be described below, only the portions that differ from the automatic transmission $1_{19}$ according to the nineteenth embodiment will be described, and the portions other than these are the same and therefore the description thereof will be omitted.

The automatic transmission $1_{26}$ relating to the twenty-sixth embodiment has the hydraulic servo 20 of the first clutch C-1 between the axial direction of the planetary gear unit PU and the planetary gear DP, and is placed between the axial direction of the counter gear 150 and the planetary gear unit PU, as to the automatic transmission relating to the nineteenth embodiment $1_{19}$. Further, the hydraulic servo 40 of the third clutch C-3 is placed between the axial direction of the planetary gear unit PU (specifically the counter gear 150) and the planetary gear DP, and more specifically, is placed between the axial direction of the hydraulic servo 50 of the fourth clutch C-4 and the planetary gear DP.

Now, the vehicle automatic transmission $1_{26}$ relating to the present twenty-sixth embodiment can have the vehicle automatic transmission $1_{18}$ relating to the above-described eighteenth embodiment configured by the speed shifting mechanism $2_{26}$ being flipped in the left and right direction (the axial direction) with virtually no change.

With the above-described first through twenty-sixth embodiments, the case is described wherein a so-called Ravigneaux-type planetary gear is used that has a long pinion P4 as the planetary gear unit PU and wherein the carrier CR2 meshes with the sun gear S2 and the sun gear S3, but a planetary gear may be used that has a long pinion and the long pinion meshes with a common sun gear, and the first ring gear meshes with the long pinion, and the second ring gear meshes with the short pinion that meshes with the long pinion and thus has four rotation elements, and any type is acceptable so long as there are at least two rotation elements, and preferably four rotation elements.

Also, with the first through eighth embodiments, an automobile automatic transmission 1 that has a torque converter 7 is described, and for example, one that comprises a starting clutch can be used.

Further, with the first through twenty-sixth embodiments, an automobile automatic transmission 1 preferable for an FR type or an FF type vehicle, for example, is described as one example, but is not limited to this type, and the present invention can also be applied to a vehicle automatic transmission that can be used in an four-wheel-drive type, for example, and further, the present invention can also be applied to a vehicle automatic transmission that is used in a vehicle with a direct-coupling type motor, for example, that is to say, in a hybrid automobile.

Further, with the first through eighth embodiments, a one-way clutch F-1 is comprised, and one example is described wherein the automobile automatic transmission 1 can achieve the forward first speed relatively smoothly, but one not comprising a one-way clutch F-1 can also be used, and in this case, the forward first speed can be achieved by engaging the second brake B-2.

Further, with the planetary gear DP which outputs the reduced speed rotation according to the first through twenty-sixth embodiments, a double pinion planetary gear has been described wherein the rotation of the sun gear S1 is fixed and the rotation of the input shaft 12 is input to the carrier CR1 and the ring gear R1 rotates at a reduced speed, but for example a double pinion planetary gear can be used wherein the ring gear R1 can be fixed, and the rotation of the input shaft 12 input to the carrier CR1, and the reduced speed rotation is output from the sun gear S1, but does not need to be limited to these, and any configuration of the planetary gear which is capable of outputting the reduced speed rotation is acceptable.

The automatic transmission according to the present invention is useful mounted on a vehicle such as an automobile, a truck, or a bus, and particularly is suitable for being installed in a vehicle wherein compactness is particularly desired from the point of mounting on the vehicle and that requires improved power transmitting efficiency.

According to an exemplary aspect of the invention, the members that link the various clutches and the various rotation elements of the planetary gear set can be prevented from clashing, while the outer circumferential side linking path that rotates due to the input rotation (in other words, the transmitting torque is smaller than at the inner circumferential side linking path, and does not accelerate rotation) can be placed on the outer circumferential side, and a large transmitting torque is input, and the inner circumferential side linking path, which has the capability of greatly accelerating rotation, can be placed on the inner circumferential side. Thus, the various linking members that link these clutches and the various rotation elements of the planetary gear set can be made relatively thin and a lighter-weight item can be designed, and weight reduction and improved controllability of the vehicle automatic transmission can be designed.

Further, since the outer circumferential side linking path that rotates by the input rotation can be placed on the outer circumferential side, an input rotation count sensor that detects the number of input rotations can be easily affixed.

According to another exemplary aspect of the invention, hydraulic oil is supplied from the oil line provided on the support wall on the hydraulic servo of the input transmitting clutch, and therefore, compared to the case wherein hydraulic oil is supplied from the input shaft via members such as the second linking member and the third linking member, for example, the number of sealing rings can be reduced. Thus, by reducing the sliding resistance by the sealing rings, efficiency improvements in the vehicle automatic transmission, reduced hydraulic oil leaking from the sealing rings, and preventing reduced controllability can be enabled.

According to another exemplary aspect of the invention, the number of sealing rings can be reduced, while the members which link the various clutches and the various rotation elements of the planetary gear set can be prevented from clashing, while the outer circumferential side linking path that rotates by the input rotation can be placed on the outer circumferential side, and a large transmitting torque is input, and the inner circumferential side linking path that has the capability of greatly accelerating rotation can be placed on the inner circumferential side, and the various linking members that link these clutches and the various rotation elements of the planetary gear set can be made relatively thin and a lighter-weight item can be designed. Thus, by decreasing the sliding resistance by the sealing rings, efficiency improvements in the vehicle automatic transmission, reduced hydraulic oil leaking from the sealing rings, and preventing reduced controllability is enabled, and weight reduction and improved controllability of the vehicle automatic transmission can be designed.

According to another exemplary aspect of the invention, the input rotation from the input transmitting clutch and the reduced speed rotation from one of the reduced speed transmitting clutches can share use of the member so as to make one of the two rotation elements of the planetary gear set to be capable of transmitting. Thus, the number of parts can be reduced, and weight reduction and reduced size of the vehicle automatic transmission can be designed.

According to another exemplary aspect of the invention, the clutch drum of the hydraulic servo of the input transmitting clutch is open toward the reduced speed planetary gear side, and therefore the member that outputs the rotation of the input transmitting clutch and the member that constructs the outer circumferential side linking path can be prevented from clashing.

According to another exemplary aspect of the invention, the input rotation from the fourth clutch and the reduced speed rotation from the third clutch can share use of the member so as to be capable of transmitting to the first rotation element. Thus, the number of parts can be reduced, and a light-weight and compact vehicle automatic transmission can be designed.

According to another exemplary aspect of the invention, with the second linking member and the third linking member a large torque is input, and a greatly accelerated rotation can be placed on the inner circumferential side together, and inertia can be reduced. Thus, weight reduction and improved controllability of the vehicle automatic transmission can be designed.

According to another exemplary aspect of the invention, the input rotation from the fourth clutch and the reduced speed rotation from the third clutch can share use of the second linking member so as to be capable of transmitting to the first rotation element. Thus, the number of parts can be reduced, and a light-weight and compact vehicle automatic transmission can be designed.

According to another exemplary aspect of the invention, the first retaining means is linked to the second linking member via the hub member that passes between the axial direction of the fourth clutch and the planetary gear set, and therefore the rotation of the first rotation element of the planetary gear set can be made capable of being fixed, and the first linking member and the hub member can be prevented from clashing.

According to another exemplary aspect of the invention, a member for linking the second linking member and the first retaining means becomes unnecessary, and reduction in the number of parts of the vehicle automatic transmission and reduction in weight thereof is enabled. Further, the input rotation from the fourth clutch and the reduced speed rotation from the third clutch can be used together so as to reduce the weight of the second linking member which is capable of transmitting to the first rotation element, and thus, controllability of the vehicle automatic transmission can be improved.

According to another exemplary aspect of the invention, the hydraulic servo of the third clutch is placed between the axial direction of the reduced speed planetary gear and the hydraulic servo of the fourth clutch, and therefore the hydraulic servo of the third clutch and the hydraulic servo of the fourth clutch can be placed in close proximity to each other, and the member (particularly the member for the purpose of linking from the third clutch to the second linking member) which transmits a relatively large torque which links the fourth clutch and the third clutch can be made short. Thus, reduced weight and improved controllability of the vehicle automatic transmission can be designed. Further, the hydraulic oil is supplied to the hydraulic servo of the third clutch via an oil line provided on the support wall, and therefore the number of sealing rings can be reduced compared to the case of supplying the hydraulic oil via a member which relatively rotates from the oil line provided on the boss unit extended on the case or the input shaft, for example. Thus, improved efficiency and improved controllability of the vehicle automatic transmission can be designed.

According to another exemplary aspect of the invention, the hydraulic servo of the first clutch is placed on the side opposite in the axial direction from the hydraulic servo of the third clutch as to the reduced speed planetary gear and on the boss unit which extends from the case, and the hydraulic oil is supplied to the hydraulic servo of the first clutch from the oil line provided within the boss unit, and therefore the length of the oil line to the hydraulic oil chamber can be shortened and the oil pressure control response can be improved compared to the case wherein the hydraulic oil is supplied via the input shaft. Particularly in the case of a clutch which engages when the first clutch switches from a neutral range to a driving range, the response as to the switching to the driving state can be improved. Further, the first clutch is on the side opposite in the axial direction from the third and fourth clutches as to the reduced speed planetary gear, that is to say, the number of clutches placed on the boss unit is reduced, and providing a large number of oil lines concentrated within the boss unit can be prevented, and the area of the various oil lines within the boss unit can be sufficiently ensured, and therefore line resistance of the hydraulic oil can be reduced. Thus, the response of the hydraulic oil which is supplied to the first clutch can be improved.

According to another exemplary aspect of the invention, the hydraulic servo of the second clutch is placed on the side opposite in the axial direction from the reduced speed planetary gear as to the planetary gear set, and thus can prevent providing a large number of oil lines concentrated within the boss unit or on the support wall.

According to another exemplary aspect of the invention, the hydraulic servo of the second clutch is placed between the axial direction of the planetary gear set and the reduced speed planetary gear, and therefore in the case of applying to a vehicle which is an FR type, for example, the planetary gear set and the output member of the vehicle automatic transmission can be closer together, and the member which links the fourth rotation element which transmits a large torque when at a relatively low speed and which has a high rotation at a relatively reverse speed and the output member can be shortened, and a weight reduction can be designed. Further, this planetary gear set can be closer to the supporting unit of the shaft wherein the planetary gear set is placed, and the gear position can be stabilized.

According to another exemplary aspect of the invention, the hydraulic servo of the second clutch is placed between the axial direction of the hydraulic servo of the third clutch and the speed reduction planetary gear, and so can be placed between the axial direction of the planetary gear set and the speed reduction planetary gear. Therefore, the second clutch which has a relatively small volume can be placed on the inner circumferential side of the friction plate of the third clutch, and so the shaft length of the automobile automatic transmission can be shortened. Further, the member that inputs the input rotation into the speed reduction planetary gear and the clutch drum of the second clutch can be made in common and so the shaft length of the automobile automatic transmission can be shortened.

According to another exemplary aspect of the invention, the hydraulic servo of the first clutch is placed between the axial direction of the reduced speed planetary gear and the hydraulic servo of the third clutch, and the first clutch is limited in the expansion of the diameter thereof to the outer circumferential side because the first linking member passes through the outer circumferential side of the first clutch, but the first clutch is placed on the input shaft, and therefore compared to placing the first clutch on the boss unit, the volume of the first clutch can be ensured by becoming large in the inner radial direction. Further, the hydraulic oil is supplied from the input shaft via the sealing rings, and therefore by the sealing rings having a smaller diameter, folding resistance can be reduced, and the efficiency of the automatic transmission can be improved.

According to another exemplary aspect of the invention, the hydraulic servo of the second clutch is placed on the side opposite from the aforementioned speed reduction planetary gear in the axial direction as to the planetary gear set, and so a large number of oil lines being provided in a concentration within the boss unit or on the support wall can be prevented.

According to another exemplary aspect of the invention, the hydraulic servo of the second clutch is placed between the axial direction of the hydraulic servo of the third clutch and the speed reduction planetary gear, and so in the case of using for an FR-type vehicle, for example, can be placed between the axial direction of the planetary gear set and the speed reduction planetary gear. Therefore, the second clutch which has a relatively small volume can be placed on the inner circumferential side of the friction plate of the third clutch, and so the shaft length of the automobile automatic transmission can be shortened. Further, the member that inputs the input rotation into the speed reduction planetary gear and the clutch drum of the second clutch can be made in common and so the shaft length of the automobile automatic transmission can be shortened.

According to another exemplary aspect of the invention, the hydraulic servo of the second clutch is placed between the axial direction of the hydraulic servo of the third clutch and the hydraulic servo of the first clutch, and so can be placed between the axial direction of the planetary gear set and the speed reduction planetary gear. Therefore, the second clutch which has a relatively small volume can be placed on the inner circumferential side of the friction plate of the third clutch, and so the shaft length of the automobile automatic transmission can be shortened.

According to another exemplary aspect of the invention, the hydraulic servo of the third clutch is placed on the side opposite from the hydraulic servo of the fourth clutch in the axial direction as to the reduced speed planetary gear, and on the boss unit extended from the case, and the hydraulic oil is supplied to the hydraulic servo of the third clutch via the oil line provided within the boss unit, and so the hydraulic oil pressure supplied to the third clutch is capable of engaging, while the third clutch and the second linking member are capable of being linked.

According to another exemplary aspect of the invention, the hydraulic servo of the first clutch is placed in between the axial direction of the speed reduction planetary gear and the hydraulic servo of the fourth clutch, the hydraulic oil is supplied to the hydraulic servo of the first clutch from the oil line provided within the input shaft, so as to be capable of engaging by the hydraulic oil pressure supplied to the first clutch, and compared to the case wherein the first clutch is placed on the side opposite of the planetary gear set in the axial direction as to the reduced speed planetary gear, placing the transmitting member that transmits the output rotation of the first clutch through the outer circumferential side of the reduced speed planetary gear becomes unnecessary, in other words the number of members passing through the outer circumferential side of the reduced speed planetary gear is reduced. Thus, the automobile automatic transmission can be designed to be made more compact in the radial direction.

According to another exemplary aspect of the invention, the hydraulic servo of the second clutch is placed on the side opposite from the speed reduction planetary gear in the axial direction as to the planetary gear set, and so a large number of oil lines being provided in a concentration within the boss unit or on the support wall can be prevented.

According to another exemplary aspect of the invention, the hydraulic servo of the second clutch is placed between the axial direction of the planetary gear set and the speed reduction planetary gear, and so in the case of using for an FR-type vehicle, for example, the planetary gear set and the output member of the automobile automatic transmission can be closer to one another, and a large torque can be transmitted at a relatively low speed, and the member that links the fourth rotation element that makes a high rotation at a relatively reverse speed and the output member can be shortened, and reduced weight can be designed. Further, this planetary gear set can be closer to the supporting unit of the shaft wherein the planetary gear set is placed, and the gear position can be stabilized.

According to another exemplary aspect of the invention, the hydraulic servo of the second clutch is placed between the axial direction of the hydraulic servo of the first clutch and the hydraulic servo of the fourth clutch, and so can be placed between the axial direction of the planetary gear set and the speed reduction planetary gear. Therefore, the second clutch which has a relatively small volume can be placed on the inner circumferential side of the second linking member and the third linking member, and so the shaft length of the automobile automatic transmission can be made compact in the radial direction.

According to another exemplary aspect of the invention, the hydraulic servo of the first clutch is placed between the axial direction of the reduced speed planetary gear and the hydraulic servo of the third clutch, and on the boss unit extended from the case, and the hydraulic oil is supplied to the hydraulic servo of the first clutch from the oil line provided within the boss unit, therefore, compared with the case wherein the hydraulic servo of the first clutch is placed on the input shaft, the length of the oil line can be made shorter and controllability can be improved.

According to another exemplary aspect of the invention, the hydraulic servo of the second clutch is placed on the side opposite from the speed reduction planetary gear in the axial direction as to the planetary gear set, and so a large number of oil lines being provided in a concentration within the boss unit or on the support wall can be prevented.

According to another exemplary aspect of the invention, the hydraulic servo of the second clutch is placed between the axial direction of the planetary gear set and the speed reduction planetary gear, and so in the case of using for an FR-type vehicle, for example, the planetary gear set and the output member of the automobile automatic transmission can be closer to one another, and a large torque can be transmitted at a relatively low speed, and the member that links the fourth rotation element that makes a high rotation at a relatively reverse speed and the output member can be shortened, and reduced weight can be designed. Further, this planetary gear set can be closer to the supporting unit of the shaft wherein the planetary gear set is placed, and the gear position can be stabilized.

According to another exemplary aspect of the invention, the hydraulic servo of the second clutch is placed between the axial direction of the reduced speed planetary gear and the hydraulic servo of the fourth clutch, and so can be placed between the axial direction of the planetary gear set and the speed reduction planetary gear. Therefore, the second clutch which has a relatively small volume can be placed on the inner circumferential side of the friction plate of the third clutch, and so the shaft length of the automobile automatic transmission can be shortened. Further, the member that inputs the input rotation into the speed reduction planetary gear and the clutch drum of the second clutch can be made in common and so the shaft length of the automobile automatic transmission can be shortened.

According to another exemplary aspect of the invention, a second linking member, wherein a large transmitting torque is input and can greatly accelerate rotation, can be placed on the inner circumferential side. Thus, reduced weight or improved controllability of the vehicle automatic transmission can be designed.

According to another exemplary aspect of the invention, the input rotation from the fourth clutch and the reduced speed rotation from the third clutch can share use of the second linking member so as to be capable of transmitting to the first rotation element. Thus, the number of parts can be reduced, and a light-weight and compact vehicle automatic transmission can be designed.

According to another exemplary aspect of the invention, a member for linking the second linking member and the first retaining means becomes unnecessary, and the reduction in number of parts of the vehicle automatic transmission and a reduction in weight thereof is enabled. Further, the input rotation from the fourth clutch and the reduced speed rotation from the third clutch can be used together so as to reduce the weight of the second linking member which is capable of transmitting to the first rotation element, and thus, controllability of the vehicle automatic transmission can be improved.

According to another exemplary aspect of the invention, the hydraulic servo of the third clutch is placed between the axial direction of the reduced speed planetary gear and the hydraulic servo of the fourth clutch, and therefore the hydraulic servo of the third clutch and the hydraulic servo of the fourth clutch can be placed in close proximity to each other, and the member (particularly the member for the purpose of linking from the third clutch to the second linking member) which transmits a relatively large torque which links the fourth clutch and the third clutch can be made short. Thus, reduced weight and improved controllability of the vehicle automatic transmission can be designed.

According to another exemplary aspect of the invention, the hydraulic oil is supplied to the hydraulic servo of the third clutch via an oil line provided on the support wall, and therefore the number of sealing rings can be reduced compared to the case of supplying the hydraulic oil via a member which relatively rotates from the oil line provided on the boss unit extended on the case of the input shaft, for example. Thus, improved efficiency and improved controllability of the vehicle automatic transmission can be designed.

According to another exemplary aspect of the invention, the hydraulic oil is supplied to the hydraulic servo of the third clutch from the oil line within the input shaft, and so compared to the case of supplying from upon the boss unit, the diameter of the sealing rings become smaller, and sliding resistance from the sealing rings can be reduced, and the controllability of the vehicle automatic transmission can be improved.

According to another exemplary aspect of the invention, the first clutch can be placed on the side opposite of the reduced speed planetary gear in the axial direction as to the planetary gear set, and therefore the oil line to the first clutch and the oil line to the third clutch can be separated, and oil lines can be prevented from becoming concentrated.

According to another exemplary aspect of the invention, the hydraulic oil is supplied to the hydraulic servo of the first clutch, via the oil line provided on the boss unit, and therefore compared to the case, for example, of being supplied from the boss unit via an oil line provided on the input shaft, in other words compared to the case that the hydraulic oil is supplied via a member which relatively rotates, the number of sealing rings can be reduced. Thus, improved efficiency and improved controllability of the vehicle automatic transmission can be designed.

According to another exemplary aspect of the invention, the hydraulic oil is supplied to the hydraulic servo of the first clutch from the oil line within the input shaft, and so compared to the case of supplying from upon the boss unit, the diameter of the sealing rings become smaller, and sliding resistance from the sealing rings can be reduced, and the controllability of the vehicle automatic transmission can be improved.

According to another exemplary aspect of the invention, the second clutch, wherein a relatively smaller transmitting torque volume is sufficient, can be placed on the inner circumferential side of the third clutch which requires a relatively large transmitting torque volume, and the axial length of the vehicle automatic transmission can be shortened.

According to another exemplary aspect of the invention, the hydraulic servo of the second clutch is placed on the side opposite in the axial direction from the reduced speed planetary gear as to the aforementioned planetary gear set, and therefore multiple oil lines can be prevented from being provided concentrated within the boss unit or on the support wall.

According to another exemplary aspect of the invention, the hydraulic servo of the second clutch is placed on the side opposite in the axial direction from the reduced speed planetary gear as to the aforementioned planetary gear set, and so multiple oil lines can be prevented from being provided concentrated within the boss unit or on the support wall.

According to another exemplary aspect of the invention, the hydraulic servo of the third clutch is placed on the side opposite in the axial direction from the hydraulic servo of the fourth clutch as to the reduced speed planetary gear, and on the boss unit which extends from the case, and the hydraulic oil is supplied to the hydraulic servo of the third clutch via the oil line provided within the boss unit, and so the hydraulic oil pressure is supplied to the third clutch so as to be capable of engaging, while linking the third clutch as the second linking member.

According to another exemplary aspect of the invention, the hydraulic servo of the first clutch is placed on the side opposite in the axial direction from the aforementioned reduced speed planetary gear as to the aforementioned planetary gear set, and so multiple oil lines can be prevented from being provided concentrated within the boss unit or on the support wall.

According to another exemplary aspect of the invention, compared to the case of supplying the hydraulic oil to the hydraulic servo of the first clutch from the oil line within the input shaft, the oil line can be shortened, and the controllability of the vehicle automatic transmission can be improved.

According to another exemplary aspect of the invention, the hydraulic oil is supplied to the hydraulic servo of the first clutch via an oil line provided on the input shaft, and so compared to the case of supplying from the boss unit, the diameter of the sealing rings become smaller, and sliding resistance by the sealing rings can be reduced, and the controllability of the vehicle automatic transmission can be improved.

According to another exemplary aspect of the invention, the second clutch, wherein a relatively smaller transmitting torque volume is sufficient, can be placed on the inner circumferential side of the third clutch which requires a relatively large transmitting torque volume, and the axial length of the vehicle automatic transmission can be shortened.

According to another exemplary aspect of the invention, the hydraulic servo of the second clutch is placed on the side opposite in the axial direction from the reduced speed planetary gear as to the planetary gear set, and so multiple oil lines can be prevented from being provided concentrated within the boss unit or on the support wall.

According to another exemplary aspect of the invention, the aforementioned reduced speed planetary gear (DP) and the aforementioned planetary gear set (PU) are arrayed on the same axis in the axial direction, and therefore can be easily loaded onto an FR vehicle.

According to another exemplary aspect of the invention, the vehicle automatic transmission can be suitable for use in an FR type vehicle.

According to another exemplary aspect of the invention, the vehicle automatic transmission can be suitable for use in an FF type vehicle.

According to another exemplary aspect of the invention, the counter gear and the hydraulic servo of the fourth clutch can be supported both using the support wall. Therefore, the number of parts can be reduced, and a vehicle automatic transmission which is light-weight and compact can be designed.

According to another exemplary aspect of the invention, the reduced speed rotation wherein the speed of the input rotation of the input shaft is reduced can be output from the first ring gear.

According to another exemplary aspect of the invention, the planetary gear set can be constructed as a so-called Ravigneaux-type planetary gear, and while high speed rotation of the various rotation elements can be prevented, a favorable gear ratio can be obtained.

What is claimed is:

1. A vehicle automatic transmission, comprising:
   an input shaft;
   a planetary gear that reduces a speed of an input rotation of the input shaft and outputs a reduced speed rotation;
   a planetary gear set having a first rotation element, a second rotation element, a third rotation element and a fourth rotation element;
   a first clutch that is capable of transmitting the reduced speed rotation that passes through the planetary gear into the second rotation element;
   a second clutch that is capable of transmitting the input rotation into the third rotation element;
   a third clutch that is capable of transmitting the reduced speed rotation that passes through the planetary gear into the first rotation element;
   a fourth clutch that is capable of transmitting the input rotation into the first rotation element;
   a first brake that is capable of fixing the first rotation element;
   a second brake that is capable of fixing the third rotation element; and
   an output member that is linked to the fourth rotation element, wherein:
      a hydraulic servo of the fourth clutch is disposed between the planetary gear set and the planetary gear in an axial direction;
      a hydraulic servo of the third clutch is disposed on a side opposite, in the axial direction, from the planetary gear set as to the hydraulic servo of the fourth clutch;
      an outer circumferential side linking path that links the input shaft and the fourth clutch and passes through an outer circumferential side of the third clutch; and
      an inner circumferential side linking path that links the third clutch and the fourth clutch and the first rotation element of the planetary gear set and passes through an inner circumferential side of the fourth clutch.

2. The vehicle automatic transmission according to claim 1, further comprising:
   a support wall that is fixed to a case and disposed between the hydraulic servo of the fourth clutch and the planetary gear set in the axial direction, wherein
   hydraulic oil is supplied to the hydraulic servo of the fourth clutch via an oil line provided on the support wall.

3. The vehicle automatic transmission according to claim 1, wherein the fourth clutch is linked with the first rotation element of the planetary gear set via at least one portion of the inner circumferential side linking path.

4. The vehicle automatic transmission according to claim 1, wherein:
   the planetary gear comprises (1) a fixed rotation element, wherein the rotation is fixed, (2) an input rotation element that is constantly linked to the input shaft, and (3) a reduced speed rotation element that outputs the reduced speed rotation;
   the outer circumferential side linking path is a path that links the input shaft via the input rotation element; and
   the hydraulic servo of the fourth clutch further comprises (1) a clutch drum that is open in a direction of the planetary gear, wherein an outer circumferential side thereof is linked to the outer circumferential side linking path, and (2) a piston member that defines a hydraulic oil chamber in cooperation with the clutch drum so as to press a friction plate based on hydraulic oil.

5. The vehicle automatic transmission according to claim 1, wherein:
   the first and third clutches are disposed on a side opposite, in the axial direction, from the planetary gear set as to the hydraulic servo of the fourth clutch;
   the outer circumferential side linking path has a first linking member that links the input shaft and the fourth clutch that passes through an outer circumferential side of the first clutch and the third clutch; and
   the inner circumferential side linking path has a second linking member that links the third clutch and the first rotation element.

6. The vehicle automatic transmission according to claim 5, wherein the fourth clutch is linked to the first rotation element via the second linking member.

7. The vehicle automatic transmission according to claim 5, wherein the first brake is linked to the second linking member via a hub member that passes between the fourth clutch and the planetary gear set in the axial direction.

8. The vehicle automatic transmission according to claim 5, wherein a clutch drum of the fourth clutch is linked to the second linking member, and the clutch drum of the fourth clutch is capable of being retained by the first brake.

9. The vehicle automatic transmission according to claim 5, wherein:
   the hydraulic servo of the third clutch is disposed between the planetary gear and the hydraulic servo of the fourth clutch in the axial direction; and
   hydraulic oil is supplied to the hydraulic servo of the third clutch via an oil line provided on a support wall.

10. The vehicle automatic transmission according to claim 9, wherein:
a hydraulic servo of the first clutch is disposed on a side opposite, in the axial direction, from the hydraulic servo of the third clutch as to the planetary gear, and on a boss unit extended from a case; and
the hydraulic oil is supplied to the hydraulic servo of the first clutch from an oil line provided within the boss unit.

11. The vehicle automatic transmission according to claim 10, wherein a hydraulic servo of the second clutch is disposed on a side opposite, in the axial direction, from the planetary gear as to the planetary gear set.

12. The vehicle automatic transmission according to claim 10, wherein a hydraulic servo of the second clutch is disposed between the planetary gear set and the planetary gear in the axial direction.

13. The vehicle automatic transmission according to claim 12, wherein the hydraulic servo of the second clutch is disposed between the hydraulic servo of the third clutch and the planetary gear in the axial direction.

14. The vehicle automatic transmission according to claim 9, wherein:
a hydraulic servo of the first clutch is disposed between the planetary gear and the hydraulic servo of the third clutch in the axial direction; and
the hydraulic oil is supplied to the hydraulic servo of the first clutch from an oil line provided within the input shaft.

15. The vehicle automatic transmission according to claim 14, wherein a hydraulic servo of the second clutch is disposed on a side opposite, in the axial direction, from the planetary gear as to the planetary gear set.

16. The vehicle automatic transmission according to claim 14, wherein a hydraulic servo of the second clutch is disposed between the planetary gear set and the planetary gear in the axial direction.

17. The vehicle automatic transmission according to claim 16, wherein the hydraulic servo of the second clutch is disposed between a hydraulic servo of the third clutch and the hydraulic servo of the first clutch.

18. The vehicle automatic transmission according to claim 5, wherein:
the hydraulic servo of the third clutch is disposed on a side opposite, in the axial direction, from the hydraulic servo of the fourth clutch as to the planetary gear, and on a boss unit extended from a case; and
hydraulic oil is supplied to the hydraulic servo of the third clutch via an oil line provided within the boss unit.

19. The vehicle automatic transmission according to claim 18, wherein:
a hydraulic servo of the first clutch is disposed between the planetary gear and the hydraulic servo of the fourth clutch in the axial direction; and
the hydraulic oil is supplied to the hydraulic servo of the first clutch from an oil line provided within the input shaft.

20. The vehicle automatic transmission according to claim 19, wherein a hydraulic servo of the second clutch is disposed on a side opposite, in the axial direction, from the planetary gear as to the planetary gear set.

21. The vehicle automatic transmission according to claim 19, wherein a hydraulic servo of the second clutch is disposed between the planetary gear set and the planetary gear in the axial direction.

22. The vehicle automatic transmission according to claim 21, wherein the hydraulic servo of the second clutch is disposed between the hydraulic servo of the first clutch and the hydraulic servo of the fourth clutch in the axial direction.

23. The vehicle automatic transmission according to claim 18, wherein:
a hydraulic servo of the first clutch is disposed between the planetary gear and the hydraulic servo of the third clutch in the axial direction, and is disposed on the boss unit extended from the case; and
the hydraulic oil is supplied to the hydraulic servo of the first clutch from the oil line provided within the boss unit.

24. The vehicle automatic transmission according to claim 23, wherein a hydraulic servo of the second clutch is disposed on a side opposite, in the axial direction, from the planetary gear as to the planetary gear set.

25. The vehicle automatic transmission according to claim 23, wherein a hydraulic servo of the second clutch is disposed between the planetary gear set and the planetary gear in the axial direction.

26. The vehicle automatic transmission according to claim 25, wherein the hydraulic servo of the second clutch is disposed between the planetary gear and the hydraulic servo of the fourth clutch in the axial direction.

27. The vehicle automatic transmission according to claim 1, wherein:
the third clutch is disposed on a side opposite, in the axial direction, from the planetary gear set as to the hydraulic servo of the fourth clutch;
the outer circumferential side linking path has a first linking member that links the input shaft and the fourth clutch and passes through an outer circumferential side of the third clutch; and
the inner circumferential side linking path has a second linking member that links the third clutch and the first rotation element.

28. The vehicle automatic transmission according to claim 27, wherein the fourth clutch is linked to the first rotation element via the second linking member.

29. The vehicle automatic transmission according to claim 27, wherein a clutch drum of the fourth clutch is linked to the second linking member, and also the clutch drum of the fourth clutch is capable of being retained by the first brake.

30. The vehicle automatic transmission according to claim 27, wherein the hydraulic servo of the third clutch is disposed between the planetary gear and a hydraulic servo of the fourth clutch in the axial direction.

31. The vehicle automatic transmission according to claim 30, wherein hydraulic oil is supplied to the hydraulic servo of the third clutch via an oil line provided on a support wall.

32. The vehicle automatic transmission according to claim 30, wherein hydraulic oil is supplied to the hydraulic servo of the third clutch via an oil line provided on the input shaft.

33. The vehicle automatic transmission according to claim 30, wherein a hydraulic servo of the first clutch is disposed on a side opposite, in the axial direction, from the planetary gear as to the planetary gear set.

34. The vehicle automatic transmission according to claim 27, wherein:
the hydraulic servo of the third clutch is disposed on a side opposite, in the axial direction, from the hydraulic servo of the fourth clutch as to the planetary gear, and on a boss unit extended from a case; and
hydraulic oil is supplied to the hydraulic servo of the third clutch via an oil line provided within the boss unit.

35. The vehicle automatic transmission according to claim 34, wherein a hydraulic servo of the first clutch is disposed on a side opposite, in the axial direction, from the planetary gear as to the planetary gear set.

36. The vehicle automatic transmission according to claim 1, wherein the planetary gear and the planetary gear set are arranged on a same axis and in the axial direction.

37. The vehicle automatic transmission according to claim 1, wherein the output member is an output shaft that transmits a rotation on a same axis as the input shaft.

38. The vehicle automatic transmission according to claim 1, wherein the output member is a counter gear that transmits a rotation on an axis parallel to the input shaft.

39. The vehicle automatic transmission according to claim 38, wherein the counter gear is disposed between the planetary gear and the planetary gear set in the axial direction.

40. The vehicle automatic transmission according to claim 38, wherein the counter gear is disposed adjacent to a side opposite the fourth clutch of a support wall, and is supported by the support wall so as to be capable of rotating.

41. The vehicle automatic transmission according to claim 1, wherein the planetary gear comprises:
   a double pinion planetary gear that has a first sun gear, wherein the rotation thereof is fixed,
   a first pinion gear that meshes with the first sun gear,
   a second pinion gear that meshes with the first pinion gear,
   a first carrier that supports the first pinion gear and the second pinion gear so as to be capable of rotating and is also continuously linked to the input shaft, and
   a first ring gear that meshes with the second pinion gear and also outputs the reduced speed rotation.

42. The vehicle automatic transmission according to claim 1, wherein:
   the planetary gear set comprises:
      a first sun gear,
      a second sun gear,
      a first pinion gear that meshes with the second sun gear,
      a second pinion gear that meshes with the first sun gear and meshes to the first pinion gear,
      a first carrier that supports the first pinion gear and the second pinion gear so as to be capable of rotating,
      a first ring gear that meshes with the second pinion gear;
   the first rotation element is formed from the first sun gear;
   the second rotation element is formed from the second sun gear;
   the third rotation element is formed from the first carrier; and
   the fourth rotation element is formed from the first ring gear.

43. The vehicle automatic transmission according to claim 1, wherein:
   a forward first speed is achieved by engaging the first clutch and by retaining the second brake;
   a forward second speed is achieved by engaging the first clutch and by retaining the first brake;
   a forward third speed is achieved by engaging the first clutch and the third clutch;
   a forward fourth speed is achieved by engaging the first clutch and the fourth clutch;
   a forward fifth speed is achieved by engaging the first clutch and the second clutch;
   a forward sixth speed is achieved by engaging the second clutch and the fourth clutch;
   a forward seventh speed is achieved by engaging the second clutch and the third clutch;
   a forward eighth speed is achieved by engaging the second clutch and by retaining the first brake; and
   a reverse speed is achieved by engaging the third clutch or the fourth clutch and by retaining the second brake.

* * * * *

UNITED STATES PATENT AND TRADEMARK OFFICE
CERTIFICATE OF CORRECTION

PATENT NO. : 7,628,726 B2  Page 1 of 1
APPLICATION NO. : 10/590957
DATED : December 8, 2009
INVENTOR(S) : Fukuyama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 324 days.

Signed and Sealed this

Second Day of November, 2010

David J. Kappos
*Director of the United States Patent and Trademark Office*